(12) United States Patent
Cote et al.

(10) Patent No.: US 8,259,198 B2
(45) Date of Patent: Sep. 4, 2012

(54) SYSTEM AND METHOD FOR DETECTING AND CORRECTING DEFECTIVE PIXELS IN AN IMAGE SENSOR

(75) Inventors: Guy Cote, San Jose, CA (US); Jeffrey E. Frederiksen, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 305 days.

(21) Appl. No.: 12/582,400

(22) Filed: Oct. 20, 2009

(65) Prior Publication Data
US 2011/0090371 A1    Apr. 21, 2011

(51) Int. Cl.
H04N 9/64    (2006.01)
H04N 9/68    (2006.01)

(52) U.S. Cl. .................. 348/246; 348/237; 348/247

(58) Field of Classification Search .................. None
See application file for complete search history.

(56) References Cited

U.S. PATENT DOCUMENTS

| | | | |
|---|---|---|---|
| 4,475,172 A | 10/1984 | Frederiksen |
| 4,589,089 A | 5/1986 | Frederiksen |
| 4,605,961 A | 8/1986 | Frederiksen |
| 4,682,360 A | 7/1987 | Frederiksen |
| 4,694,489 A | 9/1987 | Frederiksen |
| 4,742,543 A | 5/1988 | Frederiksen |
| 4,743,959 A | 5/1988 | Frederiksen |
| 4,799,677 A | 1/1989 | Frederiksen |
| 4,979,738 A | 12/1990 | Frederiksen |
| 5,227,863 A | 7/1993 | Bilbrey et al. |
| 5,247,355 A | 9/1993 | Frederiksen |
| 5,272,529 A | 12/1993 | Frederiksen |
| 5,496,106 A | 3/1996 | Anderson |
| 5,552,827 A | 9/1996 | Maenaka et al. |
| 5,640,613 A | 6/1997 | Yuyama et al. |
| 5,694,227 A | 12/1997 | Starkweather |
| 5,764,291 A | 6/1998 | Fullam |

(Continued)

FOREIGN PATENT DOCUMENTS

EP    2015562 A1    1/2009

(Continued)

OTHER PUBLICATIONS

U.S. Appl. No. 12/582,377, filed Oct. 20, 2009, Guy Cote.

(Continued)

*Primary Examiner* — Luong T Nguyen
(74) *Attorney, Agent, or Firm* — Fletcher Yoder PC

(57) ABSTRACT

Various techniques are provided for the detection and correction of defective pixels in an image sensor. In accordance with one embodiment, a static defect table storing the locations of known static defects is provided, and the location of a current pixel is compared to the static defect table. If the location of the current pixel is found in the static defect table, the current pixel is identified as a static defect and is corrected using the value of the previous pixel of the same color. If the current pixel is not identified as a static defect, a dynamic defect detection process includes comparing pixel-to-pixel gradients between the current pixel a set of neighboring pixels against a dynamic defect threshold. If a dynamic defect is detected, a replacement value for correcting the dynamic defect may be determined by interpolating the value of two neighboring pixels on opposite sides of the current pixel in a direction exhibiting the smallest gradient.

29 Claims, 46 Drawing Sheets
(4 of 46 Drawing Sheet(s) Filed in Color)

U.S. PATENT DOCUMENTS

| | | | |
|---|---|---|---|
| 5,790,705 | A | 8/1998 | Anderson et al. |
| 5,809,178 | A | 9/1998 | Anderson et al. |
| 5,822,465 | A | 10/1998 | Normile et al. |
| 5,867,214 | A | 2/1999 | Anderson et al. |
| 5,991,465 | A | 11/1999 | Anderson et al. |
| 6,011,585 | A | 1/2000 | Anderson |
| 6,028,611 | A | 2/2000 | Anderson et al. |
| 6,031,964 | A | 2/2000 | Anderson |
| 6,122,411 | A | 9/2000 | Shen et al. |
| 6,141,044 | A | 10/2000 | Anderson et al. |
| 6,157,394 | A | 12/2000 | Anderson et al. |
| 6,198,514 | B1 | 3/2001 | Lee et al. |
| 6,745,012 | B1 | 6/2004 | Ton et al. |
| 6,954,193 | B1 | 10/2005 | Andrade et al. |
| 6,959,044 | B1 | 10/2005 | Jin et al. |
| RE38,896 | E | 11/2005 | Anderson |
| RE38,911 | E | 12/2005 | Anderson et al. |
| RE39,213 | E | 8/2006 | Anderson et al. |
| 7,170,938 | B1 | 1/2007 | Cote et al. |
| 7,209,168 | B2 * | 4/2007 | Post .............................. 348/246 |
| 7,231,587 | B2 | 6/2007 | Novotny et al. |
| 7,277,595 | B1 | 10/2007 | Reid |
| 7,310,371 | B2 | 12/2007 | Cote et al. |
| 7,324,595 | B2 | 1/2008 | Cote et al. |
| 7,327,786 | B2 | 2/2008 | Winger et al. |
| 7,345,708 | B2 | 3/2008 | Winger et al. |
| 7,362,376 | B2 | 4/2008 | Winger et al. |
| 7,362,804 | B2 | 4/2008 | Novotny et al. |
| 7,515,765 | B1 | 4/2009 | MacDonald et al. |
| 7,545,994 | B2 | 6/2009 | Reid |
| 7,596,280 | B2 | 9/2009 | Bilbrey et al. |
| 7,602,849 | B2 | 10/2009 | Booth et al. |
| 7,612,804 | B1 | 11/2009 | Marcu et al. |
| 7,620,103 | B2 | 11/2009 | Cote et al. |
| 7,657,116 | B2 * | 2/2010 | Matsuoka et al. ............ 382/274 |
| 7,796,169 | B2 * | 9/2010 | Kitani ........................... 348/247 |
| 7,860,334 | B2 | 12/2010 | Li et al. |
| 8,159,570 | B2 | 4/2012 | Negishi |
| 2003/0151673 | A1 | 8/2003 | Hashimoto et al. |
| 2003/0214594 | A1 | 11/2003 | Bezryadin |
| 2004/0240549 | A1 | 12/2004 | Cote et al. |
| 2004/0240556 | A1 | 12/2004 | Winger et al. |
| 2005/0030395 | A1 | 2/2005 | Hattori |
| 2005/0063465 | A1 | 3/2005 | Cote et al. |
| 2005/0105618 | A1 | 5/2005 | Booth et al. |
| 2005/0117040 | A1 | 6/2005 | Matsutani |
| 2005/0123282 | A1 | 6/2005 | Novotny et al. |
| 2005/0134602 | A1 | 6/2005 | Winger et al. |
| 2005/0134730 | A1 | 6/2005 | Winger et al. |
| 2005/0162531 | A1 | 7/2005 | Hsu et al. |
| 2005/0216815 | A1 | 9/2005 | Novotny et al. |
| 2006/0012841 | A1 | 1/2006 | Tsukioka |
| 2006/0126724 | A1 | 6/2006 | Cote et al. |
| 2006/0227867 | A1 | 10/2006 | Winger et al. |
| 2007/0030898 | A1 | 2/2007 | Cote |
| 2007/0030902 | A1 | 2/2007 | Winger et al. |
| 2007/0030903 | A1 | 2/2007 | Cote et al. |
| 2007/0030904 | A1 | 2/2007 | Winger et al. |
| 2007/0030905 | A1 | 2/2007 | Cote |
| 2007/0030906 | A1 | 2/2007 | Cote et al. |
| 2007/0126885 | A1 | 6/2007 | Hasegawa |
| 2007/0216785 | A1 | 9/2007 | Nomura et al. |
| 2007/0263724 | A1 | 11/2007 | Cote et al. |
| 2007/0291142 | A1 | 12/2007 | Noh et al. |
| 2008/0056606 | A1 | 3/2008 | Kilgore |
| 2008/0079826 | A1 | 4/2008 | Noh |
| 2008/0088857 | A1 | 4/2008 | Zimmer et al. |
| 2008/0088858 | A1 | 4/2008 | Marcu et al. |
| 2008/0117330 | A1 | 5/2008 | Winger et al. |
| 2008/0122975 | A1 | 5/2008 | Winger et al. |
| 2008/0253652 | A1 | 10/2008 | Gupta et al. |
| 2009/0273679 | A1 | 11/2009 | Gere et al. |

FOREIGN PATENT DOCUMENTS

| | | |
|---|---|---|
| JP | 2006-140654 A | 1/2006 |
| JP | 2007201530 A | 8/2007 |
| JP | 2010-28487 A | 2/2010 |
| KR | 10-2008-0102172 A | 11/2008 |
| KR | 10-2009-0045305 A | 5/2009 |
| WO | 2006084266 A1 | 8/2006 |

OTHER PUBLICATIONS

U.S. Appl. No. 12/582,390, filed Oct. 20, 2009, Guy Cote.
U.S. Appl. No. 12/582,414, filed Oct. 20, 2009, Guy Cote.
International Search Report for related PCT/US2010/052264 dated Jan. 13, 2011 (15 pgs.).
Takahashi, et al.; "Color Demosaicing Using Asymmetric Directional Interpolation and Hue Vector Smoothing," IEICE Transactions on Fundamentals of Electronics, Communications and Computer Sciences; Engineering Sciences Society, vol. E91A, No. 4, Apr. 1, 2008, pp. 978-986.
International Search Report for PCT Application No. PCT/US2010/052293, dated Mar. 15, 2011, 19 pgs.
U.S. Appl. No. 12/789,810, filed May 28, 2010, Cote, et al.
U.S. Appl. No. 12/789,815, filed May 28, 2010, Cote, et al.
U.S. Appl. No. 12/895,396, filed Sep. 30, 2010, Cote, et al.
Korean Search Report cited in Korean Application No. 10-2012-7012945 dated May 18, 2012; 8 pgs.

* cited by examiner

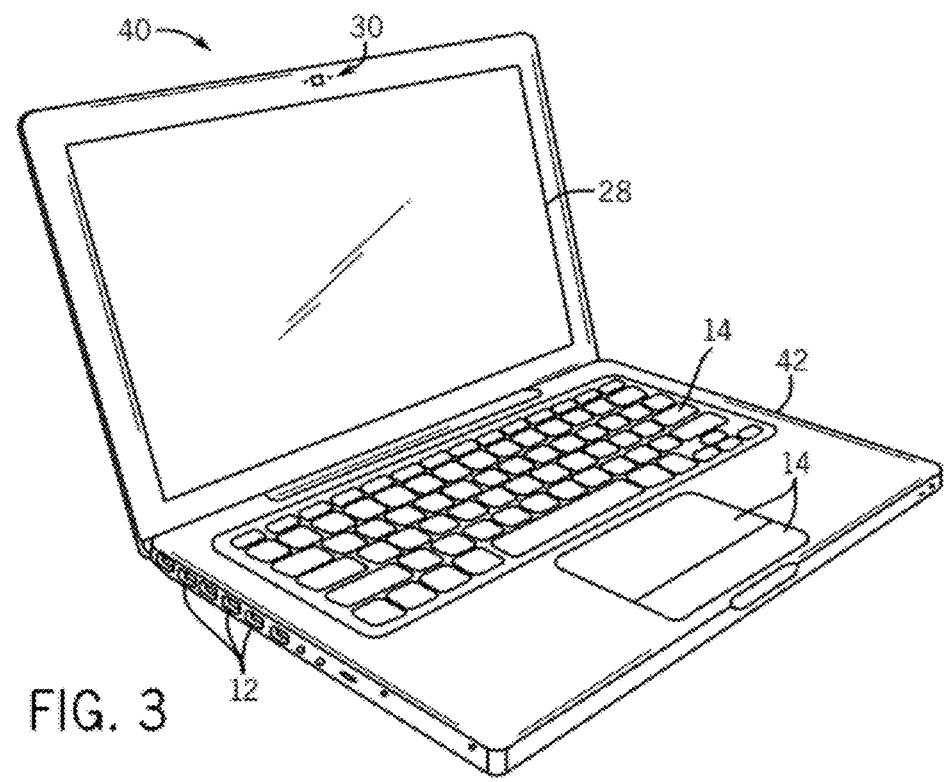

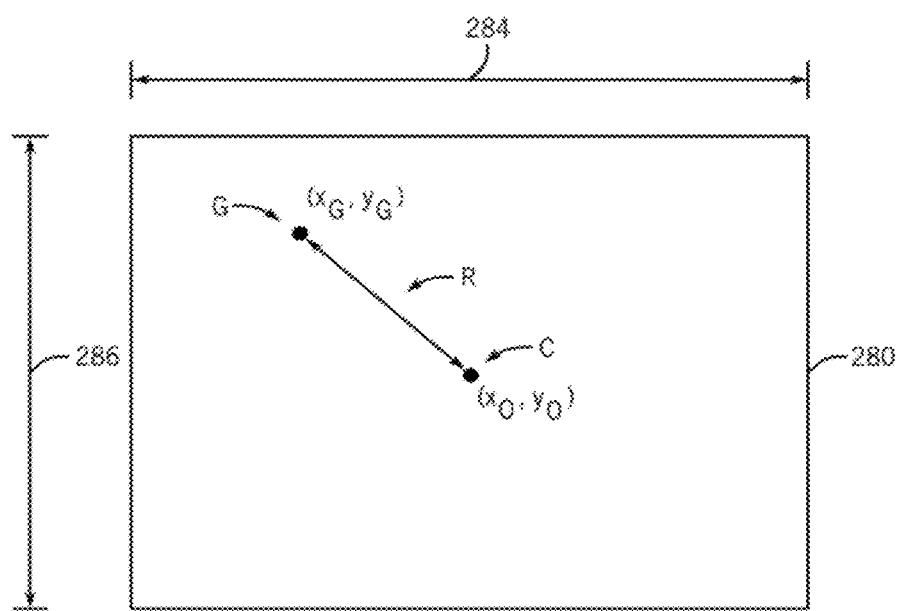
FIG. 25
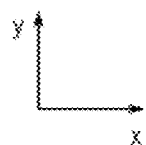

FIG. 37

SYSTEM AND METHOD FOR DETECTING AND CORRECTING DEFECTIVE PIXELS IN AN IMAGE SENSOR

BACKGROUND

The present disclosure relates generally to digital imaging devices and, more particularly, to systems and method for processing image data obtained using an image sensor of a digital imaging device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, digital imaging devices have become increasing popular due, at least in part, to such devices becoming more and more affordable for the average consumer. Further, in addition to a number of stand-alone digital cameras currently available on the market, it is not uncommon for digital imaging devices to be integrated as part of another electronic device, such as a desktop or notebook computer, a cellular phone, or a portable media player.

To acquire image data, most digital imaging devices include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be processed by an image processing pipeline, which may apply a number of various image processing operations to the image data to generate a full color image that may be displayed for viewing on a display device, such as a monitor.

While conventional image processing techniques generally aim to produce a viewable image that is both objectively and subjectively pleasing to a viewer, such conventional techniques may not adequately address errors and/or distortions in the image data introduced by the imaging device and/or the image sensor. For instance, defective pixels on the image sensor, which may be due to manufacturing defects or operational failure, may fail to sense light levels accurately and, if not corrected, may manifest as artifacts appearing in the resulting processed image. Additionally, light intensity fall-off at the edges of the image sensor, which may be due to imperfections in the manufacture of the lens, may adversely affect characterization measurements and may result in an image in which the overall light intensity is non-uniform. The image processing pipeline may also perform one or more processes to sharpen the image. Conventional sharpening techniques, however, may not adequately account for existing noise in the image signal, or may be unable to distinguish the noise from edges and textured areas in the image. In such instances, conventional sharpening techniques may actually increase the appearance of noise in the image, which is generally undesirable.

Another image processing operation that may be applied to the image data captured by the image sensor is a demosaicing operation. Because the color filter array generally provides color data at one wavelength per sensor pixel, a full set of color data is generally interpolated for each color channel in order to reproduce a full color image (e.g., RGB image). Conventional demosaicing techniques generally interpolate values for the missing color data in a horizontal or a vertical direction, generally depending on some type of fixed threshold. However, such conventional demosaicing techniques may not adequately account for the locations and direction of edges within the image, which may result in edge artifacts, such as aliasing, checkerboard artifacts, or rainbow artifacts, being introduced into the full color image, particularly along diagonal edges within the image.

Accordingly, various considerations should be addressed when processing a digital image obtained with a digital camera or other imaging device in order to improve the appearance of the resulting image. In particular, certain aspects of the disclosure below may address one or more of the drawbacks briefly mentioned above.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure provides various techniques for processing image data acquired using a digital image sensor. In accordance with aspects of the present disclosure, one such technique may relate to the detection and correction of defective pixels of the image sensor. In accordance with one embodiment, a static defect table storing the locations of known static defects is provided. In such embodiments, defective pixel correction and detection may occur in two stages. In a first stage, the location of a current pixel within an image processing frame is compared to the information stored in the static defect table. If the location of the current pixel is found in the static defect table, then the current pixel is identified as a static defect and is corrected using replacement value, which may be selected as the value of the previous pixel of the same color. If the current pixel is not identified as a static defect, the second stage may determine whether the current pixel is a dynamic defect by comparing pixel-to-pixel gradients between the current pixel a set of neighboring pixels against a dynamic defect threshold. A replacement value for correcting a dynamic defect may be determined by interpolating the value of two neighboring pixels on opposite sides of the current pixel in a direction exhibiting the smallest gradient.

In accordance with aspects of the present disclosure, another image processing technique may relate to the application of a multi-scale unsharp mask to provide for image sharpening. In accordance with one embodiment, a luminance image is first obtained for the image data acquired by the digital image sensor. A multi-scale unsharp mask, which may include at least two Gaussian filters of difference radii, may be applied to the luminance image to determine a plurality of unsharp values. Each of the unsharp values may be compared to a corresponding threshold and, for the unsharp values that exceed their respective thresholds, a corresponding gain is applied, and the gained unsharp value is added to a base image, which may be selected as the luminance image or the output of one of the Gaussian filters. Each gained unsharp value may be summed with the base image to produce a final sharpened output. In another embodiment, an attenuated gain may be applied to unsharp values that do not exceed their respective thresholds. Further embodiments may also provide additional processing of the sharpened image for edge enhancement and chroma suppression.

In accordance with a further aspect of the present disclosure, another image processing technique may relate to the demosaicing of image data acquired by the digital image sensor to produce a full color image. In one embodiment, the image sensor may include a Bayer color filter array, and demosaicing may be applied to a resulting Bayer image pattern. In such embodiments, missing green color values are interpolated for each non-green pixel by using an adaptive edge detection filter to determine vertical and horizontal energies. In accordance with disclosed embodiments, green, red, and blue components may contribute to edge detection in determining the vertical and horizontal energies. Vertical and horizontal components of the interpolated green value for the current non-green pixel are weighted using the vertical and horizontal energies, and the weighted values are summed to determine the interpolated green value. In accordance with such embodiments, the interpolated green values may be used to interpolate the missing red and blue color samples.

In accordance with yet another aspect of the present disclosure, a technique for correcting lens shading irregularities is provided. In one embodiment, the location of a current pixel is determined relative to a gain grid having a plurality of grid points distributed in horizontal and vertical directions. If the location of the current pixel corresponds to a grid point, a lens shading gain associated with that grid point is applied to the current pixel. If the location of the current pixel is between four grid points, bi-linear interpolation is applied to the four grid points to determine an interpolated lens shading gain. In a further embodiment, a radial lens shading gain is determined by determining a radial distance from the center of the image to the current pixel and multiplying the radial distance by a global gain parameter based upon the color of the current pixel. The radial lens shading gain is then applied to the current pixel, along with the determined lens shading grid gain or lens shading interpolated gain.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of this disclosure may be better understood upon reading the following detailed description and upon reference to the drawings in which:

FIG. 2 shows a graphical representation of a 2×2 pixel block of a Bayer color filter array that may be implemented in the imaging device of FIG. 1;

FIG. 3 is a perspective view of the electronic device of FIG. 1 in the form of a laptop computing device, in accordance with aspects of the present disclosure;

FIG. 25 graphically illustrates how a radial distance between a current pixel and the center of an image may be calculated and used to determine a radial gain component for lens shading correction, in accordance with one embodiment;

FIG. 37 depicts a set of pixels of a Bayer image pattern from which horizontal and vertical energy components may be derived for interpolating green color values during demosaicing of the Bayer image pattern, in accordance with one embodiment;

DETAILED DESCRIPTION OF SPECIFIC EMBODIMENTS

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed below, the present disclosure relates generally to techniques for processing image data acquired via one or more image sensing devices. In particular, certain aspects of the present disclosure may relate to techniques for detecting and correcting defective pixels, techniques for demosaicing a raw image pattern, techniques for sharpening a luminance image using a multi-scale unsharp mask, and techniques for applying lens shading gains to correct for lens shading irregularities. Further, it should be understood that the presently disclosed techniques may be applied to both still images and moving images (e.g., video), and may be utilized in any suitable type of imaging application, such as a digital camera, an electronic device having an integrated digital camera, a security or video surveillance system, a medical imaging system, and so forth.

Figure 1:
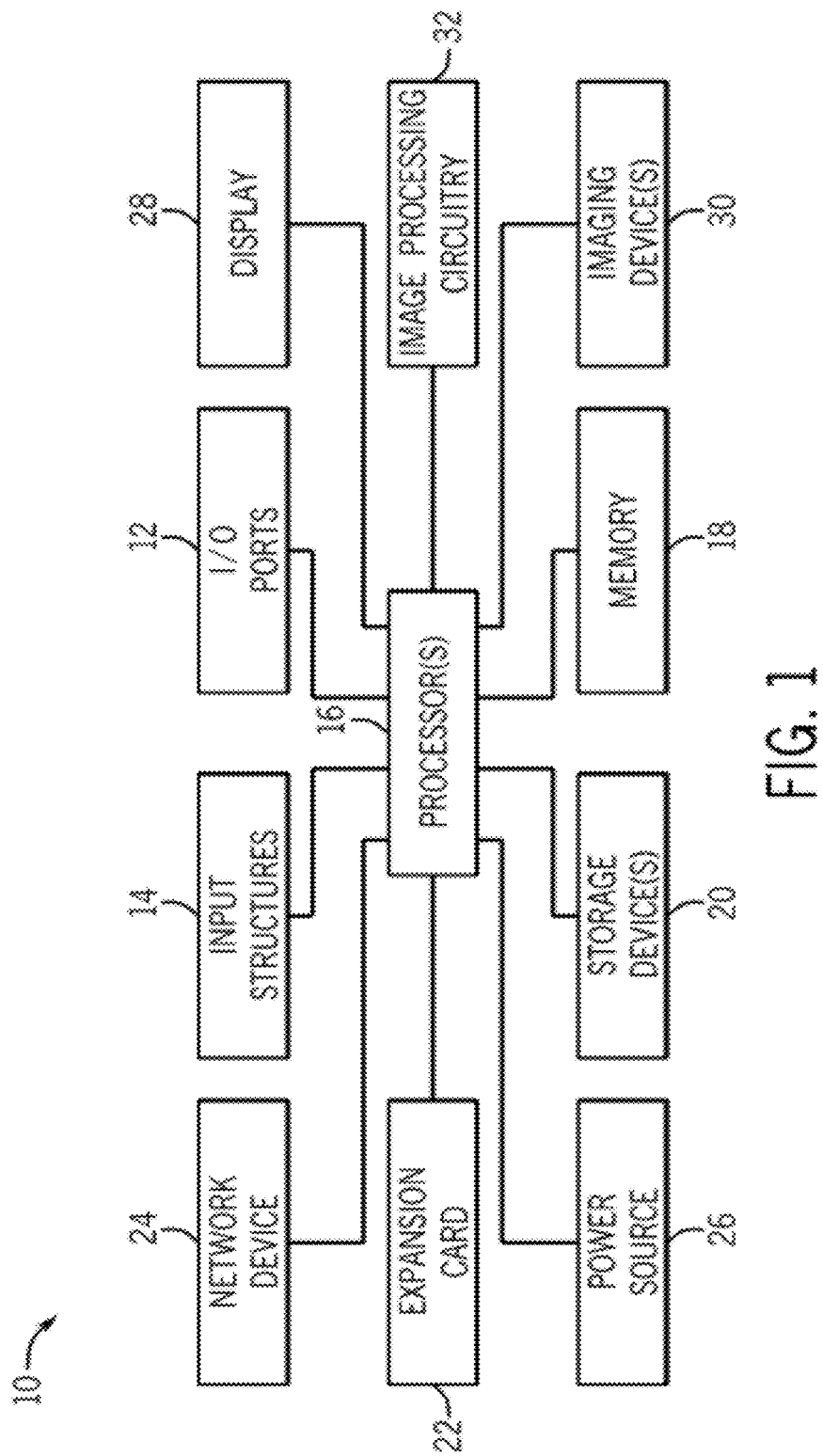
FIG. 1 is a simplified block diagram depicting components of an example of an electronic device that includes an imaging device and image processing circuitry configured to implement one or more of the image processing technique set forth in the present disclosure.

Keeping the above points in mind, FIG. 1 is a block diagram illustrating an example of an electronic device 10 that may provide for the processing of image data using one or more of the image processing techniques briefly mentioned above. The electronic device 10 may be any type of electronic device, such as a laptop or desktop computer, a mobile phone, a digital media player, or the like, that is configured to receive and process image data, such as data acquired using one or more image sensing components. By way of example only, the electronic device 10 may be a portable electronic device, such as a model of an iPod® or iPhone®, available from Apple Inc. of Cupertino, Calif. Additionally, the electronic device 10 may be a desktop or laptop computer, such as a model of a MacBook®, MacBook® Pro, MacBook Air®, iMac®, Mac® Mini, or Mac Pro®, available from Apple Inc. In other embodiments, electronic device 10 may also be a model of an electronic device from another manufacturer that is capable of acquiring and processing image data.

Regardless of its form (e.g., portable or non-portable), it should be understood that the electronic device 10 may provide for the processing of image data using one or more of the image processing techniques briefly discussed above, which may include defective pixel correction and/or detection techniques, lens shading correction techniques, demosaicing techniques, or image sharpening techniques, among others. In some embodiments, the electronic device 10 may apply such image processing techniques to image data stored in a memory of the electronic device 10. In further embodiments, the electronic device 10 may include one or more imaging devices, such as an integrated or external digital camera, configured to acquire image data, which may then be processed by the electronic device 10 using one or more of the above-mentioned image processing techniques. Embodiments showing both portable and non-portable embodiments of electronic device 10 will be further discussed below in FIGS. 3-6.

As shown in FIG. 1, the electronic device 10 may include various internal and/or external components which contribute to the function of the device 10. Those of ordinary skill in the art will appreciate that the various functional blocks shown in FIG. 1 may comprise hardware elements (including circuitry), software elements (including computer code stored on a computer-readable medium) or a combination of both hardware and software elements. For example, in the presently illustrated embodiment, the electronic device 10 may include input/output (I/O) ports 12, input structures 14, one or more processors 16, memory device 18, non-volatile storage 20, expansion card(s) 22, networking device 24, power source 26, and display 28. Additionally, the electronic device 10 may include one or more imaging devices 30, such as a digital camera, and image processing circuitry 32. As will be discussed further below, the image processing circuitry 32 may be configured implement one or more of the above-discussed image processing techniques when processing image data. As can be appreciated, image data processed by image processing circuitry 32 may be retrieved from the memory 18 and/or the non-volatile storage device(s) 20, or may be acquired using the imaging device 30.

Before continuing, it should be understood that the system block diagram of the device 10 shown in FIG. 1 is intended to be a high-level control diagram depicting various components that may be included in such a device 10. That is, the connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively off-loading such tasks from a main processor (CPU).

With regard to each of the illustrated components in FIG. 1, the I/O ports 12 may include ports configured to connect to a variety of external devices, such as a power source, an audio output device (e.g., headset or headphones), or other electronic devices (such as handheld devices and/or computers, printers, projectors, external displays, modems, docking stations, and so forth). In one embodiment, the I/O ports 12 may be configured to connect to an external imaging device, such as a digital camera, for the acquisition of image data that may be processed using the image processing circuitry 32. The I/O ports 12 may support any suitable interface type, such as a universal serial bus (USB) port, a serial connection port, an IEEE-1394 (FireWire) port, an Ethernet or modem port, and/or an AC/DC power connection port.

In some embodiments, certain I/O ports 12 may be configured to provide for more than one function. For instance, in one embodiment, the I/O ports 12 may include a proprietary port from Apple Inc. that may function not only to facilitate the transfer of data between the electronic device 10 and an external source, but also to couple the device 10 to a power charging interface such as an power adapter designed to provide power from a electrical wall outlet, or an interface cable configured to draw power from another electrical device, such as a desktop or laptop computer, for charging the power source 26 (which may include one or more rechargeable batteries). Thus, the I/O port 12 may be configured to function dually as both a data transfer port and an AC/DC power connection port depending, for example, on the external component being coupled to the device 10 via the I/O port 12.

The input structures 14 may provide user input or feedback to the processor(s) 16. For instance, input structures 14 may be configured to control one or more functions of electronic device 10, such as applications running on electronic device 10. By way of example only, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) displayed on device 10. Additionally, input structures 14 may include a touch sensitive mechanism provided in conjunction with display 28. In such embodiments, a user may select or interact with displayed interface elements via the touch sensitive mechanism.

The input structures 14 may include the various devices, circuitry, and pathways by which user input or feedback is provided to one or more processors 16. Such input structures 14 may be configured to control a function of the device 10, applications running on the device 10, and/or any interfaces or devices connected to or used by the electronic device 10. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and the display device 28 may be provided together, such as in the case of a "touchscreen," whereby a touch-sensitive mechanism is provided in conjunction with the display 28. In such embodiments, the user may select or interact with displayed interface elements via the touch-sensitive mechanism. In this way, the displayed interface may provide interactive functionality, allowing a user to navigate the displayed interface by touching the display 28. For example, user interaction with the input structures 14, such as to interact with a user or application interface displayed on the display 26, may generate electrical signals indicative of the user input. These input signals may be routed via suitable pathways, such as an input hub or data bus, to the one or more processors 16 for further processing.

In addition to processing various input signals received via the input structure(s) 14, the processor(s) 16 may control the general operation of the device 10. For instance, the processor(s) 16 may provide the processing capability to execute an operating system, programs, user and application interfaces, and any other functions of the electronic device 10. The processor(s) 16 may include one or more microprocessors, such as one or more "general-purpose" microprocessors, one or more special-purpose microprocessors and/or application-specific microprocessors (ASICs), or a combination of such processing components. For example, the processor(s) 16 may include one or more instruction set (e.g., RISC) processors, as well as graphics processors (GPU), video processors, audio processors and/or related chip sets. As will be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, or Preview®, available from Apple Inc., or the "Camera" and/or "Photo" applications provided by Apple Inc. and available on models of the iPhone®.

The instructions or data to be processed by the processor(s) 16 may be stored in a computer-readable medium, such as a memory device 18. The memory device 18 may be provided as a volatile memory, such as random access memory (RAM) or as a non-volatile memory, such as read-only memory (ROM), or as a combination of one or more RAM and ROM devices. The memory 18 may store a variety of information and may be used for various purposes. For example, the memory 18 may store firmware for the electronic device 10, such as a basic input/output system (BIOS), an operating system, various programs, applications, or any other routines that may be executed on the electronic device 10, including user interface functions, processor functions, and so forth. In addition, the memory 18 may be used for buffering or caching during operation of the electronic device 10. For instance, in one embodiment, the memory 18 include one or more frame buffers for buffering video data as it is being output to the display 28.

In addition to the memory device 18, the electronic device 10 may further include a non-volatile storage 20 for persistent storage of data and/or instructions. The non-volatile storage 20 may include flash memory, a hard drive, or any other optical, magnetic, and/or solid-state storage media, or some combination thereof. Thus, although depicted as a single device in FIG. 1 for purposes of clarity, it should understood that the non-volatile storage device(s) 20 may include a combination of one or more of the above-listed storage devices operating in conjunction with the processor(s) 16. The non-volatile storage 20 may be used to store firmware, data files, image data, software programs and applications, wireless connection information, personal information, user preferences, and any other suitable data. In accordance with aspects of the present disclosure, image data stored in the non-volatile storage 20 and/or the memory device 18 may be processed by the image processing circuitry 32 prior to being output on a display.

The embodiment illustrated in FIG. 1 may also include one or more card or expansion slots. The card slots may be configured to receive an expansion card 22 that may be used to add functionality, such as additional memory, I/O functionality, or networking capability, to the electronic device 10. Such an expansion card 22 may connect to the device through any type of suitable connector, and may be accessed internally or external with respect to a housing of the electronic device 10. For example, in one embodiment, the expansion card 24 may be flash memory card, such as a SecureDigital (SD) card, mini- or microSD, CompactFlash card, or the like, or may be a PCMCIA device. Additionally, the expansion card 24 may be a Subscriber Identity Module (SIM) card, for use with an embodiment of the electronic device 10 that provides mobile phone capability.

The electronic device 10 also includes the network device 24, which may be a network controller or a network interface card (NIC) that may provide for network connectivity over a wireless 802.11 standard or any other suitable networking standard, such as a local area network (LAN), a wide area network (WAN), such as an Enhanced Data Rates for GSM Evolution (EDGE) network, a 3G data network, or the Internet. In certain embodiments, the network device 24 may provide for a connection to an online digital media content provider, such as the iTunes® music service, available from Apple Inc.

The power source 26 of the device 10 may include the capability to power the device 10 in both non-portable and portable settings. For example, in a portable setting, the device 10 may include one or more batteries, such as a Li-Ion battery, for powering the device 10. The battery may be recharged by connecting the device 10 to an external power source, such as to an electrical wall outlet. In a non-portable setting, the power source 26 may include a power supply unit (PSU) configured to draw power from an electrical wall outlet, and to distribute the power to various components of a non-portable electronic device, such as a desktop computing system.

The display 28 may be used to display various images generated by device 10, such as a GUI for an operating system, or image data (including still images and video data) processed by the image processing circuitry 32, as will be discussed further below. As mentioned above, the image data may include image data acquired using the imaging device 30 or image data retrieved from the memory 18 and/or non-volatile storage 20. The display 28 may be any suitable type of display, such as a liquid crystal display (LCD), plasma display, or an organic light emitting diode (OLED) display, for example. Additionally, as discussed above, the display 28 may be provided in conjunction with the above-discussed touch-sensitive mechanism (e.g., a touch screen) that may function as part of a control interface for the electronic device 10.

The illustrated imaging device(s) 30 may be provided as a digital camera configured to acquire both still images and moving images (e.g., video). The camera 30 may include a lens and one or more image sensors configured to capturing and converting light into electrical signals. By way of example only, the image sensor may include a CMOS image sensor (e.g., a CMOS active-pixel sensor (APS)) or a CCD (charge-coupled device) sensor. Generally, the image sensor in the camera 30 includes an integrated circuit having an array of pixels, wherein each pixel includes a photodetector for sensing light. As those skilled in the art will appreciate, the photodetectors in the imaging pixels generally detect the intensity of light captured via the camera lenses. However, photodetectors, by themselves, are generally unable to detect the wavelength of the captured light and, thus, are unable to determine color information.

Accordingly, the image sensor may further include a color filter array (CFA) that may overlay or be disposed over the pixel array of the image sensor to capture color information. The color filter array may include an array of small color filters, each of which may overlap a respective pixel of the image sensor and filter the captured light by wavelength. Thus, when used in conjunction, the color filter array and the photodetectors may provide both wavelength and intensity information with regard to light captured through the camera, which may be representative of a captured image.

In one embodiment, the color filter array may include a Bayer color filter array, which provides a filter pattern that is 50% green elements, 25% red elements, and 25% blue elements. For instance, FIG. 2 shows a 2×2 pixel block of a Bayer CFA includes 2 green elements (Gr and Gb), 1 red element (R), and 1 blue element (B). Thus, an image sensor that utilizes a Bayer color filter array may provide information regarding the intensity of the light received by the camera 30 at the green, red, and blue wavelengths, whereby each image pixel records only one of the three colors (RGB). This information, which may be referred to as "raw image data" or data in the "raw domain," may then be processed using one or more demosaicing techniques to convert the raw image data into a full color image, generally by interpolating a set of red, green, and blue values for each pixel. As will be discussed further below, such demosaicing techniques may be performed by the image processing circuitry 32.

As mentioned above, the image processing circuitry 32 may provide for various image processing steps, such as defective pixel detection/correction, lens shading correction, demosaicing, and image sharpening, noise reduction, gamma correction, image enhancement, color-space conversion, image compression, chroma sub-sampling, and image scaling operations, and so forth. In some embodiments, the image processing circuitry 32 may include various subcomponents and/or discrete units of logic that collectively form an image processing "pipeline" for performing each of the various image processing steps. These subcomponents may be implemented using hardware (e.g., digital signal processors or ASICs) or software, or via a combination of hardware and software components. The various image processing operations that may be provided by the image processing circuitry 32 and, particularly those processing operations relating to defective pixel detection/correction, lens shading correction, demosaicing, and image sharpening, will be discussed in greater detail below.

Before continuing, it should be noted that while various embodiments of the various image processing techniques discussed below may utilize a Bayer CFA, the presently disclosed techniques are not intended to be limited in this regard. Indeed, those skilled in the art will appreciate that the image processing techniques provided herein may be applicable to any suitable type of color filter array, including RGBW filters, CYGM filters, and so forth.

Figure 4:
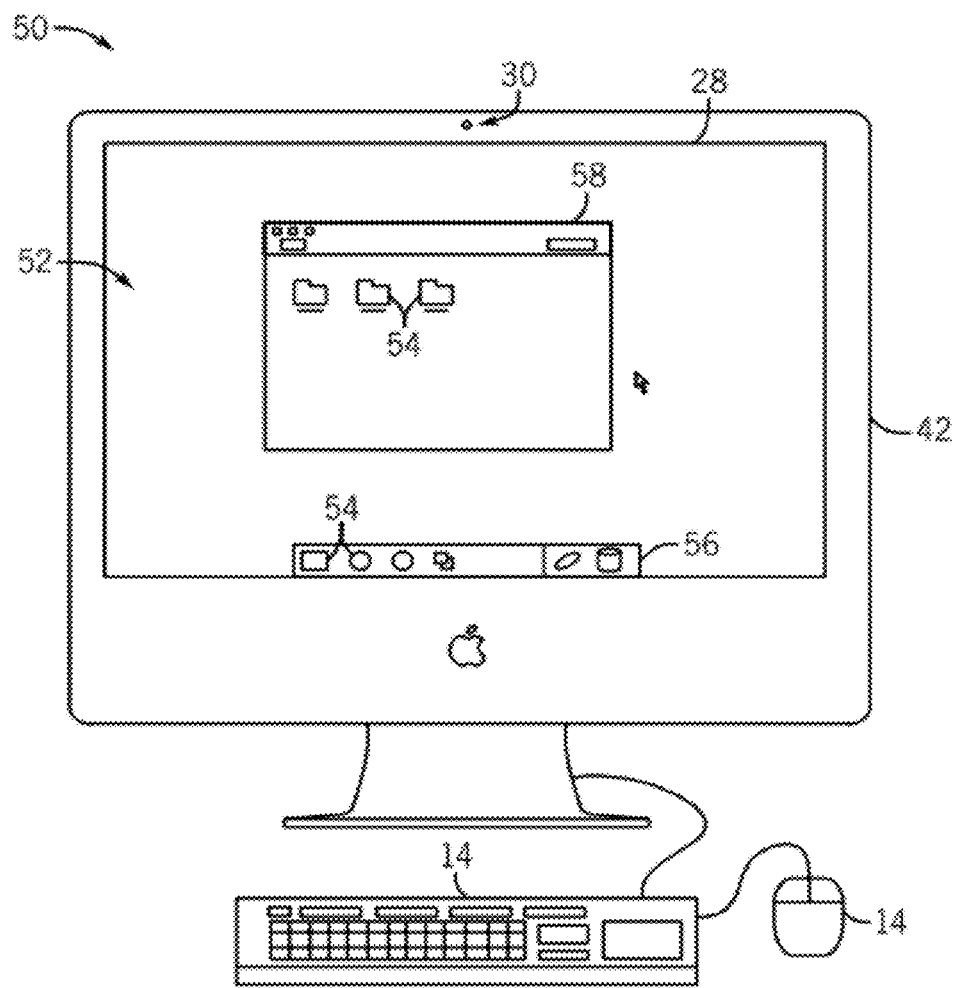
FIG. 4 is a front view of the electronic device of FIG. 1 in the form of a desktop computing device, in accordance with aspects of the present disclosure.
Figure 5:
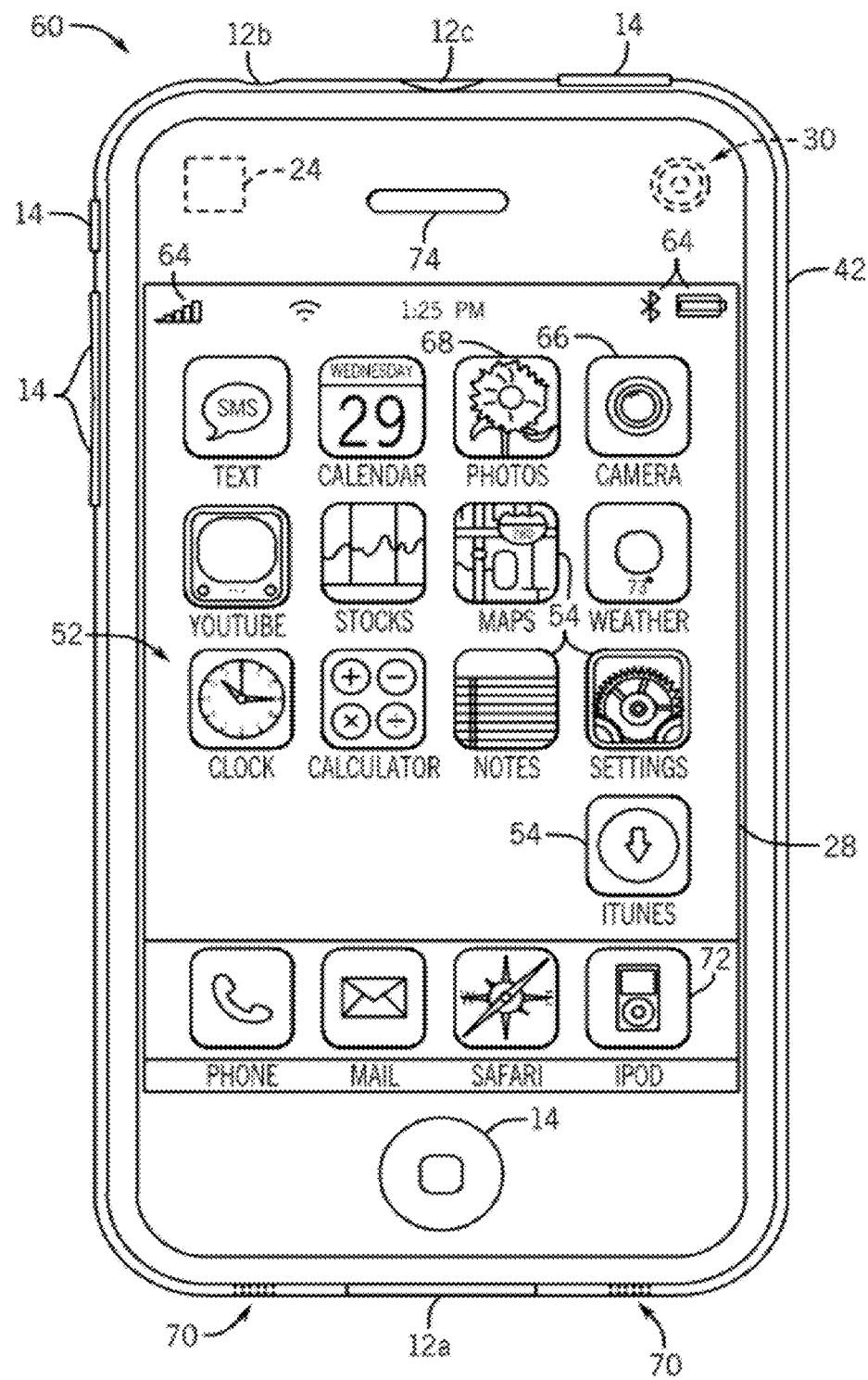
FIG. 5 is a front view of the electronic device of FIG. 1 in the form of a handheld portable electronic device, in accordance with aspects of the present disclosure.
Figure 6:
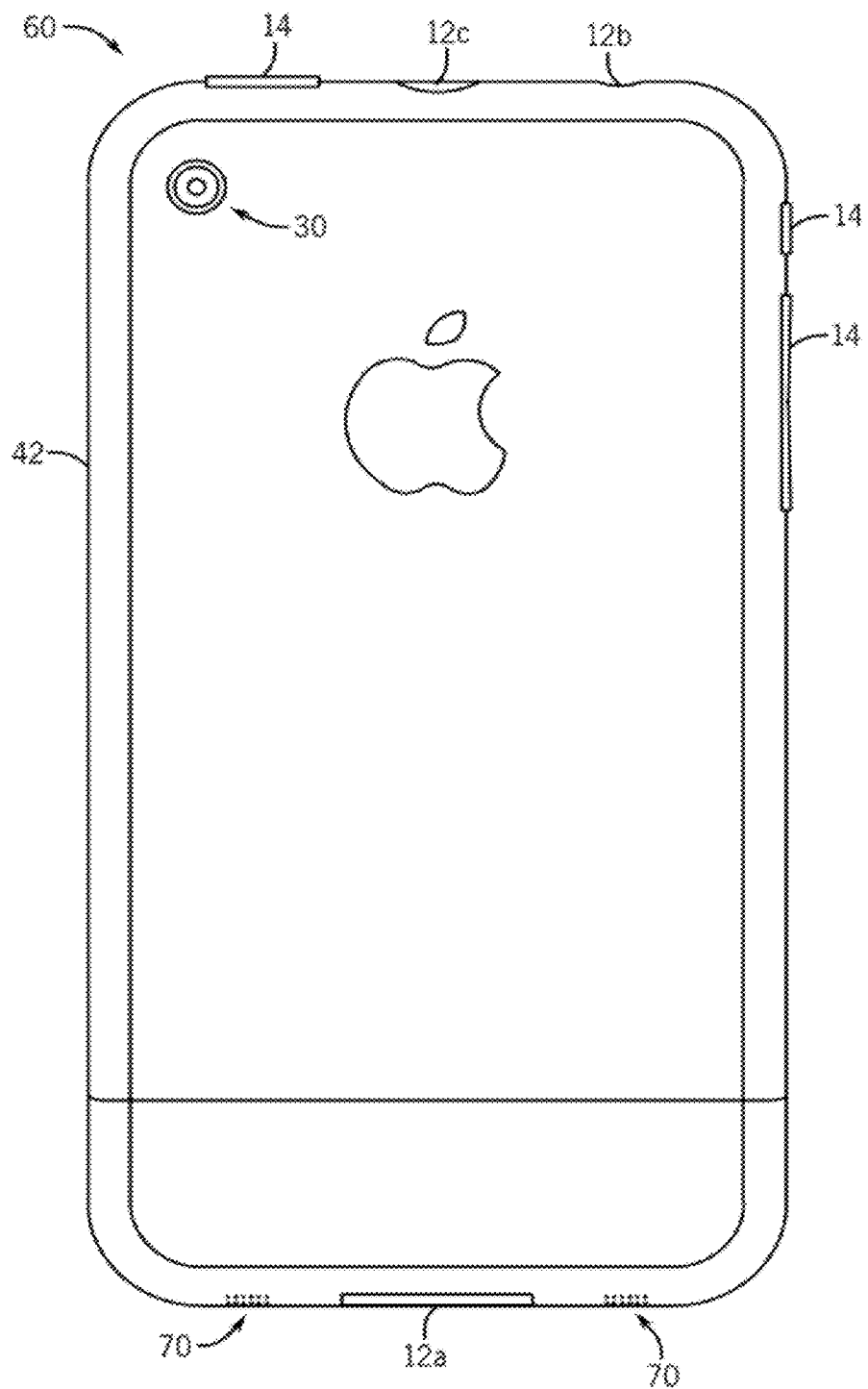
FIG. 6 is a rear view of the electronic device shown in FIG. 5.

Referring again to the electronic device 10, FIGS. 3-6 illustrate various forms that the electronic device 10 may take. As mentioned above, the electronic device 10 may take the form of a computer, including computers that are generally portable (such as laptop, notebook, and tablet computers) as well as computers that are generally non-portable (such as desktop computers, workstations and/or servers), or other type of electronic device, such as handheld portable electronic devices (e.g., digital media player or mobile phone). In particular, FIGS. 3 and 4 depict the electronic device 10 in the form of a laptop computer 40 and a desktop computer 50, respectively. FIGS. 5 and 6 show front and rear views, respectively, of the electronic device 10 in the form of a handheld portable device 60.

As shown in FIG. 3, the depicted laptop computer 40 includes a housing 42, the display 28, the I/O ports 12, and the input structures 14. The input structures 14 may include a keyboard and a touchpad mouse that are integrated with the housing 42. Additionally, the input structure 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 40 may include network connectivity (e.g., network device 26), memory (e.g., memory 20), and storage capabilities (e.g., storage device 22), as described above with respect to FIG. 1.

Further, the laptop computer 40, in the illustrated embodiment, may include an integrated imaging device 30 (e.g., camera). In other embodiments, the laptop computer 40 may utilize an external camera (e.g., an external USB camera or a "webcam") connected to one or more of the I/O ports 12 instead of or in addition to the integrated camera 30. For instance, an external camera may be an iSight® camera available from Apple Inc. The camera 30, whether integrated or external, may provide for the capture and recording of images. Such images may then be viewed by a user using an image viewing application, or may be utilized by other applications, including video-conferencing applications, such as iChat®, and image editing/viewing applications, such as Photo Booth®, Aperture®, iPhoto®, or Preview®, which are available from Apple Inc. In certain embodiments, the depicted laptop computer 40 may be a model of a MacBook®, MacBook® Pro, MacBook Air®, or PowerBook® available from Apple Inc.

FIG. 4 further illustrates an embodiment in which the electronic device 10 is provided as a desktop computer 50. As will be appreciated, the desktop computer 50 may include a number of features that may be generally similar to those provided by the laptop computer 40 shown in FIG. 4, but may have a generally larger overall form factor. As shown, the desktop computer 50 may be housed in an enclosure 42 that includes the display 28, as well as various other components discussed above with regard to the block diagram shown in FIG. 1. Further, the desktop computer 50 may include an external keyboard and mouse (input structures 14) that may be coupled to the computer 50 via one or more I/O ports 12 (e.g., USB) or may communicate with the computer 50 wirelessly (e.g., RF, Bluetooth, etc.). The desktop computer 50 also includes an imaging device 30, which may be an integrated or external camera, as discussed above. In certain embodiments, the depicted desktop computer 50 may be a model of an iMac®, Mac® mini, or Mac Pro®, available from Apple Inc.

As further shown, the display 28 may be configured to generate various images that may be viewed by a user. For example, during operation of the computer 50, the display 28 may display a graphical user interface ("GUI") 52 that allows the user to interact with an operating system and/or application running on the computer 50. The GUI 52 may include various layers, windows, screens, templates, or other graphical elements that may be displayed in all, or a portion, of the display device 28. For instance, in the depicted embodiment, an operating system GUI 52 may include various graphical icons 54, each of which may correspond to various applications that may be opened or executed upon detecting a user selection (e.g., via keyboard/mouse or touchscreen input). The icons 54 may be displayed in a dock 56 or within one or more graphical window elements 58 displayed on the screen. In some embodiments, the selection of an icon 54 may lead to a hierarchical navigation process, such that selection of an icon 54 leads to a screen or opens another graphical window that includes one or more additional icons or other GUI elements. By way of example only, the operating system GUI 52 displayed in FIG. 4 may be from a version of the Mac OS® operating system, available from Apple Inc.

Continuing to FIGS. 5 and 6, the electronic device 10 is further illustrated in the form of portable handheld electronic device 60, which may be a model of an iPod® or iPhone® available from Apple Inc. In the depicted embodiment, the handheld device 60 includes an enclosure 42, which may function to protect the interior components from physical damage and to shield them from electromagnetic interference. The enclosure 42 may be formed from any suitable material or combination of materials, such as plastic, metal, or a composite material, and may allow certain frequencies of electromagnetic radiation, such as wireless networking signals, to pass through to wireless communication circuitry (e.g., network device 24), which may be disposed within the enclosure 42, as shown in FIG. 5.

The enclosure 42 also includes various user input structures 14 through which a user may interface with the handheld device 60. For instance, each input structure 14 may be configured to control one or more respective device functions when pressed or actuated. By way of example, one or more of the input structures 14 may be configured to invoke a "home" screen 42 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 60 may include any number of suitable user input structures existing in various forms including buttons, switches, keys, knobs, scroll wheels, and so forth.

As shown in FIG. 5, the handheld device 60 may include various I/O ports 12. For instance, the depicted I/O ports 12 may include a proprietary connection port 12a for transmitting and receiving data files or for charging a power source 26 and an audio connection port 12b for connecting the device 60 to an audio output device (e.g., headphones or speakers). Further, in embodiments where the handheld device 60 provides mobile phone functionality, the device 60 may include an I/O port 12c for receiving a subscriber identify module (SIM) card (e.g., an expansion card 22).

The display device 28, which may be an LCD, OLED, or any suitable type of display, may display various images generated by the handheld device 60. For example, the display 28 may display various system indicators 64 providing feedback to a user with regard to one or more states of handheld device 60, such as power status, signal strength, external device connections, and so forth. The display may also display a GUI 52 that allows a user to interact with the device 60, as discussed above with reference to FIG. 4. The GUI 52 may include graphical elements, such as the icons 54 which may correspond to various applications that may be opened or executed upon detecting a user selection of a respective icon 54. By way of example, one of the icons 54 may represent a camera application 66 that may be used in conjunction with a camera 30 (shown in phantom lines in FIG. 5) for acquiring images. Referring briefly to FIG. 6, a rear view of the handheld electronic device 60 depicted in FIG. 5 is illustrated, which shows the camera 30 as being integrated with the housing 42 and positioned on the rear of the handheld device 60.

As mentioned above, image data acquired using the camera 30 may be processed using the image processing circuitry 32, which my include hardware (e.g., disposed within the enclosure 42) and/or software stored on one or more storage devices (e.g., memory 18 or non-volatile storage 20) of the device 60. Images acquired using the camera application 66 and the camera 30 may be stored on the device 60 (e.g., in storage device 20) and may be viewed at a later time using a photo viewing application 68.

The handheld device 60 may also include various audio input and output elements. For example, the audio input/output elements, depicted generally by reference numeral 70, may include an input receiver, such as one or more microphones. For instance, where the handheld device 60 includes cell phone functionality, the input receivers may be configured to receive user audio input, such as a user's voice. Additionally, the audio input/output elements 70 may include one or more output transmitters. Such output transmitters may include one or more speakers which may function to transmit audio signals to a user, such as during the playback of music data using a media player application 72. Further, in embodiments where the handheld device 60 includes a cell phone application, an additional audio output transmitter 74 may be provided, as shown in FIG. 5. Like the output transmitters of the audio input/output elements 70, the output transmitter 74 may also include one or more speakers configured to transmit audio signals to a user, such as voice data received during a telephone call. Thus, the audio input/output elements 70 and 74 may operate in conjunction to function as the audio receiving and transmitting elements of a telephone.

Having now provided some context with regard to various forms that the electronic device 10 may take, the present discussion will now focus on the image processing circuitry 32 depicted in FIG. 1. As mentioned above, the image processing circuitry 32 may be implemented using hardware and/or software components, and may include various processing units that define an image signal processing (ISP) pipeline. In particular, the following discussion may focus on aspects of the image processing techniques set forth in the present disclosure, particularly those relating to defective pixel detection/correction techniques, lens shading correction techniques, demosaicing techniques, and image sharpening techniques.

Figure 7:
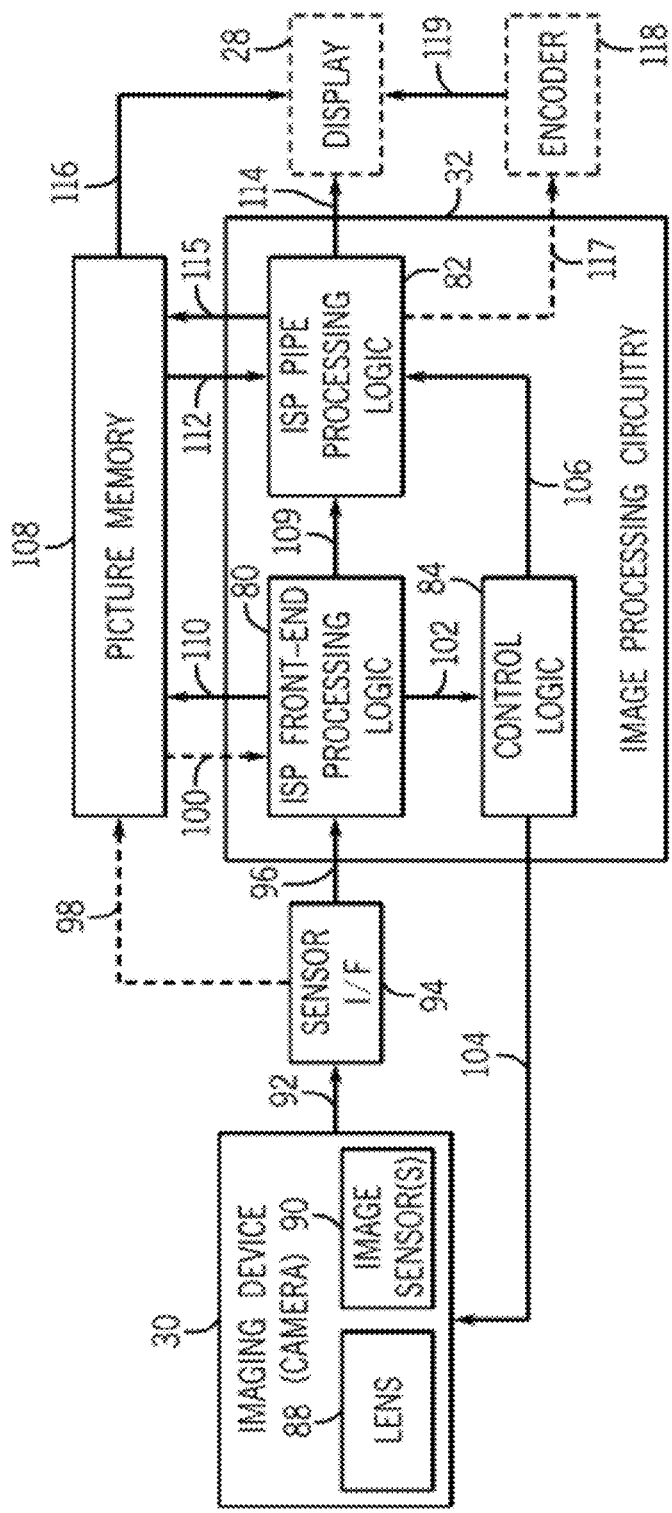
FIG. 7 is a block diagram illustrating front-end image signal processing (ISP) logic and ISP pipe processing logic that may be implemented in the image processing circuitry of FIG. 1, in accordance with aspects of the present disclosure.

Referring now to FIG. 7, a simplified top-level block diagram depicting several functional components that may be implemented as part of the image processing circuitry 32 is illustrated, in accordance with one embodiment of the presently disclosed techniques. Particularly, FIG. 7 is intended to illustrate how image data may flow through the image processing circuitry 32, in accordance with at least one embodiment. In order to provide a general overview of the image processing circuitry 32, a general description of how these functional components operate to process image data is provided here with reference to FIG. 7, while a more specific description of each of the illustrated functional components, as well as their respective sub-components, will be further provided below.

Referring to the illustrated embodiment, the image processing circuitry 32 may include image signal processing (ISP) front-end processing logic 80, ISP pipe processing logic 82, and control logic 84. Image data captured by the imaging device 30 may first be processed by the ISP front-end logic 80 and analyzed to capture image statistics that may be used to determine one or more control parameters for the ISP pipe logic 82 and/or the imaging device 30. The ISP front-end logic 80 may be configured to capture image data from an image sensor input signal. For instance, as shown in FIG. 7, the imaging device 30 may include a camera having one or more lenses 88 and image sensor(s) 90. As discussed above, the image sensor(s) 90 may include a color filter array (e.g., a Bayer filter) and may thus provide both light intensity and wavelength information captured by each imaging pixel of the image sensors 90 to provide for a set of raw image data that may be processed by the ISP front-end logic 80. For instance, the output 92 from the imaging device 30 may be received by a sensor interface 94, which may then provide the raw image data 96 to the ISP front-end logic 80 based, for example, on the sensor interface type. By way of example, the sensor interface 94 may utilize a Standard Mobile Imaging Architecture (SMIA) interface or a Mobile Industry Processor Interface (MIPI), or some combination thereof. In certain embodiments, the ISP front-end logic 80 may operate within its own clock domain and may provide an asynchronous interface to the sensor interface 94 to support image sensors of different sizes and timing requirements.

The raw image data 96 may be provided to the ISP front-end logic 80 and processed on a pixel-by-pixel basis in a number of formats. For instance, each image pixel may have a bit-depth of 8, 10, 12, or 14 bits. The ISP front-end logic 80 may perform one or more image processing operations on the raw image data 96, as well as collect statistics about the image data 96. The image processing operations, as well as the collection of statistical data, may be performed at the same or at different bit-depth precisions. For example, in one embodiment, processing of the raw image pixel data 96 may be performed at a precision of 14-bits. In such embodiments, raw pixel data received by the ISP front-end logic 80 that has a bit-depth of less than 14 bits (e.g., 8-bit, 10-bit, 12-bit) may be up-sampled to 14-bits for image processing purposes. In another embodiment, statistical processing may occur at a precision of 8-bits and, thus, raw pixel data having a higher bit-depth may be down-sampled to an 8-bit format for statistics purposes. As will be appreciated, down-sampling to 8-bits may reduce hardware size (e.g., area) and also reduce processing/computational complexity for the statistics data. Additionally, the raw image data may be averaged spatially to allow for the statistics data to be more robust to noise.

Further, as shown in FIG. 7, the ISP front-end logic 80 may also receive pixel data from the memory 108. For instance, as shown by reference number 98, the raw pixel data may be sent to the memory 108 from the sensor interface 94. The raw pixel data residing in the memory 108 may then be provided to the ISP front-end logic 80 for processing, as indicated by reference number 100. The memory 108 may be part of the memory device 18, the storage device 20, or may be a separate dedicated memory within the electronic device 10 and may include direct memory access (DMA) features. Further, in certain embodiments, the ISP front-end logic 80 may operate within its own clock domain and provide an asynchronous interface to the sensor interface 94 to support sensors of different sizes and having different timing requirements.

Upon receiving the raw image data 96 (from sensor interface 94) or 100 (from memory 108), the ISP front-end logic 80 may perform one or more image processing operations, such as temporal filtering and/or binning compensation filtering. The processed image data may then be provided to the ISP pipe logic 82 (output signal 109) for additional processing prior to being displayed (e.g., on display device 28), or may be sent to the memory (output signal 110). The ISP pipe logic 82 receives the "front-end" processed data, either directly form the ISP front-end logic 80 or from the memory 108 (input signal 112), and may provide for additional processing of the image data in the raw domain, as well as in the RGB and YCbCr color spaces. Image data processed by the ISP pipe logic 82 may then be output (signal 114) to the display 28 for viewing by a user and/or may be further processed by a graphics engine or GPU. Additionally, output from the ISP pipe logic 82 may be sent to memory 108 (signal 115) and the display 28 may read the image data from memory 108 (signal 116), which may, in certain embodiments, be configured to implement one or more frame buffers. Further, in some implementations, the output of the ISP pipe logic 82 may also be provided to a compression engine 118 (signal 117) for encoding the image data prior to being read by the display 28 (signal 119). By way of example, the compression engine or "encoder" 118 may be a JPEG compression engine for encoding still images, or an H.264 compression engine for encoding video images, or some combination thereof. Additional information with regard to image processing operations that may be provided in the ISP pipe logic 82 will be discussed in greater detail below with regard to FIGS. 27-57. Also, it should be noted that the ISP pipe logic 82 may also receive raw image data from the memory 108, as depicted by input signal 112.

Statistical data 102 determined by the ISP front-end logic 80 may be provided to a control logic unit 84. The statistical data 102 may include, for example, image sensor statistics relating to auto-exposure, auto-white balance, auto-focus, flicker detection, black level compensation (BLC), lens shading correction, and so forth. The control logic 84 may include a processor and/or microcontroller configured to execute one or more routines (e.g., firmware) that may be configured to determine, based upon the received statistical data 102, control parameters 104 for the imaging device 30, as well as control parameters 106 for the ISP pipe processing logic 82. By way of example only, the control parameters 104 may include sensor control parameters (e.g., gains, integration time for exposure control), camera flash control parameters, lens control parameters (e.g., focal length for focusing or zoom), or a combination of such parameters. The ISP control parameters 106 may include gain levels and color correction matrix (CCM) coefficients for auto-white balance and color adjustment (e.g., during RGB processing), as well as lens shading correction parameters which, as discussed below, may be determined based upon white point balance parameters. In some embodiments, the control logic 84 may, in addition to analyzing statistics data 102, also analyze historical statistics, which may be stored on the electronic device 10 (e.g., in memory 18 or storage 20).

Due to the generally complex design of the image processing circuitry 32 shown herein, it may be beneficial to separate the discussion of the ISP front-end logic 80 and the ISP pipe processing logic 82 into separate sections, as shown below. Particularly, FIGS. 8 to 26 of the present application may relate to the discussion of various embodiments and aspects of the ISP front-end logic 80, while FIGS. 27 to 57 of the present application may relate to the discussion of various embodiments and aspects of the ISP pipe processing logic 82.

The ISP Front-End Processing Logic

Figure 8:
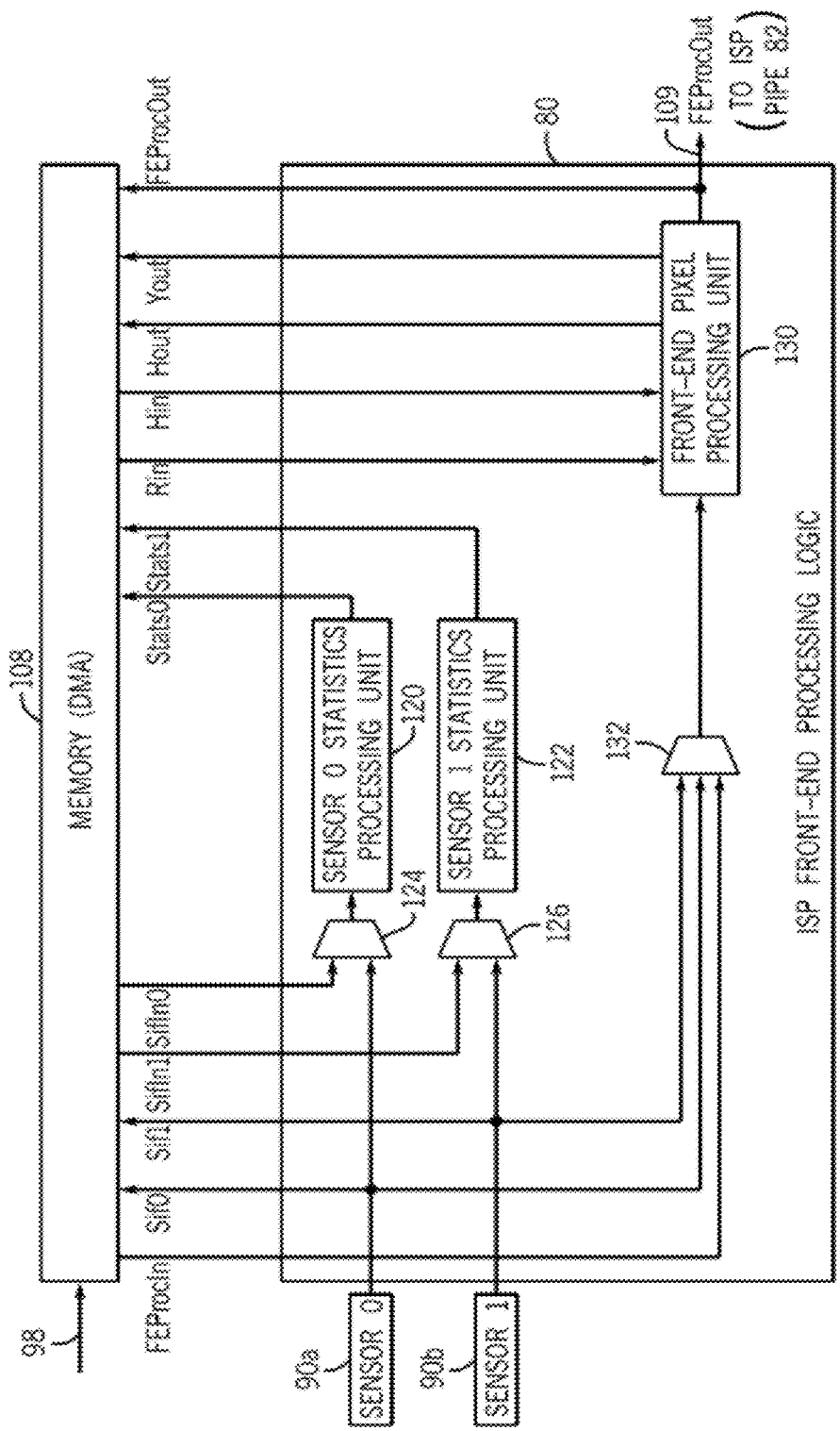
FIG. 8 is a more detailed block diagram showing an embodiment of the ISP front-end logic of FIG. 7, in accordance with aspects of the present disclosure.

FIG. 8 is a more detailed block diagram showing functional logic blocks that may be implemented in the ISP front-end logic 80, in accordance with one embodiment. Depending on the configuration of the imaging device 30 and/or sensor interface 94, as discussed above in FIG. 7, raw image data may be provided to the ISP front-end logic 80 by one or more image sensors 90. In the depicted embodiment, raw image data may be provided to the ISP front-end logic 80 by a first image sensor 90a (Sensor0) and a second image sensor 90b (Sensor1). As shown, the image sensors 90a and 90b may provide the raw image data as signals Sif0 and Sif1, respectively. Each of the image sensors 90a and 90b may be associated with the respective statistics processing units 120 and 122.

Further, it should be noted that the raw image data Sif0 and Sif1 may be provided directly to their respective processing units 120 and 122, or may be stored in or written to the memory 108 and subsequently retrieved as signals SifIn0 and SifIn1, respectively. Thus, the ISP front-end logic 80 may include selection logic 124, which may provide either the Sif0 or SifIn0 signals representative of raw image data captured by Sensor0 (90a) to the statistics processing unit 120, and may also include the selection logic 126, which may provide either the Sif1 or SifIn1 signals representative of raw image data captured by Sensor1 (90b) to the statistics processing unit 122. Each of the statistics processing units 120 and 122 may determine various statistical data obtained via analysis of the raw image sensor data, and may respective sets of statistics, as indicated by the output signals Stats0 and Stats1. As mentioned above, the statistical data (Stats0 and Stats1) may be provided to the control logic 84 for the determination of various control parameters that may be used to operate the imaging device 30 and/or the ISP pipe processing logic 82.

In addition to the statistics processing units 120 and 122, the ISP front-end logic 80 may further include a pixel processing unit 130. The pixel processing unit 130 may perform various image processing operations on the raw image data on a pixel-by-pixel basis. As shown, the pixel processing unit 130, by way of the selection logic 132, may receive the raw image signals Sif0 (from Sensor0) or Sif1 (from Sensor1), or may receive raw image data FEProcIn from the memory 108. As can be appreciated, the selection logic blocks (120, 122, and 132) shown in FIG. 8 may be provided by any suitable type of logic, such as a multiplexer that selects one of multiple input signals in response to a control signal. The pixel processing unit 130 may also receive and output various signals (e.g., Rin, Hin, Hout, and Yout—which may represent motion history and luma data used during temporal filtering) when performing the pixel processing operations, as will be discussed further below. The output 109 (FEProcOut) of the pixel processing unit 130 may then be forwarded to the ISP pipe logic 82, such as via one or more first-in-first-out (FIFO) queues, or may be sent to the memory 108.

Figure 9:
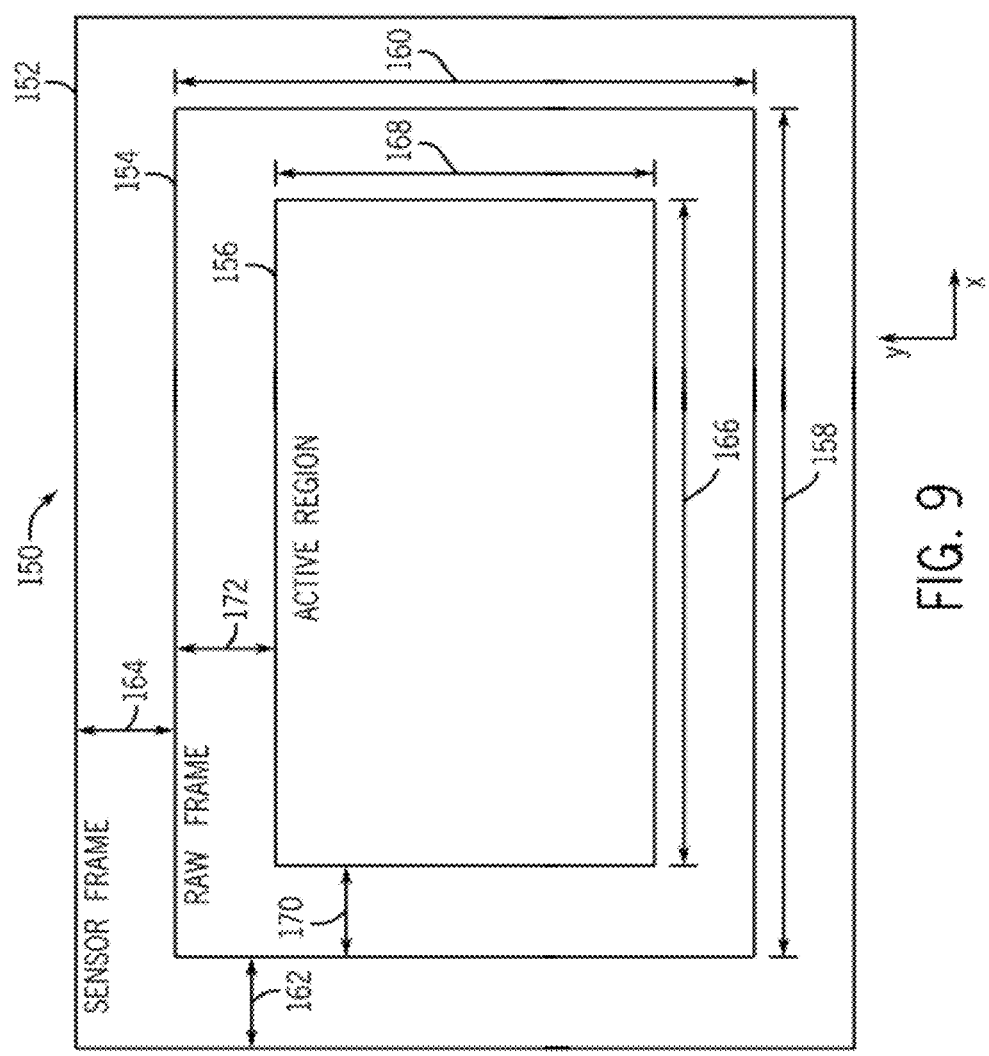
FIG. 9 is graphical depiction of various imaging regions that may be defined within a source image frame captured by an image sensor, in accordance with aspects of the present disclosure.

Before continuing with a more detailed description of the statistics processing and pixel processing operations depicted in the ISP front-end logic 80 of FIG. 8, it is believed that a brief introduction regarding the definitions of various ISP frame regions will help to facilitate a better understanding of the present subject matter. With this in mind, various frame regions that may be defined within an image source frame are illustrated in FIG. 9. The format for a source frame provided to the image processing circuitry 32 may use either the tiled or linear addressing modes discussed above, as may utilize pixel formats in 8, 10, 12, or 14-bit precision. The image source frame 150, as shown in FIG. 9, may include a sensor frame region 152, a raw frame region 152, and an active region 154. The sensor frame 152 is generally the maximum frame size that the image sensor 90 can provide to the image processing circuitry 32. The raw frame region 154 may be defined as the region of the sensor frame 152 that is sent to the ISP front-end processing logic 80. The active region 156 may be defined as a portion of the source frame 150, typically within the raw frame region 154, on which processing is performed for a particular image processing operation. In accordance with embodiments of the present technique, that active region 156 may be the same or may be different for different image processing operations.

In accordance with aspects of the present technique, the ISP front-end logic 80 only receives the raw frame 154. Thus, for the purposes of the present discussion, the global frame size for the ISP front-end processing logic 80 may be assumed as the raw frame size, as determined by the width 158 and height 160. In some embodiments, the offset from the boundaries of the sensor frame 152 to the raw frame 154 may be determined and/or maintained by the control logic 84. For instance, the control logic 84 may be include firmware that may determine the raw frame region 154 based upon input parameters, such as the x-offset 162 and the y-offset 164, that are specified relative to the sensor frame 152. Further, in some cases, a processing unit within the ISP front-end logic 80 or the ISP pipe logic 82 may have a defined active region, such that pixels in the raw frame but outside the active region 156 will not be processed, i.e., left unchanged. For instance, an active region 156 for a particular processing unit having a width 166 and height 168 may be defined based upon an x-offset 170 and y-offset 172 relative to the raw frame 154. Further, where an active region is not specifically defined, one embodiment of the image processing circuitry 32 may assume that the active region 156 is the same as the raw frame 154 (e.g., x-offset 170 and y-offset 172 are both equal to 0). Thus, for the purposes of image processing operations performed on the image data, boundary conditions may be defined with respect to the boundaries of the raw frame 154 or active region 156.

Figure 10:
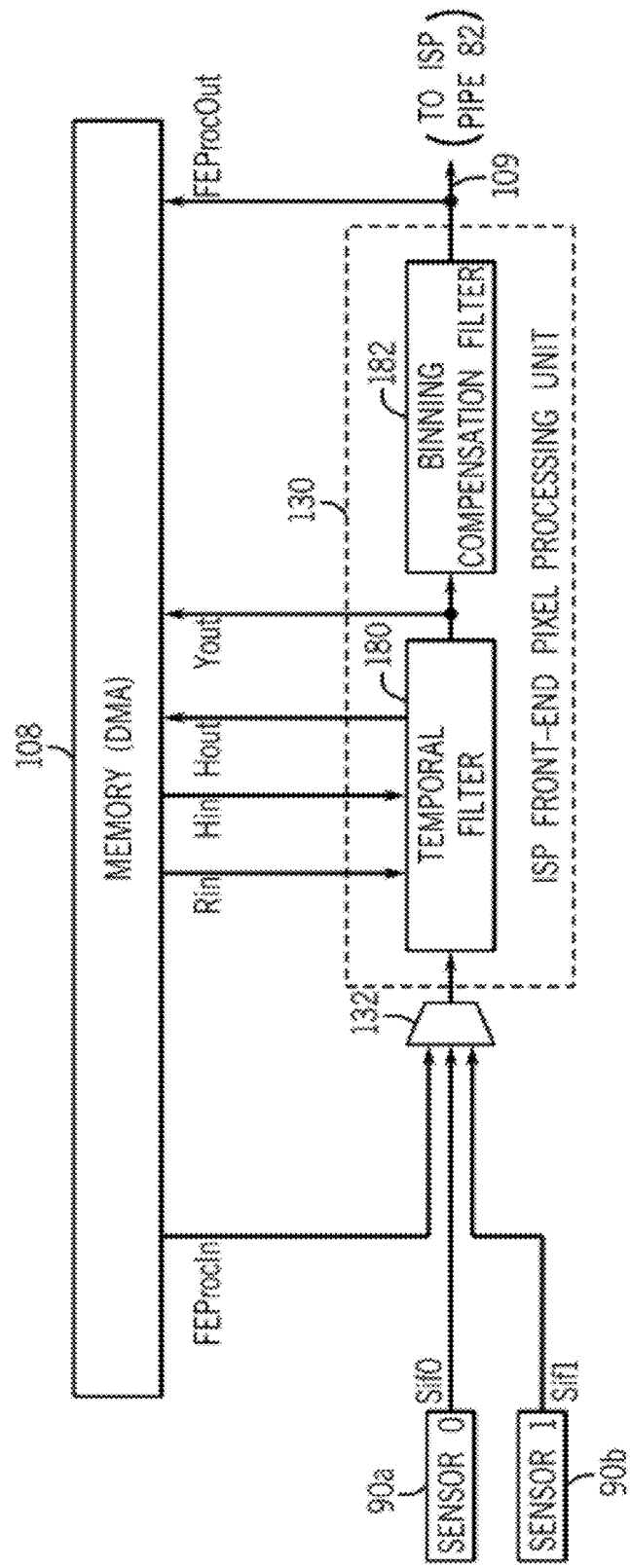
FIG. 10 is a block diagram that provides a more detailed view of one embodiment of the ISP front-end pixel processing unit, as shown in the ISP front-end logic of FIG. 8, in accordance with aspects of the present disclosure.

Keeping these points in mind and referring to FIG. 10, a more detailed view of the ISP front-end pixel processing logic 130 (previously discussed in FIG. 8) is illustrated, in accordance with an embodiment of the present technique. As shown, the ISP front-end pixel processing logic 130 includes a temporal filter 180 and a binning compensation filter 182. The temporal filter 180 may receive one of the input image signals Sif0, Sif1, or FEProcIn, and may operate on the raw pixel data before any additional processing is performed. For example, the temporal filter 180 may initially process the image data to reduce noise by averaging image frames in the temporal direction.

The temporal filter 180 may be pixel-adaptive based upon motion and brightness characteristics. For instance, when pixel motion is high, the filtering strength may be reduced in order to avoid the appearance of "trailing" or "ghosting artifacts" in the resulting processed image, whereas the filtering strength may be increased when little or no motion is detected. Additionally, the filtering strength may also be adjusted based upon brightness data (e.g., "luma"). For instance, as image brightness increases, filtering artifacts may become more noticeable to the human eye. Thus, the filtering strength may be further reduced when a pixel has a high level of brightness.

In applying temporal filtering, the temporal filter 180 may receive reference pixel data (Rin) and motion history input data (Hin), which may be from a previous filtered or original frame. Using these parameters, the temporal filter 180 may provide motion history output data (Hout) and filtered pixel output (Yout). The filtered pixel output Yout is then passed to the binning compensation filter 182, which may be configured to perform one or more scaling operations on the filtered pixel output data Yout to produce the output signal FEProcOut. The processed pixel data FEProcOut may then be forwarded to the ISP pipe processing logic 82, as discussed above.

Figure 11:
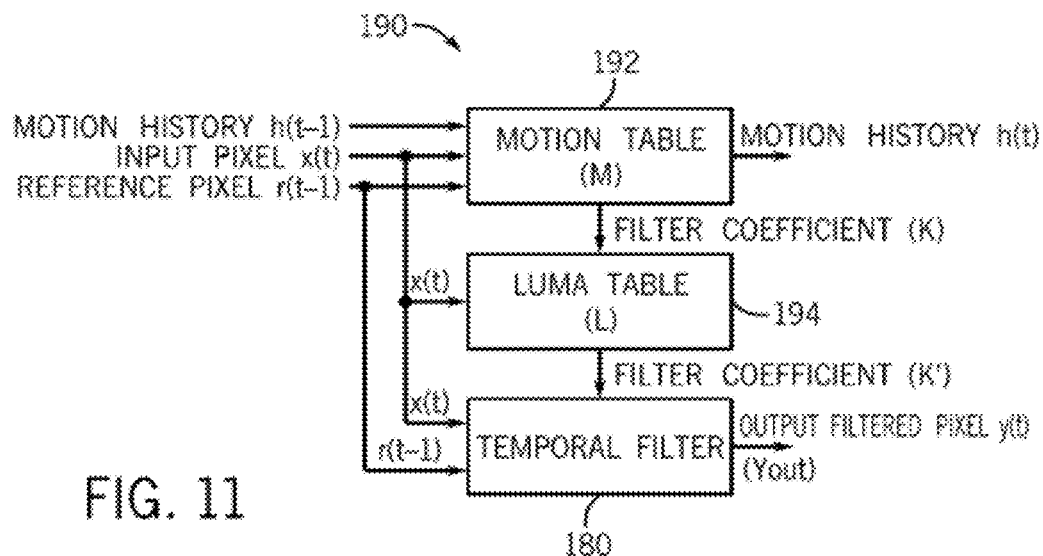
FIG. 11 is a process diagram illustrating how temporal filtering may be applied to image pixel data received by the ISP front-end pixel processing unit shown in FIG. 10, in accordance with one embodiment.
Figure 12:
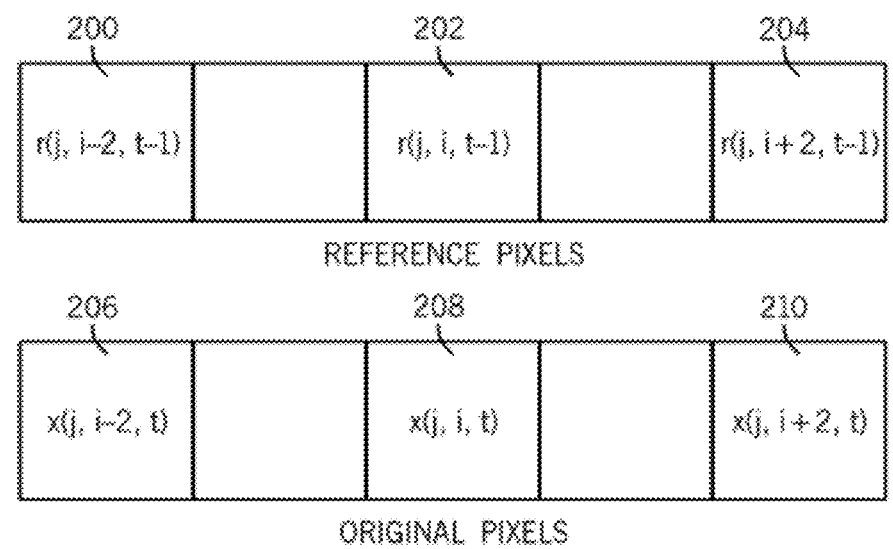
FIG. 12 illustrates a set of reference image pixels and a set of corresponding current image pixels that may be used to determine one or more parameters for the temporal filtering process shown in FIG. 11.

Referring to FIG. 11, a process diagram depicting a temporal filtering process 190 that may be performed by the temporal filter shown in FIG. 10 is illustrated, in accordance with one embodiment. The temporal filter 180 may include a 2-tap filter, wherein the filter coefficients are adjusted adaptively on a per pixel basis based at least partially upon motion and brightness data. For instance, input pixels x(t), with the variable "t" denoting a temporal value, may be compared to reference pixels r(t−1) in a previously filtered frame or a previous original frame to generate a motion index lookup in a motion history table (M) 192 that may contain filter coefficients. Additionally, based upon motion history input data h(t−1), a motion history output h(t) corresponding to the current input pixel x(t) may be determined.

The motion history output h(t) and a filter coefficient, K, may be determined based upon a motion delta d(j,i,t), wherein (j,i) represent coordinates of the spatial location of a current pixel x(j,i,t). The motion delta d(j,i,t) may be computed by determining the maximum of three absolute deltas between original and reference pixels for three horizontally collocated pixels of the same color. For instance, referring briefly to FIG. 12, the spatial locations of three collocated reference pixels 200, 202, and 204 that corresponding to original input pixels 206, 208, and 210 are illustrated. In one embodiment, the motion delta may be calculated based on these original and reference pixels using formula below:

$$d(j,i,t)=\max 3[abs(x(j,i-2,t)-r(j,i-2,t)),(abs(x(j,i,t)-r(j,i,t)),(abs(x(j,i+2,t)-r(j,i+2,t))] \quad (1)$$

Referring back to FIG. 11, once the motion delta value is determined, a motion index lookup that may be used to selected the filter coefficient K from the motion table (M) 192 may be calculated by summing the motion delta d(t) for the current pixel (e.g., at spatial location (j,i)) with the motion history input h(t−1). For instance, the filter coefficient K may be determined as follows:

$$K=M[d(j,i,t)+h(j,i,t-1)] \quad (2)$$

Additionally, the motion history output h(t) may be determined using the following formula:

$$h(j,i,t)=d(j,i,t)+(1-K)\times h(j,i,t-1) \quad (3)$$

Next, the brightness of the current input pixel x(t) may be used to generate a luma index lookup in a luma table (L) 194. In one embodiment, the luma table may contain attenuation factors that may be between 0 and 1, and may be selected based upon the luma index. A second filter coefficient, K', may be calculated by multiplying the first filter coefficient K by the luma attenuation factor, as shown in the following equation:

$$K'=K\times L[x(j,i,t)] \quad (4)$$

The determined value for K' may then be used as the filtering coefficient for the temporal filter 180. As discussed above, the temporal filter 180 may be a 2-tap filter. Additionally, the temporal filter 180 may be configured as an infinite impulse response (IIR) filter using previous filtered frame or as a finite impulse response (FIR) filter using previous original frame. The temporal filter 180 may compute the filtered output pixel y(t) (Yout) using the current input pixel x(t), the reference pixel r(t−1), and the filter coefficient K' using the following formula:

$$y(j,i,t)=r(j,i,t-1)+K'(x(j,i,t)-r(j,i,t-1)) \quad (5)$$

As discussed above, the temporal filtering process 190 shown in FIG. 11 may be performed on a pixel-by-pixel basis. In one embodiment, the same motion table M and luma table L may be used for all color components (e.g., R, G, and B). Additionally, some embodiments may provide a bypass mechanism, in which temporal filtering may be bypassed, such as in response to a control signal from the control logic 84

Figure 13:
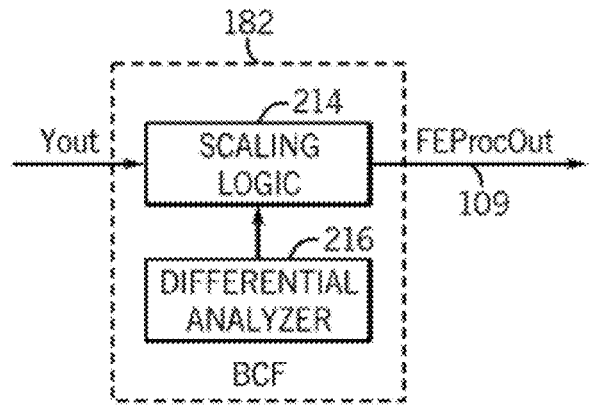
FIG. 13 is a more detailed view showing one embodiment of a binning compensation filter that may be implemented in the ISP front-end pixel processing unit of FIG. 10, in accordance with aspects of the present disclosure.
Figure 14:
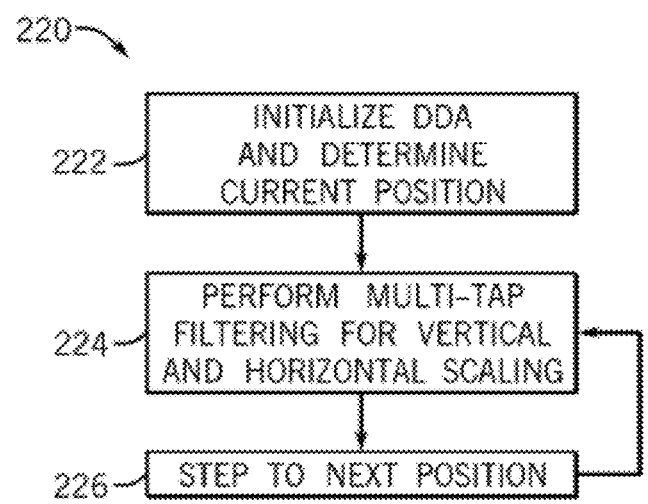
FIG. 14 illustrates a process for scaling image data using the binning compensation filter of FIG. 13, in accordance with one embodiment.

The output of the temporal filter 180 may subsequently be sent to the binning compensation filter (BCF) 182, which may process the image pixels to compensate for non-linear placement of the color samples, such that subsequent image processing operations in the ISP pipe logic 82 (e.g., demosaicing, etc.) that depend on linear placement of the color samples can operate correctly. Additionally, the BCF 182 may also process the pixel data by applying one or more scaling operations, such as vertical and/or horizontal scaling. FIG. 13 shows a block diagram of the binning compensation filter 182 that may include scaling logic 214 and a differential analyzer 216, in accordance with one disclosed embodiment, and FIG. 14 shows a process 220 that may be utilized for carrying out the scaling operations.

As shown in FIG. 13, the scaling logic 214 may produce the output FEProcOut (109) which, as discussed above, may be forwarded to the ISP pipe logic 82 for additional processing, as will be discussed further below. In one embodiment, the scaling operation(s) performed by the BCF 182 may be performed using one or more multi-tap polyphase filters which may select pixels from the source image, multiply each pixel by a weighting factor, and then summing up the pixel values to form a destination pixel. As will be appreciated, the selection of the pixels used in the scaling operations may depend at least partially upon the current pixel position and the number of taps provided by the filters. Additionally, the filtering operations may be done per color component using same colored pixels, and weighting factors (or coefficients) may be obtained form a lookup table and determined based upon the current between-pixel fractional position.

In the depicted embodiment, the differential analyzer 216 may be a digital differential analyzer (DDA) and may be configured to control the current pixel position during the scaling operations. By way of example only, the DDA 216 may be provided as a 32-bit data register that contains a two's-complement fixed-point number having 12 bits in the integer portion and 20 bits in the fraction. The 12-bit integer portion may be used to determine the current pixel position. The fractional portion is used as an index into a coefficient table. In one embodiment, the vertical and horizontal scaling components may utilize 8-deep coefficient tables, such that the high-order 3 bits of the 20-bit fraction portion are used for the index.

To provide an example based upon a 32-bit DDA register (DDA[31:0]), a current center source pixel location (currPixel) may be defined by the 12-bit integer portion DDA[31:20], and may be rounded up (+1) if the next bit DDA[19] is 1. Source pixel values of pixels neighboring currPixel may then be obtained depending on the number of taps provided by the filter. For instance, in one embodiment, vertical scaling may be performed using a 3-tap polyphase filter, such that one pixel of the same color on each side of currPixel is selected (e.g., −1, 0, +1), and horizontal scaling may be performed using a 5-tap polyphase filter, wherein two pixels of the same color on each side of currPixel are selected (e.g., −2, −1, 0, +1, +2). Further, each tap may have its own respective coefficient table. Thus, three 8-deep tables may be provided for a 3-tap vertical scaling filter, and five 8-deep tables may be provided for a 5-tap horizontal scaling filter. The current coefficient index (currIndex) may be define by DDA[19:16] (the high-order 3 bits of the fraction portion DDA[19:0]), and may rounded up (+1) if the next bit, DDA[15] is 1.

Accordingly, the filtering process that occurs in the BCF 182 may include obtaining the source pixel values around the center pixel (currPixel) and multiplying them by the appropriate coefficients from the tables accessed using currIndex. Once the filtering process is completed for a given pixel, a step value (DDAStep) may be added to the DDA 216 to determine the position of the next pixel, and the filtering/scaling operations may be repeated for the subsequent pixel. This is further shown by the process 220 illustrated in FIG. 14. For instance, beginning at step 222, the DDA 216 is initialized and a current pixel position is identified. As discussed above, where the DDA 216 includes a 32-bit register for storing a two's complement fixed-point number, the current pixel position may be specified by the upper 12-bits (integer portion) of the register data.

At step 224, multi-tap filtering is performed for both vertical and horizontal scaling. By way of example, assuming that 3-tap and 5-tap polyphase filters are used for vertical and horizontal scaling, respectively, and assuming that the image sensor 90 uses a Bayer color filter pattern (FIG. 2), the vertical scaling component may include four separate 3-tap polyphase filters, one for each color component: Gr, R, B, and Gb. Each of the 3-tap filters may use a DDA to control the stepping of the current center pixel and the index for the coefficients. Similarly, the horizontal scaling components may include four separate 5-tap polyphase filters, one for each color component: Gr, R, B, and Gb. Each of the 5-tap filters may use a DDA to control the stepping of the current center pixel and the index for the coefficients. For boundary cases, the pixels used in the horizontal and vertical filtering process may depend upon the position of the current pixel, as established by the DDA. For instance, if the DDA values indicate the current pixel (currPixel) is close to a frame border, such that one or more of the source pixels needed by the filter lie outside of the border, the border pixels may be repeated.

Finally, as shown at step 226, once the vertical and horizontal scaling operations have been completed for a given current pixel (currPixel), the DDA 216 may be stepped to the position of the next pixel, and the process 220 may return to step 224 to perform vertical and horizontal scaling on the next pixel. As discussed above the output of the BCF 182, which may be the output FEProcOut (109), may be forwarded to the ISP pipe processing logic 82 for additional processing. However, before shifting the focus of this discussion to the ISP pipe processing logic 82, a more detailed description of various functionalities that may be provided by the statistics processing units (e.g., 122 and 124) that may be implemented in the ISP front-end logic 80 will first be provided.

Referring back to the general description of the statistics processing units 120 and 122, these units may be configured to collect various statistics about the image sensors that capture and provide the raw image signals (Sif0 and Sif1), such as statistics relating to auto-exposure, auto-white balance, auto-focus, flicker detection, black level compensation, and lens shading correction, and so forth. In doing so, the statistics processing units 120 and 122 may first apply one or more image processing operations to their respective input signals, Sif0 (from Sensor0) and Sif1 (from Sensor1).

Figure 15:
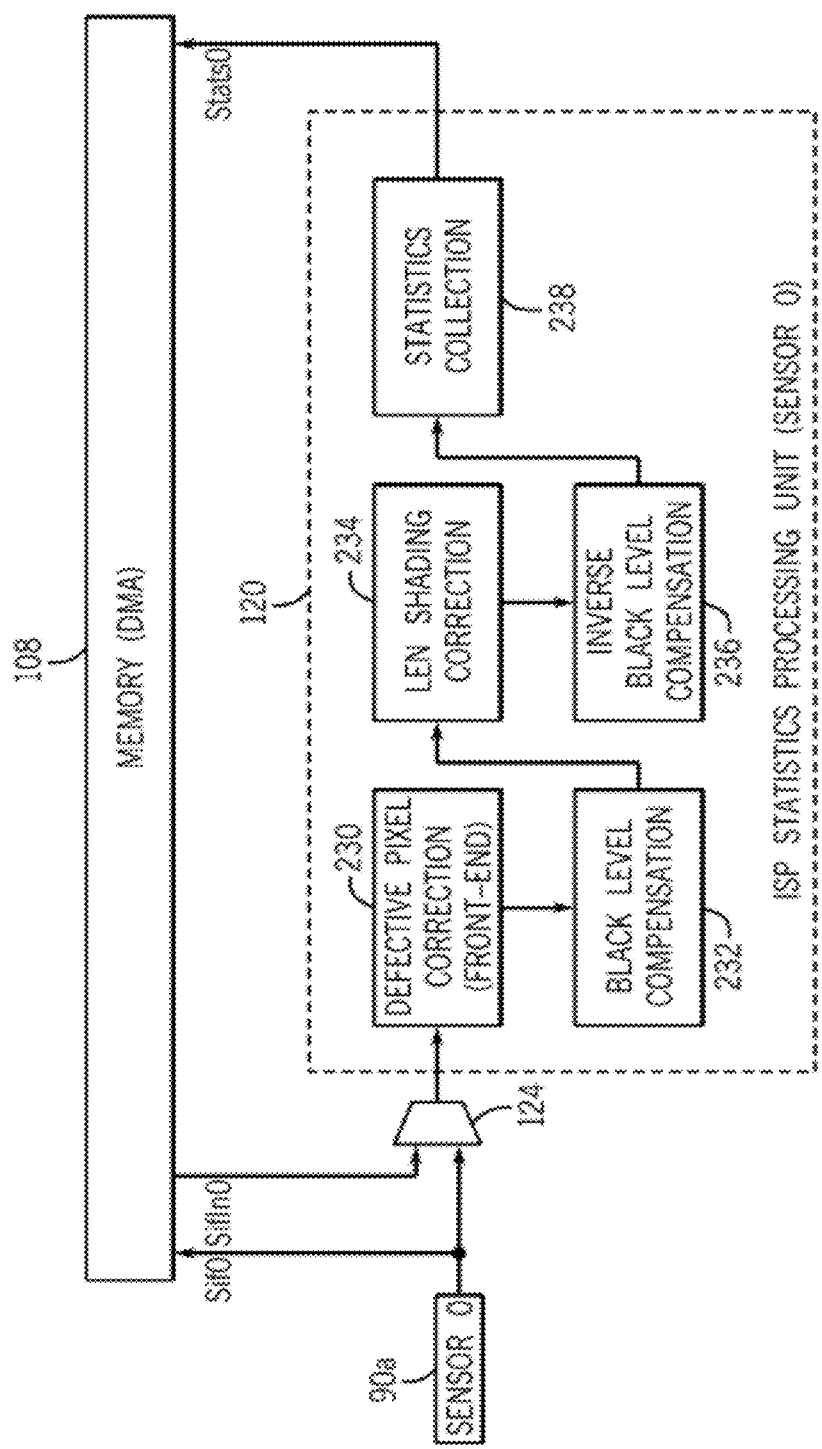
FIG. 15 is more a more detailed block diagram showing an embodiment of a statistics processing unit which may be implemented in the ISP front-end processing logic, as shown in FIG. 8, in accordance with aspects of the present disclosure.

For example, referring to FIG. 15, a more detailed block diagram view of the statistics processing unit 120 associated with Sensor0 (90a) is illustrated in accordance with one embodiment. As shown, the statistics processing unit 120 may include the following functional blocks: defective pixel detection and correction logic 230, black level compensation (BLC) logic 232, lens shading correction logic 234, inverse BLC logic 236, and statistics collection logic 238. Each of these functional blocks will be discussed below. Further, it should be understood that the statistics processing unit 122 associated with Sensor1 (90b) may be implemented in a similar manner.

Initially, the output of selection logic 124 (e.g., Sif0 or SifIn0) is received by the front-end defective pixel correction logic 230. As will be appreciated, "defective pixels" may be understood to refer to imaging pixels within the image sensor(s) 90 that fail to sense light levels accurately. Defective pixels may attributable to a number of factors, and may include "hot" (or leaky) pixels, "stuck" pixels, and "dead pixels." A "hot" pixel generally appears as being brighter than a non-defective pixel given the same amount of light at the same spatial location. Hot pixels may result due to reset failures and/or high leakage. For example, a hot pixel may exhibit a higher than normal charge leakage relative to non-defective pixels, and thus may appear brighter than non-defective pixels. Additionally, "dead" and "stuck" pixels may be the result of impurities, such as dust or other trace materials, contaminating the image sensor during the fabrication and/or assembly process, which may cause certain defective pixels to be darker or brighter than a non-defective pixel, or may cause a defective pixel to be fixed at a particular value regardless of the amount of light to which it is actually exposed. Additionally, dead and stuck pixels may also result from circuit failures that occur during operation of the image sensor. By way of example, a stuck pixel may appear as always being on (e.g., fully charged) and thus appears brighter, whereas a dead pixel appears as always being off.

The defective pixel detection and correction (DPDC) logic 230 in the ISP front-end logic 80 may correct (e.g., replace defective pixel values) defective pixels before they are considered in statistics collection (e.g., 238). In one embodiment, defective pixel correction is performed independently for each color component (e.g., R, B, Gr, and Gb for a Bayer pattern). Generally, the front-end DPDC logic 230 may provide for dynamic defect correction, wherein the locations of defective pixels are determined automatically based upon directional gradients computed using neighboring pixels of the same color. As will be understand, the defects may be "dynamic" in the sense that the characterization of a pixel as being defective at a given time may depend on the image data in the neighboring pixels. By way of example, a stuck pixel that is always on maximum brightness may not be regarded as a defective pixel if the location of the stuck pixel is in an area of the current image that is dominate by brighter or white colors. Conversely, if the stuck pixel is in a region of the current image that is dominated by black or darker colors, then the stuck pixel may be identified as a defective pixel during processing by the DPDC logic 230 and corrected accordingly.

Figures 16, 17:
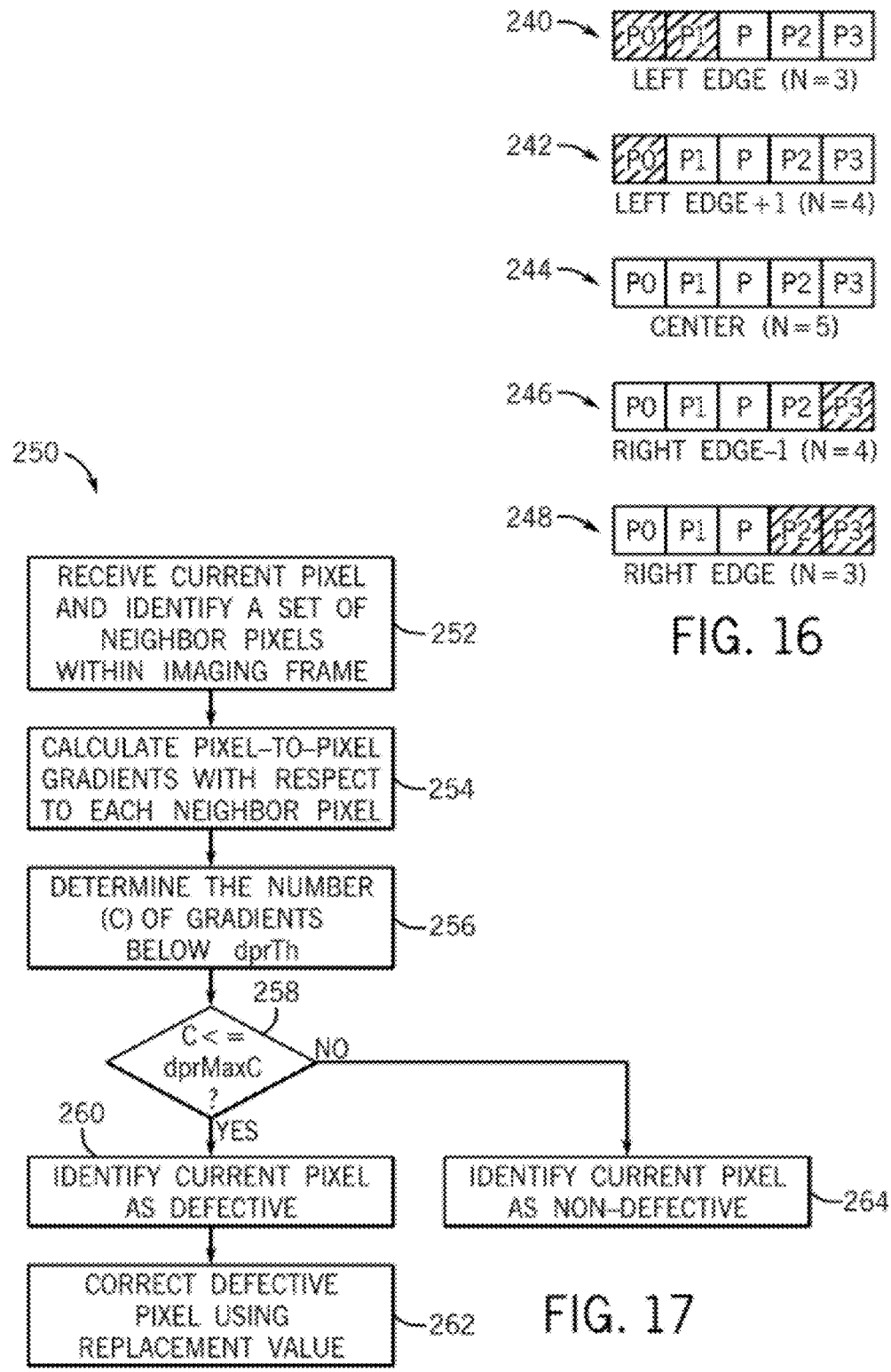
FIG. 16 shows various image frame boundary cases that may be considered when applying techniques for detecting and correcting defective pixels during statistics processing by the statistics processing unit of FIG. 15, in accordance with aspects of the present disclosure.
FIG. 17 is a flow chart illustrating a process for performing defective pixel detection and correction during statistics processing, in accordance with one embodiment.

The DPDC logic 230 may utilize one or more horizontal neighboring pixels of the same color on each side of a current pixel to determine if the current pixel is defective using pixel-to-pixel directional gradients. If a current pixel is identified as being defective, the value of the defective pixel may be replaced with the value of a horizontal neighboring pixel. For instance, in one embodiment, five horizontal neighboring pixels of the same color that are inside the raw frame 154 (FIG. 9) boundary are used, wherein the five horizontal neighboring pixels include the current pixel and two neighboring pixels on either side. Thus, as illustrated in FIG. 16, for a given color component c and for the current pixel P, horizontal neighbor pixels P0, P1, P2, and P3 may be considered by the DPDC logic 230. It should be noted, however, that depending on the location of the current pixel P, pixels outside the raw frame 154 are not considered when calculating pixel-to-pixel gradients.

For instance, as shown in FIG. 16, in a "left edge" case 240, the current pixel P is at the leftmost edge of the raw frame 154 and, thus, the neighboring pixels P0 and P1 outside of the raw frame 154 are not considered, leaving only the pixels P, P2, and P3 (N=3). In a "left edge+1" case 242, the current pixel P is one unit pixel away from the leftmost edge of the raw frame 154 and, thus, the pixel P0 is not considered. This leaves only the pixels P1, P, P2, and P3 (N=4). Further, in a "centered" case 244, pixels P0 and P1 on the left side of the current pixel P and pixels P2 and P3 on the right side of the current pixel P are within the raw frame 154 boundary and, therefore, all of the neighboring pixels P0, P1, P2, and P3 (N=5) are considered in calculating pixel-to-pixel gradients. Additionally, similar cases 246 and 248 may be encountered as the rightmost edge of the raw frame 154 is approached. For instance, given the "right edge−1" case 246, the current pixel P is one unit pixel away the rightmost edge of the raw frame 154 and, thus, the pixel P3 is not considered (N=4). Similarly, in the "right edge" case 248, the current pixel P is at the rightmost edge of the raw frame 154 and, thus, both of the neighboring pixels P2 and P3 are not considered (N=3).

In the illustrated embodiment, for each neighboring pixel (k=0 to 3) within the picture boundary (e.g., raw frame 154), the pixel-to-pixel gradients may be calculated as follows:

$$G_k = abs(P - P_k), \text{ for } 0 \leq k \leq 3 \text{ (only for k within the raw frame)} \quad (6)$$

Once the pixel-to-pixel gradients have been determined, defective pixel detection may be performed by the DPDC logic 230 as follows. First, it is assumed that a pixel is defective if a certain number of its gradients $G_k$ are at or below a particular threshold, denoted by the variable dprTh. Thus, for each pixel, a count (C) of the number of gradients for neighboring pixels inside the picture boundaries that are at or below the threshold dprTh is accumulated. By way of example, for each neighbor pixel inside the raw frame 154, the accumulated count C of the gradients $G_k$ that are at or below the threshold dprTh may be computed as follows:

$$C = \sum_{k}^{N} (G_k \leq dprTh), \quad (7)$$

for $0 \leq k \leq 3$ (only for k within the raw frame)

As will be appreciated, depending on the color components, the threshold value dprTh may vary. Next, if the accumulated count C is determined to be less than or equal to a maximum count, denoted by the variable dprMaxC, then the pixel may be considered defective. This logic is expressed below:

if (C≤dprMaxC), then the pixel is defective. (8)

Defective pixels are replaced using a number of replacement conventions. For instance, in one embodiment, a defective pixel may be replaced with the pixel to its immediate left, P1. At a boundary condition (e.g., P1 is outside of the raw frame 154), a defective pixel may replaced with the pixel to its immediate right, P2. Further, it should be understood that replacement values may be retained or propagated for successive defective pixel detection operations. For instance, referring to the set of horizontal pixels shown in FIG. 16, if P0 or P1 were previously identified by the DPDC logic 230 as being defective pixels, their corresponding replacement values may be used for the defective pixel detection and replacement of the current pixel P.

To summarize the above-discussed defective pixel detection and correction techniques, a flow chart depicting such a process is provided in FIG. 17 and referred to by reference number 250. As shown, process 250 begins at step 252, at which a current pixel (P) is received and a set of neighbor pixels is identified. In accordance with the embodiment described above, the neighbor pixels may include two horizontal pixels of the same color component from opposite sides of the current pixel (e.g., P0, P1, P2, and P3). Next, at step 254, horizontal pixel-to-pixel gradients are calculated with respect to each neighboring pixel within the raw frame 154, as described in Equation 6 above. Thereafter, at step 256, a count C of the number of gradients that are less than or equal to a particular threshold dprTh is determined. As shown at decision logic 258, if C is less than or equal to dprMaxC, then the process 250 continues to step 260, and the current pixel is identified as being defective. The defective pixel is then corrected at step 262 using a replacement value. Additionally, referring back to decision logic 258, if C is greater than dprMaxC, then the process continues to step 264, and the current pixel is identified as not being defective, and its value is not changed.

It should be noted that the defective pixel detection/correction techniques applied during the ISP front-end statistics processing may be less robust than defective pixel detection/correction that is performed in the ISP pipe logic 82. For instance, as will be discussed in further detail below, defective pixel detection/correction performed in the ISP pipe logic 82 may, in addition to dynamic defect correction, further provide for fixed defect correction, wherein the locations of defective pixels are known a priori and loaded in one or more defect tables. Further, dynamic defect correction may in the ISP pipe logic 82 may also consider pixel gradients in both horizontal and vertical directions, and may also provide for the detection/correction of speckling, as will be discussed below.

Returning to FIG. 15, the output of the DPDC logic 230 is then passed to the black level compensation (BLC) logic 232. The BLC logic 232 may provide for digital gain, offset, and clipping independently for each color component "c" (e.g., R, B, Gr, and Gb for Bayer) on the pixels used for statistics collection. For instance, as expressed by the following operation, the input value for the current pixel is first offset by a signed value, and then multiplied by a gain.

$$Y=(X+O[c]) \times G[c], \qquad (9)$$

wherein X represents the input pixel value for a given color component c (e.g., R, B, Gr, or Gb), O[c] represents a signed 16-bit offset for the current color component c, and G[c] represents a gain value for the color component c. In one embodiment, the gain G[c] may be a 16-bit unsigned number with 2 integer bits and 14 fraction bits (e.g., 2.14 in floating point representation), and the gain G[c] may be applied with rounding. By way of example only, the gain G[c] may have a range of between 0 to 4× (e.g., 4 times the input pixel value).

Next, as shown by Equation 10 below, the computed value Y, which is signed, may then be then clipped to a minimum and maximum range:

$$Y=(Y<\min[c]?\min[c]:(Y>\max[c])?\max[c]:Y \qquad (10)$$

The variables min[c] and max[c] may represent signed 16-bit "clipping values for the minimum and maximum output values, respectively. In one embodiment, the BLC logic 232 may also be configured to maintain a count of the number of pixels that were clipped above and below maximum and minimum, respectively, per color component.

Subsequently, the output of the BLC logic 232 is forwarded to the lens shading correction (LSC) logic 234. The LSC logic 234 may be configured to apply an appropriate gain on a per-pixel basis to compensate for drop-offs in intensity, which are generally roughly proportional to the distance from the optical center of the lens 88 of the imaging device 30. As can be appreciated, such drop-offs may be the result of the geometric optics of the lens. By way of example, a lens having ideal optical properties may be modeled as the fourth power of the cosine of the incident angle, $\cos^4(\theta)$, referred to as the $\cos^4$ law. However, because lens manufacturing is not perfect, various irregularities in the lens may cause the optical properties to deviate from the assumed $\cos^4$ model. For instance, the thinner edged of the lens usually exhibits the most irregularities. Additionally, irregularities in lens shading patterns may also be the result of a microlens array within an image sensor not being perfectly aligned with the color array filter. Further, the infrared (IR) filter in some lenses may cause the drop-off to be illuminant-dependent and, thus, lens shading gains may be adapted depending upon the light source detected.

Figure 18:
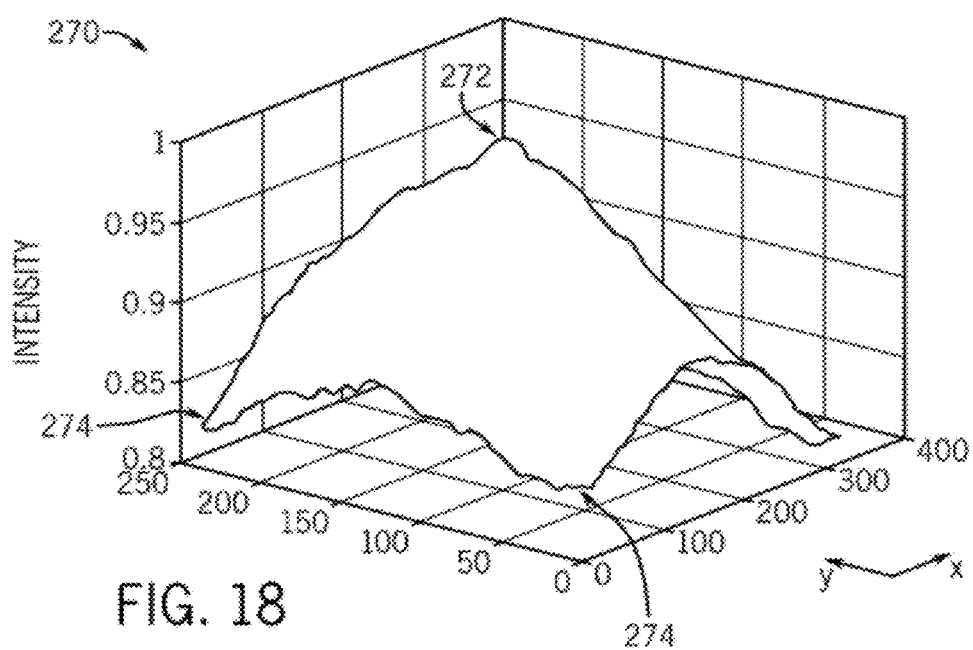
FIG. 18 shows a three-dimensional profile depicting light intensity versus pixel position for a conventional lens of an imaging device.

Referring to FIG. 18, a three-dimensional profile depicting light intensity versus pixel position for a typical lens is illustrated. As shown, the light intensity near the center 272 of the lens gradually drops off towards the corners or edges 274 of the lens. The lens shading irregularities depicted in FIG. 18 may be better illustrated by FIG. 19, which shows a colored drawing of an image 276 that exhibits drop-offs in light intensity towards the corners and edges. Particularly, it should be noted that the light intensity at the approximate center of the image appears to be brighter than the light intensity at the corners and/or edges of the image.

In accordance with embodiments of the present techniques, lens shading correction gains may be specified as a two-dimensional grid of gains per color channel (e.g., Gr, R, B, Gb for a Bayer filter). The gain grid points may be distributed at fixed horizontal and vertical intervals within the raw frame 154 (FIG. 9). As discussed above in FIG. 9, the raw frame 154 may include an active region 156 which defines an area on which processing is performed for a particular image processing operation. With regard to the lens shading correction operation, an active processing region, which may be referred to as the LSC region, is defined within the raw frame region 154. As will be discussed below, the LSC region must be completely inside or at the gain grid boundaries, otherwise results may be undefined.

Figure 20:
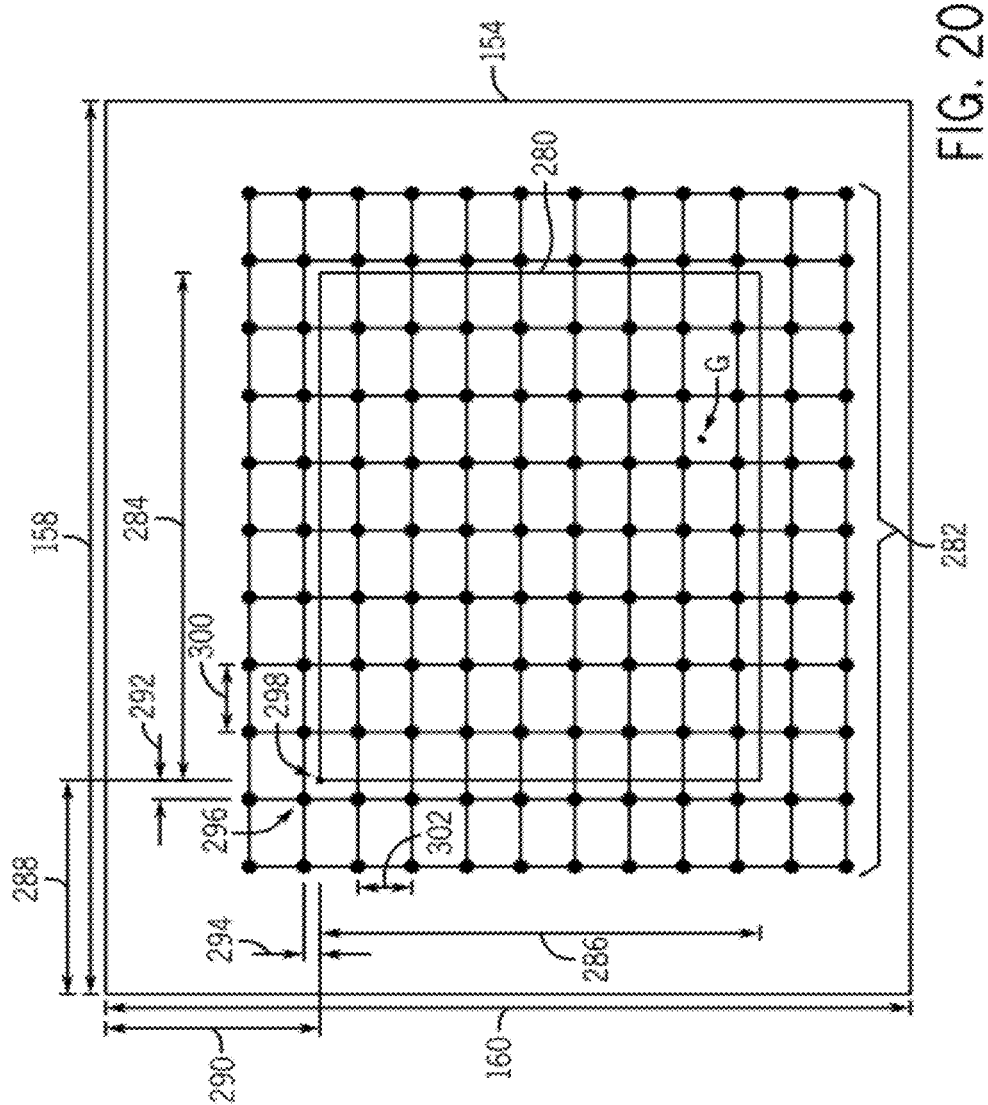
FIG. 20 is a graphical illustration of a raw imaging frame that includes a lens shading correction region and a gain grid, in accordance with aspects of the present disclosure.

For instance, referring to FIG. 20, an LSC region 280 and a gain grid 282 that may be defined within the raw frame 154 are shown. The LSC region 280 may have a width 284 and a height 286, and may be defined by an x-offset 288 and a y-offset 290 with respect to the boundary of the raw frame 154. Grid offsets (e.g., grid x-offset 292 and grid y-offset 294) from the base 296 of the grid gains 282 to the first pixel 298 in the LSC region 280 is also provided. These offsets may be within the first grid interval for a given color component. The horizontal (x-direction) and vertical (y-direction) grid point intervals 300 and 302, respectively, may be specified independently for each color channel.

As discussed above, assuming the use of a Bayer color filter array, 4 color channels of grid gains (R, B, Gr, and Gb) may be defined. In one embodiment, a total of 4K (4096) grid points may be available, and for each color channel, a base address for the start location of grid gains may be provided, such as by using a pointer. Further, the horizontal (300) and vertical (302) grid point intervals may be defined in terms of pixels at the resolution of one color plane and, in certain embodiments, may be provide for grid point intervals separated by a power of 2, such as by 8, 16, 32, 64, or 128, etc., in horizontal and vertical directions. As can be appreciated, by utilizing a power of 2, efficient implementation of gain interpolation using a shift (e.g., division) and add operations may be achieved. Using these parameters, the same gain values can be used even as the image sensor cropping region is changing. For instance, only a few parameters need to be updated to align the grid points to the cropped region (e.g., updating the grid offsets 300 and 302) instead of updating all grid gain values. By way of example only, this may be useful when cropping is used during digital zooming operations. Further, while the gain grid 282 shown in the embodiment of FIG. 20 is depicted as having generally equally spaced grid points, it should be understood that in other embodiments, the grid points may not necessarily be equally spaced. For instance, in some embodiments, the grid points may be distributed unevenly (e.g., logarithmically), such that the grid points are less concentrated in the center of the LSC region 280, but more concentrated towards the corners of the LSC region 280, typically where lens shading distortion is more noticeable.

In accordance with the presently disclosed lens shading correction techniques, when a current pixel location is located outside of the LSC region 280, no gain is applied (e.g., the pixel is passed unchanged). When the current pixel location is at a gain grid location, the gain value at that particular grid point may be used. However, when a current pixel location is between grid points, the gain may be interpolated using bi-linear interpolation. An example of interpolating the gain for the pixel location "G" on FIG. 21 is provided below.

Figure 21:
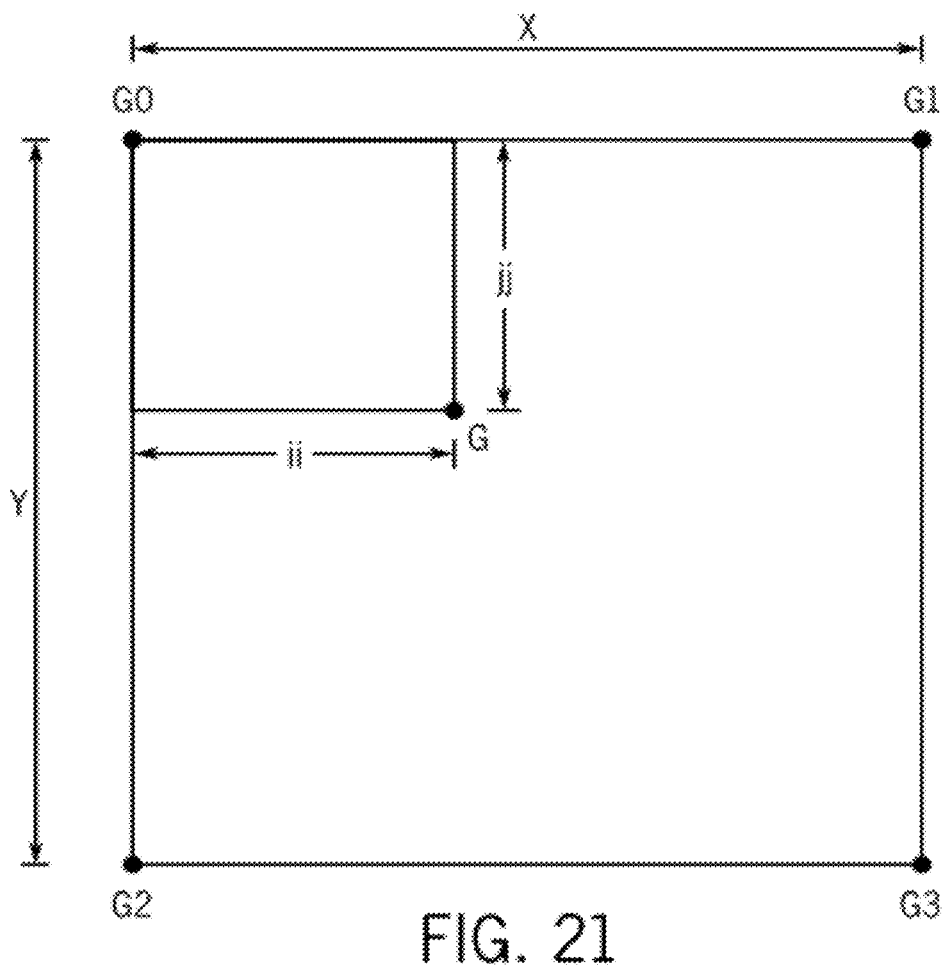
FIG. 21 illustrates the interpolation of a gain value for an image pixel enclosed by four bordering grid gain points, in accordance with aspects of the present disclosure.

As shown in FIG. 21, the pixel G is between the grid points G0, G1, G2, and G3, which may correspond to the top-left, top-right, bottom-left, and bottom-right gains, respectively, relative to the current pixel location G. The horizontal and vertical size of the grid interval is represented by X and Y, respectively. Additionally, ii and jj represent the horizontal and vertical pixel offsets, respectively, relative to the position of the top left gain G0. Based upon these factors, the gain corresponding to the position G may thus be interpolated as follows:

$$G = \frac{(G0(Y-jj)(X-ii)) + (G1(Y-jj)(ii)) + (G2(jj)(X-ii)) + (G3(ii)(jj))}{XY} \quad (11a)$$

The terms in Equation 11a above may then be combined to obtain the following expression:

$$G = \frac{G0[XY - X(jj) - Y(ii) + (ii)(jj)] + G1[Y(ii) - (ii)(jj)] + G2[X(jj) - (ii)(jj)] + G3[(ii)(jj)]}{XY} \quad (11b)$$

In one embodiment, the interpolation method may be performed incrementally, instead of using a multiplier at each pixel, thus reducing computational complexity. For instance, the term (ii)(jj) may be realized using an adder that may be initialized to 0 at location (0, 0) of the gain grid 282 and incremented by the current row number each time the current column number increases by a pixel. As discussed above, since the values of X and Y may be selected as powers of two, gain interpolation may be accomplished using a simple shift operations. Thus, the multiplier is needed only at the grid point G0 (instead of at every pixel), and only addition operations are needed to determine the interpolated gain for the remaining pixels.

In certain embodiments, the interpolation of gains between the grid points may use 14-bit precision, and the grid gains may be unsigned 10-bit values with 2 integer bits and 8 fractional bits (e.g., 2.8 floating point representation). Using this convention, the gain may have a range of between 0 and 4×, and the gain resolution between grid points may be 1/256.

Figure 22:
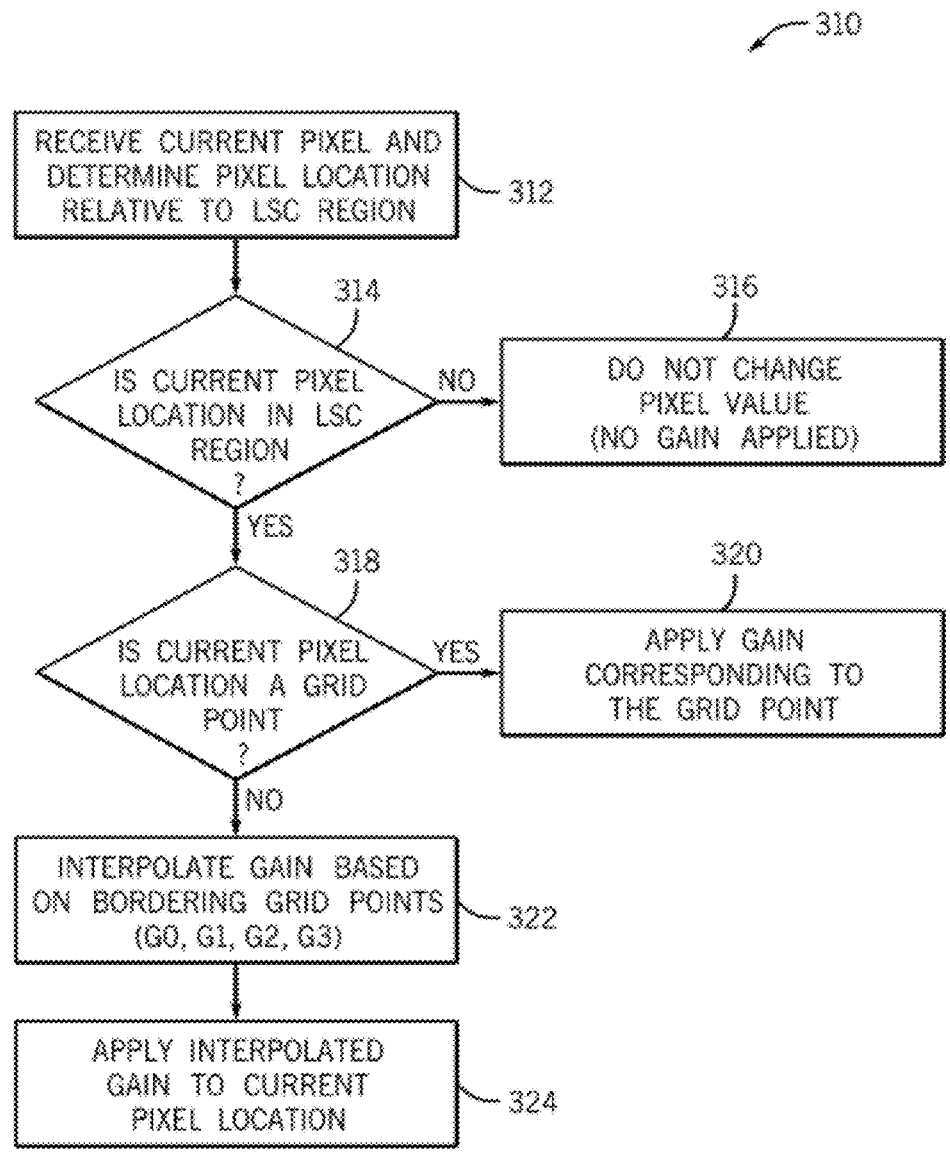
FIG. 22 is a flow chart illustrating a process for determining interpolated gain values that may be applied to imaging pixels during a lens shading correction operation, in accordance with an embodiment of the present technique.

The lens shading correction techniques may be further illustrated by the process 310 shown in FIG. 22. As shown, process 310 begins at step 312, at which the position of a current pixel is determined relative to the boundaries of the LSC region 280 of FIG. 20. Next, decision logic 314 determines whether the current pixel position is within the LSC region 280. If the current pixel position is outside of the LSC region 280, the process 310 continues to step 316, and no gain is applied to the current pixel (e.g., the pixel passes unchanged).

If the current pixel position is within the LSC region 280, the process 310 continues to decision logic 318, at which it is further determined whether the current pixel position corresponds to a grid point within the gain grid 280. If the current pixel position corresponds to a grid point, then the gain value at that grid point is selected and applied to the current pixel, as shown at step 320. If the current pixel position does not correspond to a grid point, then the process 310 continues to step 322, and a gain is interpolated based upon the bordering grid points (e.g., G0, G1, G2, and G3 of FIG. 21). For instance, the interpolated gain may be computed in accordance with Equations 11a and 11b, as discussed above. Thereafter, the process 310 ends at step 324, at which the interpolated gain from step 322 is applied to the current pixel.

Figure 19:
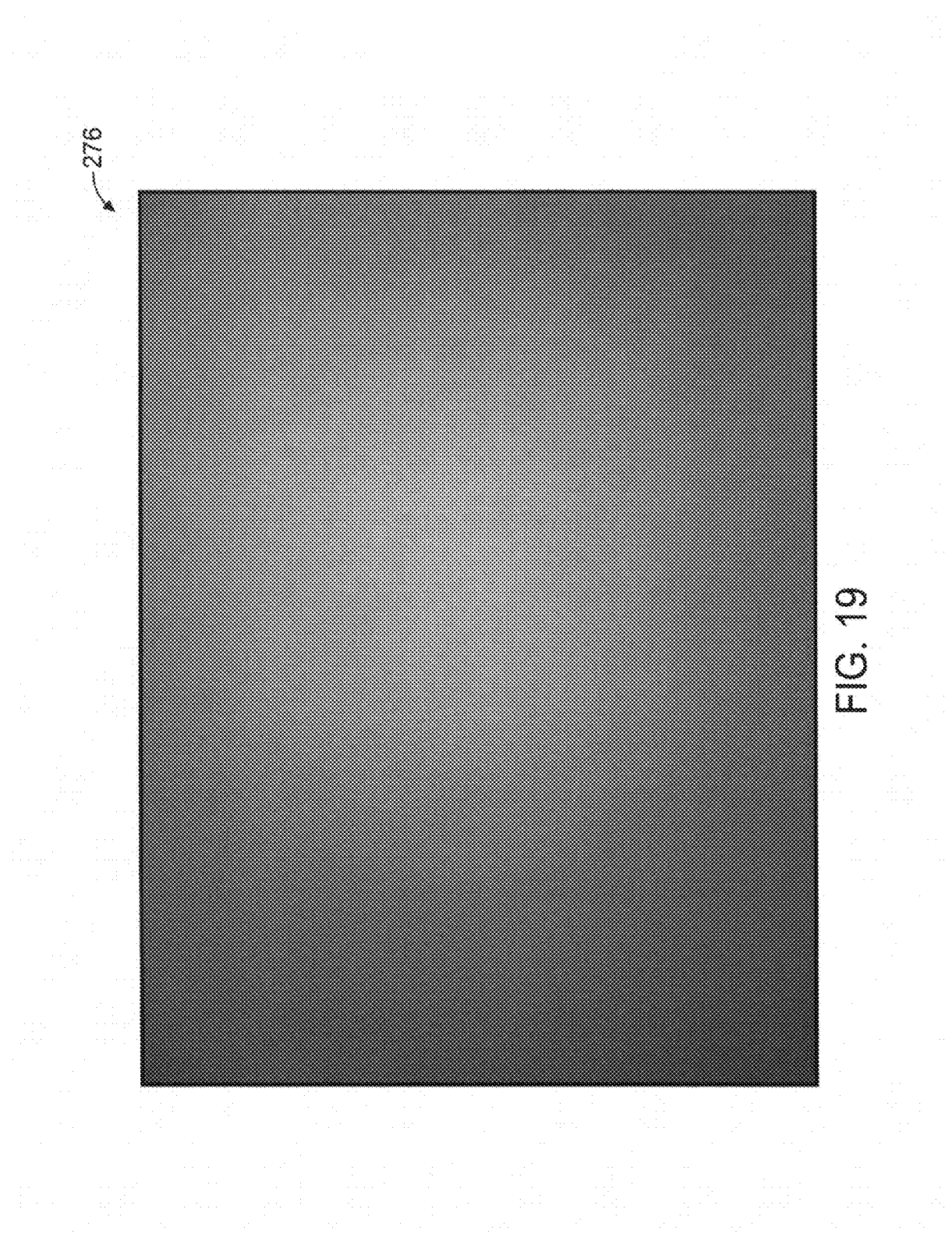
FIG. 19 is a colored drawing that exhibits non-uniform light intensity across the image, which may be the result of lens shading irregularities.
Figure 23:
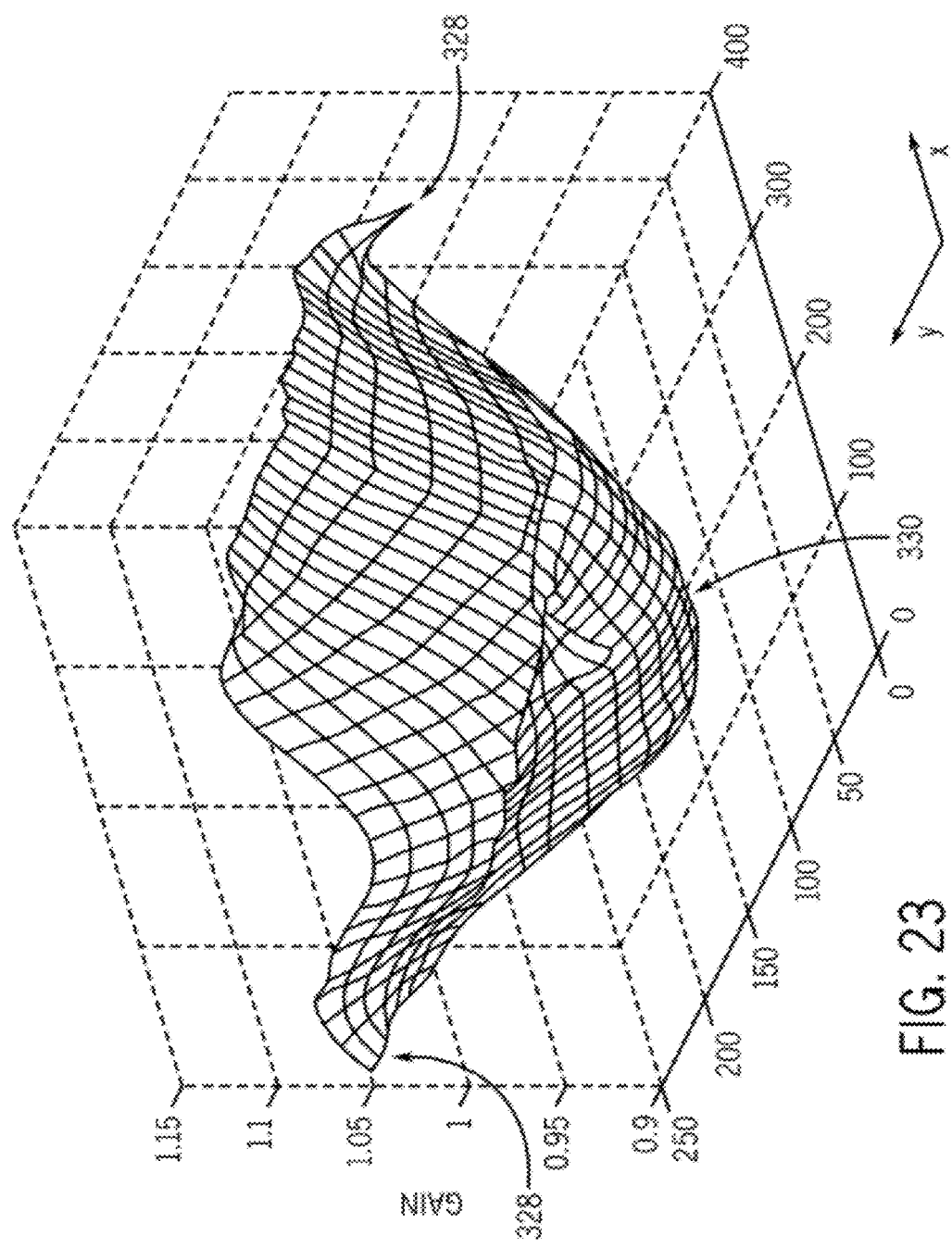
FIG. 23 is a three-dimensional profile depicting interpolated gain values that may be applied to an image that exhibits the light intensity characteristics shown in FIG. 18 when performing lens shading correction, in accordance with aspects of the present disclosure.
Figure 24:
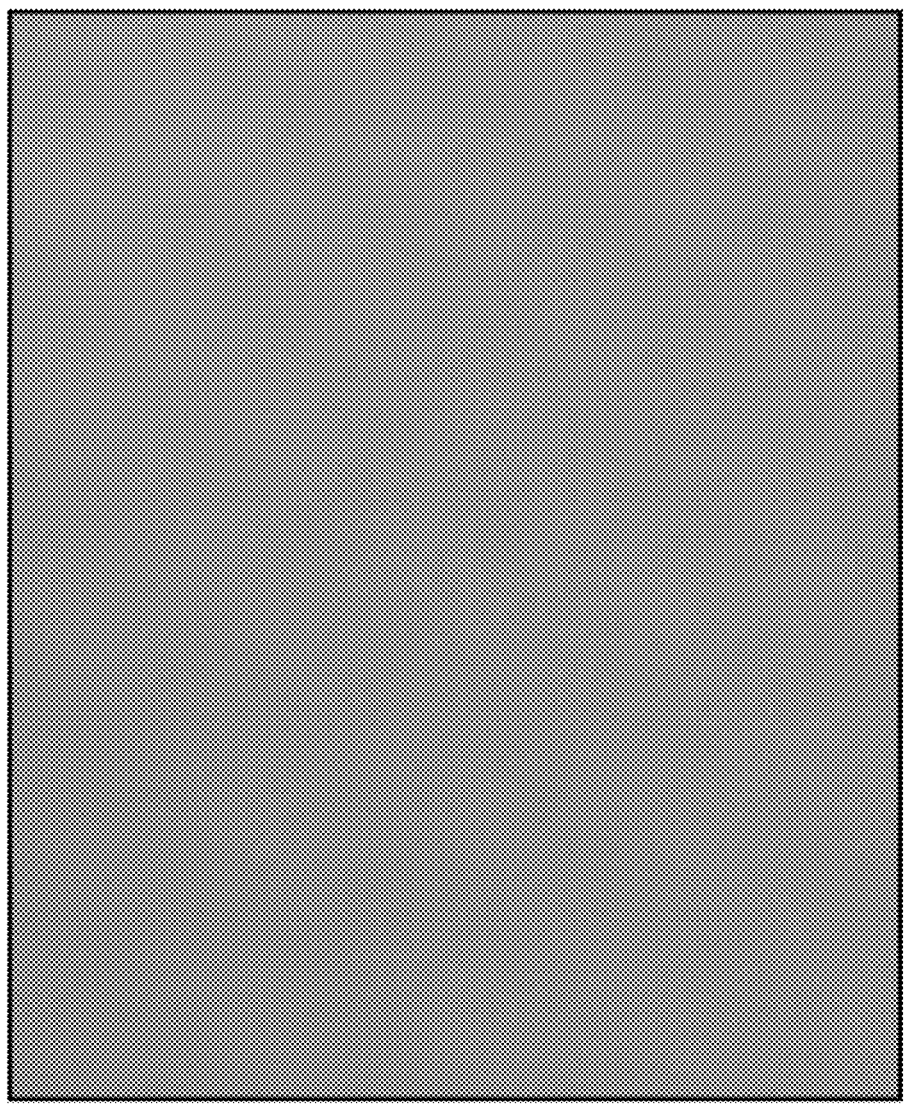
FIG. 24 shows the colored drawing from FIG. 19 that exhibits improved uniformity in light intensity after a lens shading correction operation is applied, in accordance with accordance aspects of the present disclosure.

As will be appreciated, the process 310 may be repeated for each pixel of the image data. For instance, as shown in FIG. 23, a three-dimensional profile depicting the gains that may be applied to each pixel position within a LSC region (e.g. 280) is illustrated. As shown, the gain applied at the corners 328 of the image may be generally greater than the gain applied to the center of the image due to the greater drop-off in light intensity at the corners, as shown in FIGS. 18 and 19. Using the presently described lens shading correction techniques, the appearance of light intensity drop-offs in the image may be reduced or substantially eliminated. For instance, FIG. 24 provides an example of how the colored drawing of the image 276 from FIG. 19 may appear after lens shading correction is applied. As shown, compared to the original image from FIG. 19, the overall light intensity is generally more uniform across the image. Particularly, the light intensity at the approximate center of the image may be substantially equal to the light intensity values at the corners and/or edges of the image. Additionally, as mentioned above, the interpolated gain calculation (Equations 11a and 11b) may, in some embodiments, be replaced with an additive "delta" between grid points by taking advantage of the sequential column and row incrementing structure. As will be appreciated, this reduces computational complexity.

In further embodiments, in addition to using grid gains, a global gain per color component that is scaled as a function of the distance from the image center is used. The center of the image may be provided as an input parameter, and may be estimated by analyzing the light intensity amplitude of each image pixel in the uniformly illuminated image. The radial distance between the identified center pixel and the current pixel, may then be used to obtain a linearly scaled radial gain, $G_r$, as shown below:

$$G_r = G_p[c] \times R, \quad (12)$$

wherein $G_p[c]$ represents a global gain parameter for each color component c (e.g., R, B, Gr, and Gb components for a Bayer pattern), and wherein R represents the radial distance between the center pixel and the current pixel.

With reference to FIG. 25, which shows the LSC region 280 discussed above, the distance R may be calculated or estimated using several techniques. As shown, the pixel C corresponding to the image center may have the coordinates $(x_0, y_0)$, and the current pixel G may have the coordinates $(x_G, y_G)$. In one embodiment, the LSC logic 234 may calculate the distance R using the following equation:

$$R = \sqrt{(x_G - x_0)^2 + (y_G - y_0)^2} \quad (13)$$

In another embodiment, a simpler estimation formula, shown below, may be utilized to obtain an estimated value for R.

$$R = \alpha \times \max(abs(x_G - x_0), abs(y_G - y_0)) + \beta \times \min(abs(x_G - x_0), abs(y_G - y_0)) \quad (14)$$

In Equation 14, the estimation coefficients α and β may be scaled to 8-bit values. By way of example only, in one embodiment, α may be equal to approximately 123/128 and β may be equal to approximately 51/128 to provide an estimated value for R. Using these coefficient values, the largest error may be approximately 4%, with a median error of approximately 1.3%. Thus, even though the estimation technique may be somewhat less accurate than utilizing the calculation technique in determining R (Equation 13), the margin of error is low enough that the estimated values or R are suitable for determining radial gain components for the present lens shading correction techniques.

The radial gain $G_r$ may then be multiplied by the interpolated grid gain value G (Equations 11a and 11b) for the current pixel to determine a total gain that may be applied to the current pixel. The output pixel Y is obtained by multiply ing the input pixel value X with the total gain, as shown below:

$$Y=(G \times G_r \times X) \tag{15}$$

Thus, in accordance with the present technique, lens shading correction may be performed using only the interpolated gain, both the interpolated gain and the radial gain components. Alternatively, lens shading correction may also be accomplished using only the radial gain in conjunction with a radial grid table that compensates for radial approximation errors. For example, instead of a rectangular gain grid 282, as shown in FIG. 20, a radial gain grid having a plurality of grid points defining gains in the radial and angular directions may be provided. Thus, when determining the gain to apply to a pixel that does not align with one of the radial grid points within the LSC region 280, interpolation may be applied using the four grid points that enclose the pixel to determine an appropriate interpolated lens shading gain.

Figure 26:
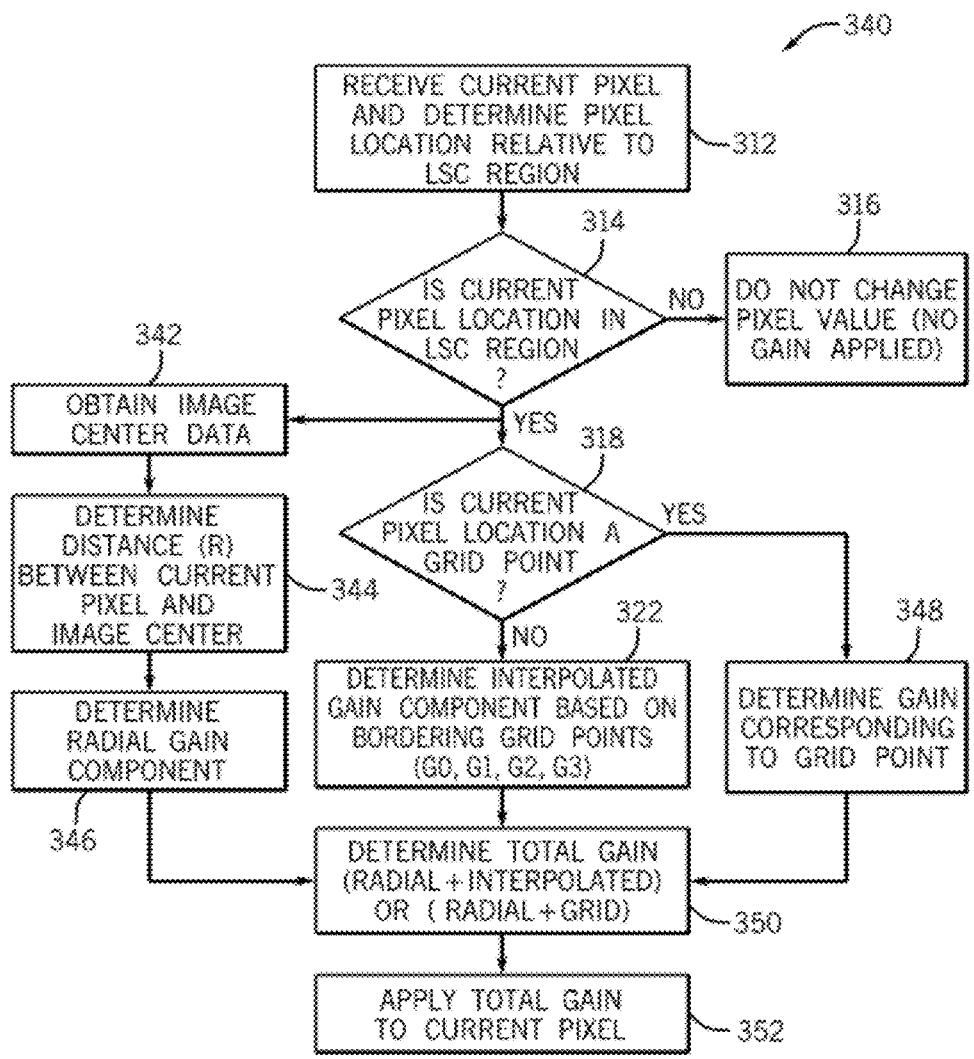
FIG. 26 is a flow chart illustrating a process by which radial gains and interpolated gains from a gain grid are used to determine a total gain that may be applied to imaging pixels during a lens shading correction operation, in accordance with an embodiment of the present technique.

Referring to FIG. 26, the use of interpolated and radial gain components in lens shading correction is illustrated by the process 340. It should be noted that the process 340 may include steps that are similar to the process 310, described above in FIG. 22. Accordingly, such steps have been numbered with like reference numerals. Beginning at step 312, the current pixel is received and its location relative to the LSC region 280 is determined. Next, decision logic 314 determines whether the current pixel position is within the LSC region 280. If the current pixel position is outside of the LSC region 280, the process 340 continues to step 316, and no gain is applied to the current pixel (e.g., the pixel passes unchanged). If the current pixel position is within the LSC region 280, then the process 340 may continue simultaneously to step 342 and decision logic 318. Referring first to step 342, data identifying the center of the image is retrieved. As discussed above, determining the center of the image may include analyzing light intensity amplitudes for the pixels under uniform illumination. This may occur during calibration, for instance. Thus, it should be understood that step 342 does not necessarily encompass repeatedly calculating the center of the image for processing each pixel, but may refer to retrieving the data (e.g., coordinates) of previously determined image center. Once the center of the image is identified, the process 340 may continue to step 344, wherein the distance between the image center and the current pixel location (R) is determined. As discussed above, the value of R may be calculated (Equation 13) or estimated (Equation 14). Then, at step 346, a radial gain component $G_r$ may be computed using the distance R and global gain parameter corresponding to the color component of the current pixel (Equation 12). The radial gain component $G_r$ may be used to determine the total gain, as will be discussed in step 350 below.

Referring back to decision logic 318, a determined whether the current pixel position corresponds to a grid point within the gain grid 280. If the current pixel position corresponds to a grid point, then the gain value at that grid point is determined, as shown at step 348. If the current pixel position does not correspond to a grid point, then the process 340 continues to step 322, and an interpolated gain is computed based upon the bordering grid points (e.g., G0, G1, G2, and G3 of FIG. 21). For instance, the interpolated gain may be computed in accordance with Equations 11a and 11b, as discussed above. Next, at step 350, a total gain is determined based upon the radial gain determined at step 346, as well as one of the grid gains (step 348) or the interpolated gain (322). As can be appreciated, this may depend on which branch decision logic 318 takes during the process 340. The total gain is then applied to the current pixel, as shown at step 352. Again, it should be noted that like the process 310, the process 340 may also be repeated for each pixel of the image data.

The use of the radial gain in conjunction with the grid gains may offer various advantages. For instance, using a radial gain allows for the use of single common gain grid for all color components. This may greatly reduce the total storage space required for storing separate gain grids for each color component. For instance, in a Bayer image sensor, the use of a single gain grid for each of the R, B, Gr, and Gb components may reduce the gain grid data by approximately 75%. As will be appreciated, this reduction in grid gain data may decrease implementation costs, as grid gain data tables may account for a significant portion of memory or chip area in image processing hardware. Further, depending upon the hardware implementation, the use of a single set of gain grid values may offer further advantages, such as reducing overall chip area (e.g., such as when the gain grid values are stored in an on-chip memory) and reducing memory bandwidth requirements (e.g., such as when the gain grid values are stored in an off-chip external memory).

Having thoroughly described the functionalities of the lens shading correction logic 234 shown in FIG. 15, the output of the LSC logic 234 is subsequently forwarded to the inverse black level compensation (IBLC) logic 236. The IBLC logic 236 provides gain, offset and clip independently for each color component (e.g., R, B, Gr, and Gb), and generally performs the inverse function to the BLC logic 232. For instance, as shown by the following operation, the value of the input pixel is first multiplied by a gain and then offset by a signed value.

$$Y=(X \times G[c])+O[c], \tag{16}$$

wherein X represents the input pixel value for a given color component c (e.g., R, B, Gr, or Gb), O[c] represents a signed 16-bit offset for the current color component c, and G[c] represents a gain value for the color component c. In one embodiment, the gain G[c] may have a range of between approximately 0 to 4× (4 times the input pixel value X). It should be noted that these variables may be the same variables discussed above in Equation 9. The computed value Y may be clipped to a minimum and maximum range using, for example, Equation 10. In one embodiment, the IBLC logic 236 may be configured to maintain a count of the number of pixels that were clipped above and below maximum and minimum, respectively, per color component.

Thereafter, the output of the IBLC logic 236 is received by the statistics collection block 238, which may provide for the collection of various statistical data points about the image sensor(s) 90, such as those relating to auto-exposure (AE), auto-white balance (AWB), auto-focus (AF), flicker detection, and so forth. A brief overview discussing the significance of AWB, AE, and AF statistics is provided below.

With regard to white balancing, the image sensor response at each pixel may depend on the illumination source, since the light source is reflected from objects in the image scene. Thus, each pixel value recorded in the image scene is related to the color temperature of the light source. When a white object is illuminated under a low color temperature, it may appear reddish in the captured image. Conversely, a white object that is illuminated under a high color temperature may appear bluish in the captured image. The goal of white balancing is, therefore, to adjust RGB values such that the image appears to the human eye as if it were taken under canonical light. Thus, in the context of imaging statistics relating to white balance, color information about white objects are collected to determine the color temperature of the light source. In general, white balance algorithms may include two main steps. First, the color temperature of the light source is estimated. Second, the estimated color temperature is used to adjust color gain values and/or determine/adjust coefficients of a color correction matrix. Such gains may be a combination of analog and digital image sensor gains, as well as ISP digital gains.

Next, auto-exposure generally refers to a process of adjusting pixel integration time and gains to control the luminance of the captured image. For instance, auto-exposure may control the amount of light from the scene that is captured by the image sensor(s) by setting the integration time. Further, auto-focus may refer to determining the optimal focal length of the lens in order to substantially optimize the focus of the image. Thus, these various types of statistics, among others, may be determined and collected via the statistics collection block 238. As shown, the output STATS0 of the statistics collection block 238 may be sent to the memory 108 and routed to the control logic 84 or, alternatively, may be sent directly to the control logic 84.

As discussed above, the control logic 84 may process the collected statistical data to determine one or more control parameters for controlling the imaging device 30 and/or the image processing circuitry 32. For instance, such the control parameters may include parameters for operating the lens of the image sensor 90 (e.g., focal length adjustment parameters), image sensor parameters (e.g., analog and/or digital gains, integration time), as well as ISP pipe processing parameters (e.g., digital gain values, color correction matrix (CCM) coefficients). Additionally, as mentioned above, in certain embodiments, statistical processing may occur at a precision of 8-bits and, thus, raw pixel data having a higher bit-depth may be down-sampled to an 8-bit format for statistics purposes. As discussed above, down-sampling to 8-bits (or any other lower-bit resolution) may reduce hardware size (e.g., area) and also reduce processing complexity, as well as allow for the statistics data to be more robust to noise (e.g., using spatial averaging of the image data).

Before proceeding with a detailed discussion of the ISP pipe logic 82 downstream from the ISP front-end logic 80, it should understood that the arrangement of various functional logic blocks in the statistics processing units 120 and 122 (e.g., logic blocks 230, 232, 234, 236, and 238) and the ISP front-end pixel processing unit 130 (e.g., logic blocks 180 and 182) are intended to illustrate only one embodiment of the present technique. Indeed, in other embodiments, the logic blocks illustrated herein may be arranged in different ordering, or may include additional logic blocks that may perform additional image processing functions not specifically described herein. Further, it should be understood that the image processing operations performed in the statistics processing units (e.g., 120 and 122), such as lens shading correction, defective pixel detection/correction, and black level compensation, are performed within the statistics processing units for the purposes of collecting statistical data. Thus, processing operations performed upon the image data received by the statistical processing units are not actually reflected in the image signal 109 (FEProcOut) that is output from the ISP front-end pixel processing logic 130 and forwarded to the ISP pipe processing logic 82.

Before continuing, it should also be noted, that given sufficient processing time and the similarity between many of the processing requirements of the various operations described herein, it is possible to reconfigure the functional blocks shown herein to perform image processing in a sequential manner, rather than a pipe-lined nature. As will be understood, this may further reduce the overall hardware implementation costs, but may also increase bandwidth to external memory (e.g., to cache/store intermediate results/data).

The ISP Pipeline ("Pipe") Processing Logic

Having described the ISP front-end logic 80 in detail above, the present discussion will now shift focus to the ISP pipe processing logic 82. Generally, the function of the ISP pipe logic 82 is to receive raw image data, which may be provided from the ISP front-end logic 80 or retrieved from memory 108, and to perform additional image processing operations, i.e., prior to outputting the image data to the display device 28.

Figure 27:
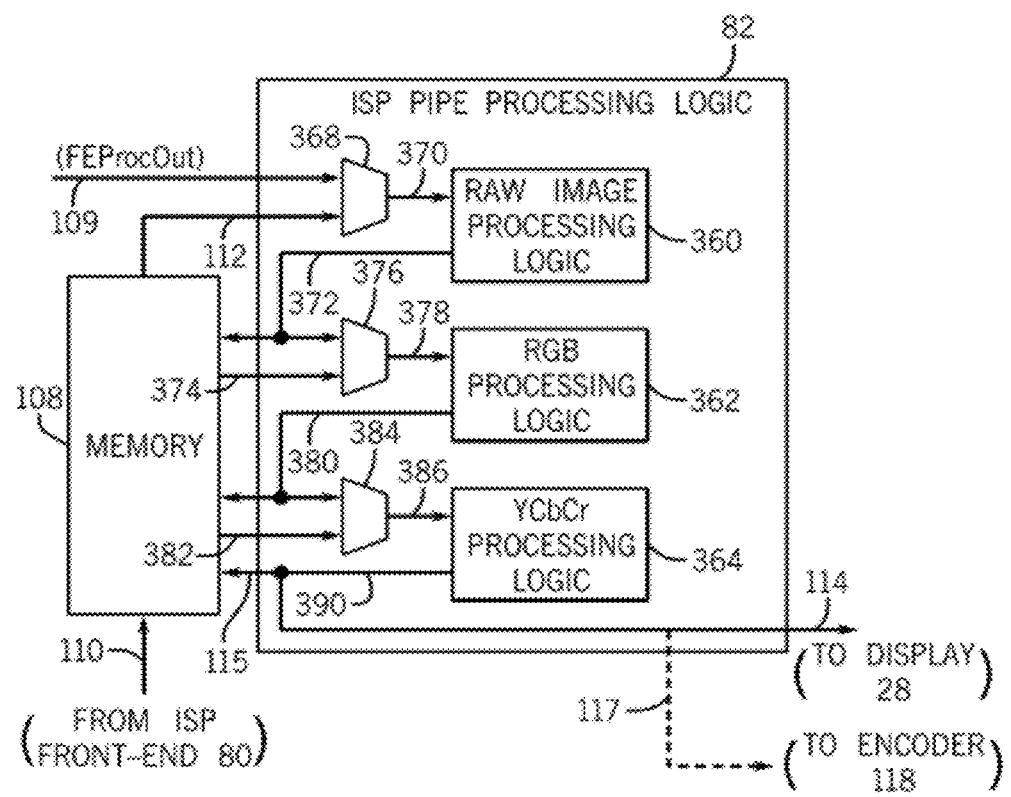
FIG. 27 is a block diagram showing an embodiment of the ISP pipe processing logic of FIG. 7, in accordance with aspects of the present disclosure.

A block diagram showing an embodiment of the ISP pipe logic 82 is depicted in FIG. 27. As illustrated, the ISP pipe logic 82 may include raw processing logic 360, RGB processing logic 362, and YCbCr processing logic 364. The raw processing logic 360 may perform various image processing operations, such as defective pixel detection and correction, lens shading correction, demosaicing, as well as applying gains for auto-white balance and/or setting a black level, as will be discussed further below. As shown in the present embodiment, the input signal 370 to the raw processing logic 360 may be the raw pixel output 109 (signal FEProcOut) from the ISP front-end logic 80 or the raw pixel data 112 from the memory 108, depending on the present configuration of the selection logic 368.

As a result of demosaicing operations performed within the raw processing logic 360, the image signal output 372 may be in the RGB domain, and may be subsequently forwarded to the RGB processing logic 362. For instance, as shown in FIG. 27, the RGB processing logic 362 receives the signal 378, which may be the output signal 372 or an RGB image signal 374 from the memory 108, depending on the present configuration of the selection logic 376. The RGB processing logic 362 may provide for various RGB color adjustment operations, including color correction (e.g., using a color correction matrix), the application of color gains for auto-white balancing, as well as global tone mapping, as will be discussed further below. The RGB processing logic 364 may also provide for the color space conversion of RGB image data to the YCbCr (luma/chroma) color space. Thus, the image signal output 380 may be in the YCbCr domain, and may be subsequently forwarded to the YCbCr processing logic 364.

For instance, as shown in FIG. 27, the YCbCr processing logic 364 receives the signal 386, which may be the output signal 380 from the RGB processing logic 362 or a YCbCr signal 382 from the memory 108, depending on the present configuration of the selection logic 384. As will be discussed in further detail below, the YCbCr processing logic 364 may provide for image processing operations in the YCbCr color space, including scaling, chroma suppression, luma sharpening, brightness, contrast, and color (BCC) adjustments, YCbCr gamma mapping, chroma decimation, and so forth. The image signal output 390 of the YCbCr processing logic 364 may be sent to the memory 108, or may be output from the ISP pipe processing logic 82 as the image signal 114 (FIG. 7). The image signal 114 may be sent to the display device 28 (either directly or via memory 108) for viewing by the user, or may be further processed using a compression engine (e.g., encoder 118), a CPU/GPU, a graphics engine, or the like.

In accordance with embodiments of the present techniques, the ISP pipe logic 82 may support the processing of raw pixel data in 8-bit, 10-bit, 12-bit, or 14-bit formats. For instance, in one embodiment, 8-bit, 10-bit, or 12-bit input data may be converted to 14-bit at the input of the raw processing logic 360, and raw processing and RGB processing operations may be performed with 14-bit precision. In the latter embodiment, the 14-bit image data may be downsampled to 10 bits prior to the conversion of the RGB data to the YCbCr color space, and the YCbCr processing (logic 364) may be performed with 10-bit precision.

In order to provide a comprehensive description of the various functions provided by the ISP pipe processing logic 82, each of the raw processing logic 360, RGB processing logic 362, and YCbCr processing logic 364, as well as internal logic for performing various image processing operations that may be implemented in each respective unit of logic 360, 362, and 364, will be discussed sequentially below, beginning with the raw processing logic 360. For instance, referring now to FIG. 28, a block diagram showing a more detailed view of an embodiment of the raw processing logic 360 is illustrated, in accordance with an embodiment of the present technique. As shown, the raw processing logic 360 includes the gain, offset, and clamping (GOC) logic 394, defective pixel detection/correction (DPDC) logic 396, the noise reduction logic 398, lens shading correction logic 400, GOC logic 402, and demosaicing logic 404. Further, while the examples discussed below assume the use of a Bayer color filter array with the image sensor(s) 90, it should be understood that other embodiments of the present technique may utilize different types of color filters as well.

The input signal 370, which may be a raw image signal, is first received by the gain, offset, and clamping (GOC) logic 394. The GOC logic 394 may provide similar functions and may be implemented in a similar manner with respect to the BLC logic 232 of the statistics processing unit 120 of the ISP front-end logic 80, as discussed above in FIG. 15. For instance, the GOC logic 394 may provide digital gain, offsets and clamping (clipping) independently for each color component R, B, Gr, and Gb of a Bayer image sensor. Particularly, the GOC logic 394 may perform auto-white balance or set the black level of the raw image data. Further, in some embodiments, the GOC logic 394 may also be used correct or compensate for an offset between the Gr and Gb color components.

In operation, the input value for the current pixel is first offset by a signed value and multiplied by a gain. This operation may be performed using the formula shown in Equation 9 above, wherein X represents the input pixel value for a given color component R, B, Gr, or Gb, O[c] represents a signed 16-bit offset for the current color component c, and G[c] represents a gain value for the color component c. The values for G[c] may be previously determined during statistics processing (e.g., in the ISP front-end block 80). In one embodiment, the gain G[c] may be a 16-bit unsigned number with 2 integer bits and 14 fraction bits (e.g., 2.14 floating point representation), and the gain G[c] may be applied with rounding. By way of example only, the gain G[c] may have a range of between 0 to 4×.

The computed pixel value Y (which includes the gain G[c] and offset O[c] from Equation 9 is then be clipped to a minimum and a maximum range in accordance with Equation 10. As discussed above, the variables min[c] and max[c] may represent signed 16-bit "clipping values" for the minimum and maximum output values, respectively. In one embodiment, the GOC logic 394 may also be configured to maintain a count of the number of pixels that were clipped above and below maximum and minimum ranges, respectively, for each color component.

Subsequently, the output of the GOC logic 394 is forwarded to the defective pixel detection and correction logic 396. As discussed above with reference to FIG. 15 (DPDC logic 230), defective pixels may attributable to a number of factors, and may include "hot" (or leaky) pixels, "stuck" pixels, and "dead pixels, wherein hot pixels exhibit a higher than normal charge leakage relative to non-defective pixels, and thus may appear brighter than non-defective pixel, and wherein a stuck pixel appears as always being on (e.g., fully charged) and thus appears brighter, whereas a dead pixel appears as always being off. As such, it may be desirable to have a pixel detection scheme that is robust enough to identify and address different types of failure scenarios. Particularly, when compared to the front-end DPDC logic 230, which may provide only dynamic defect detection/correction, the pipe DPDC logic 396 may provide for fixed or static defect detection/correction, dynamic defect detection/correction, as well as speckle removal.

In accordance with embodiments of the presently disclosed techniques, defective pixel correction/detection performed by the DPDC logic 396 may occur independently for each color component (e.g., R, B, Gr, and Gb), and may include various operations for detecting defective pixels, as well as for correcting the detected defective pixels. For instance, in one embodiment, the defective pixel detection operations may provide for the detection of static defects, dynamics defects, as well as the detection of speckle, which may refer to the electrical interferences or noise (e.g., photon noise) that may be present in the imaging sensor. By analogy, speckle may appear on an image as seemingly random noise artifacts, similar to the manner in which static may appear on a display, such as a television display. Further, as noted above, dynamic defection correction is regarded as being dynamic in the sense that the characterization of a pixel as being defective at a given time may depend on the image data in the neighboring pixels. For example, a stuck pixel that is always on maximum brightness may not be regarded as a defective pixel if the location of the stuck pixel is in an area of the current image that is dominate by bright white colors. Conversely, if the stuck pixel is in a region of the current image that is dominated by black or darker colors, then the stuck pixel may be identified as a defective pixel during processing by the DPDC logic 396 and corrected accordingly.

With regard to static defect detection, the location of each pixel is compared to a static defect table, which may store data corresponding to the location of pixels that are known to be defective. For instance, in one embodiment, the DPDC logic 396 may monitor the detection of defective pixels (e.g., using a counter mechanism or register) and, if a particular pixel is observed as repeatedly failing, the location of that pixel is stored into the static defect table. Thus, during static defect detection, if it is determined that the location of the current pixel is in the static defect table, then the current pixel is identified as being a defective pixel, and a replacement value is determined and temporarily stored. In one embodiment, the replacement value may be the value of the previous pixel (based on scan order) of the same color component. The replacement value may be used to correct the static defect during dynamic/speckle defect detection and correction, as will be discussed below. Additionally, if the previous pixel is outside of the raw frame 154 (FIG. 9), then its value is not used, and the static defect may be corrected during the dynamic defect correction process. Further, due to memory considerations, the static defect table may store a finite number of location entries. For instance, in one embodiment, the static defect table may be implemented as a FIFO queue configured to store a total of 16 locations for every two lines of image data. The locations in defined in the static defect table will, nonetheless, be corrected using a previous pixel replacement value (rather than via the dynamic defect detection process discussed below). As mentioned above, embodiments of the present technique may also provide for updating the static defect table intermittently over time.

Embodiments may provide for the static defect table to be implemented in on-chip memory or off-chip memory. As will be appreciated, using an on-chip implementation may increase overall chip area/size, while using an off-chip implementation may reduce chip area/size, but increase memory bandwidth requirements. Thus, it should be understood that the static defect table may be implemented either on-chip or off-chip depending on specific implementation requirements, i.e., the total number of pixels that are to be stored within the static defect table.

The dynamic defect and speckle detection processes may be time-shifted with respect to the static defect detection process discussed above. For instance, in one embodiment, the dynamic defect and speckle detection process may begin after the static defect detection process has analyzed two scan lines (e.g., rows) of pixels. As can be appreciated, this allows for the identification of static defects and their respective replacement values to be determined before dynamic/speckle detection occurs. For example, during the dynamic/speckle detection process, if the current pixel was previously marked as being a static defect, rather than applying dynamic/speckle detection operations, the static defect is simply corrected using the previously assessed replacement value.

With regard to dynamic defect and speckle detection, these processes may occur sequentially or in parallel. The dynamic defect and speckle detection and correction that is performed by the DPDC logic 396 may rely on adaptive edge detection using pixel-to-pixel direction gradients. In one embodiment, the DPDC logic 396 may select the eight immediate neighbors of the current pixel having the same color component that are within the raw frame 154 (FIG. 9) are used. In other words, the current pixels and its eight immediate neighbors P0, P1, P2, P3, P4, P5, P6, and P7 may form a 3×3 area, as shown below in FIG. 29.

It should be noted, however, that depending on the location of the current pixel P, pixels outside the raw frame 154 are not considered when calculating pixel-to-pixel gradients. For example, with regard to the "top-left" case 410 shown in FIG. 29, the current pixel P is at the top-left corner of the raw frame 154 and, thus, the neighboring pixels P0, P1, P2, P3, and P5 outside of the raw frame 154 are not considered, leaving only the pixels P4, P6, and P7 (N=3). In the "top" case 412, the current pixel P is at the top-most edge of the raw frame 154 and, thus, the neighboring pixels P0, P1, and P2 outside of the raw frame 154 are not considered, leaving only the pixels P3, P4, P5, P6, and P7 (N=5). Next, in the "top-right" case 414, the current pixel P is at the top-right corner of the raw frame 154 and, thus, the neighboring pixels P0, P1, P2, P4, and P7 outside of the raw frame 154 are not considered, leaving only the pixels P3, P5, and P6 (N=3). In the "left" case 416, the current pixel P is at the left-most edge of the raw frame 154 and, thus, the neighboring pixels P0, P3, and P5 outside of the raw frame 154 are not considered, leaving only the pixels P1, P2, P4, P6, and P7 (N=5).

In the "center" case 418, all pixels P0-P7 lie within the raw frame 154 and are thus used in determining the pixel-to-pixel gradients (N=8). In the "right" case 420, the current pixel P is at the right-most edge of the raw frame 154 and, thus, the neighboring pixels P2, P4, and P7 outside of the raw frame 154 are not considered, leaving only the pixels P0, P1, P3, P5, and P6 (N=5). Additionally, in the "bottom-left" case 422, the current pixel P is at the bottom-left corner of the raw frame 154 and, thus, the neighboring pixels P0, P3, P5, P6, and P7 outside of the raw frame 154 are not considered, leaving only the pixels P1, P2, and P4 (N=3). In the "bottom" case 424, the current pixel P is at the bottom-most edge of the raw frame 154 and, thus, the neighboring pixels P5, P6, and P7 outside of the raw frame 154 are not considered, leaving only the pixels P0, P1, P2, P3, and P4 (N=5). Finally, in the "bottom-right" case 426, the current pixel P is at the bottom-right corner of the raw frame 154 and, thus, the neighboring pixels P2, P4, P5, P6, and P7 outside of the raw frame 154 are not considered, leaving only the pixels P0, P1, and P3 (N=3).

Thus, depending upon the position of the current pixel P, the number of pixels used in determining the pixel-to-pixel gradients may be 3, 5, or 8. In the illustrated embodiment, for each neighboring pixel (k=0 to 7) within the picture boundary (e.g., raw frame 154), the pixel-to-pixel gradients may be calculated as follows:

$$G_k = abs(P - P_k), \text{ for } 0 \leq k \leq 7 \text{ (only for k within the raw frame)} \quad (17)$$

Additionally, an average gradient, $G_{av}$, may be calculated as the difference between the current pixel and the average, $P_{av}$, of its surrounding pixels, as shown by the equations below:

$$P_{av} = \frac{\left(\sum_{k}^{N} P_k\right)}{N}, \text{ wherein } N = 3, 5, \text{ or } 8 \text{ (depending on pixel position)} \quad (18)$$

$$G_{av} = abs(P - P_{av}) \quad (19)$$

The pixel-to-pixel gradient values (Equation 17) may be used in determining a dynamic defect case, and the average of the neighboring pixels (Equations 18 and 19) may be used in identifying speckle cases, as discussed further below.

In one embodiment, dynamic defect detection may be performed by the DPDC logic 396 as follows. First, it is assumed that a pixel is defective if a certain number of the gradients $G_k$ are at or below a particular threshold, denoted by the variable dynTh (dynamic defect threshold). Thus, for each pixel, a count (C) of the number of gradients for neighboring pixels inside the picture boundaries that are at or below the threshold dynTh is accumulated. The threshold dynTh may be a combination of a fixed threshold component and a dynamic threshold component that may depend on the "activity" present the surrounding pixels. For instance, in one embodiment, the dynamic threshold component for dynTh may be determined by calculating a high frequency component value $P_{hf}$ based upon summing the absolute difference between the average pixel values $P_{av}$ (Equation 18) and each neighboring pixel, as illustrated below:

$$P_{hf} = \frac{8}{N} \sum_{k}^{N} abs(P_{av} - P_k) \text{ wherein } N = 3, 5, \text{ or } 8 \quad (20)$$

In instances where the pixel is located at an image corner (N=3) or at an image edge (N=5), the $P_{hf}$ may be multiplied by the 8/3 or 8/5, respectively. As can be appreciated, this ensures that the high frequency component $P_{hf}$ is normalized based on eight neighboring pixels (N=8).

Once $P_{hf}$ is determined, the dynamic defect detection threshold dynTh may be computed as shown below:

$$dynTh = dynTh_1 + (dynTh_2 \times P_{hf}), \quad (21)$$

wherein $dynTh_1$ represents the fixed threshold component, and wherein $dynTh_2$ represents the dynamic threshold component, and is a multiplier for $P_{hf}$ in Equation 21. A different fixed threshold component $dynTh_1$ may be provided for each color component, but for each pixel of the same color, $dynTh_1$ is the same. By way of example only, $dynTh_1$ may be set so that it is at least above the variance of noise in the image.

The dynamic threshold component $dynTh_2$ may be determined based on some characteristic of the image. For instance, in one embodiment, $dynTh_2$ may be determined using stored empirical data regarding exposure and/or sensor integration time. The empirical data may be determined during calibration of the image sensor (e.g., 90), and may associate dynamic threshold component values that may be selected for $dynTh_2$ with each of a number of data points. Thus, based upon the current exposure and/or sensor integration time value, which may be determined during statistics processing in the ISP front-end logic 80, $dynTh_2$ may be determined by selecting the dynamic threshold component value from the stored empirical data that corresponds to the current exposure and/or sensor integration time value. Additionally, if the current exposure and/or sensor integration time value does not correspond directly to one of the empirical data points, then $dynTh_2$ may be determined by interpolating the dynamic threshold component values associated with the data points between which the current exposure and/or sensor integration time value falls. Further, like the fixed threshold component $dynTh_1$, the dynamic threshold component $dynTh_2$ may have different values for each color component. Thus, composite threshold value dynTh may vary for each color component (e.g., R, B, Gr, Gb).

As mentioned above, for each pixel, a count C of the number of gradients for neighboring pixels inside the picture boundaries that are at or below the threshold dynTh is determined. For instance, for each neighboring pixel within the raw frame 154, the accumulated count C of the gradients $G_k$ that are at or below the threshold dynTh may be computed as follows:

$$C = \sum_{k}^{N} (G_k \leq dynTh), \qquad (22)$$

for $0 \leq k \leq 7$ (only for k within the raw frame)
Next, if the accumulated count C is determined to be less than or equal to a maximum count, denoted by the variable dynMaxC, then the pixel may be considered as a dynamic defect. In one embodiment, different values for dynMaxC may be provided for N=3 (corner), N=5 (edge), and N=8 conditions. This logic is expressed below:

if ($C \leq dynMaxC$), then the current pixel P is defective. (23)

As mentioned above, the location of defective pixels may be stored into the static defect table. In some embodiments, the minimum gradient value ($\min(G_k)$) calculated during dynamic defect detection for the current pixel may be stored and may be used to sort the defective pixels, such that a greater minimum gradient value indicates a greater "severity" of a defect and should be corrected during pixel correction before less severe defects are corrected. In one embodiment, a pixel may need to be processed over multiple imaging frames before being stored into the static defect table, such as by filtering the locations of defective pixels over time. In the latter embodiment, the location of the defective pixel may be stored into the static defect table only if the defect appears in a particular number of consecutive images at the same location. Further, in some embodiments, the static defect table may be configured to sort the stored defective pixel locations based upon the minimum gradient values. For instance, the highest minimum gradient value may indicate a defect of greater "severity." By ordering the locations in this manner, the priority of static defect correction may be set, such that the most severe or important defects are corrected first. Additionally, the static defect table may be updated over time to include newly detected static defects, and ordering them accordingly based on their respective minimum gradient values.

Speckle detection, which may occur in parallel with the dynamic defect detection process described above, may be performed by determining if the value $G_{av}$ (Equation 19) is above a speckle detection threshold spkTh. Like the dynamic defect threshold dynTh, the speckle threshold spkTh may also include fixed and dynamic components, referred to by $spkTh_1$ and $spkTh_2$, respectively. In general, the fixed and dynamic components $spkTh_1$ and $spkTh_2$ may be set more "aggressively" compared to the $dynTh_1$ and $dynTh_2$ values, in order to avoid falsely detecting speckle in areas of the image that may be more heavily textured and others, such as text, foliage, certain fabric patterns, etc. Accordingly, in one embodiment, the dynamic speckle threshold component $spkTh_2$ may be increased for high-texture areas of the image, and decreased for "flatter" or more uniform areas. The speckle detection threshold spkTh may be computed as shown below:

$$spkTh = spkTh_1 + (spkTh_2 \times P_{hf}), \qquad (24)$$

wherein $spkTh_1$ represents the fixed threshold component, and wherein $spkTh_2$ represents the dynamic threshold component. The detection of speckle may then be determined in accordance with the following expression:

if ($G_{av}$ > spkTh), then the current pixel P is speckled. (25)

Once defective pixels have been identified, the DPDC logic 396 may apply pixel correction operations depending on the type of defect detected. For instance, if the defective pixel was identified as a static defect, the pixel is replaced with the stored replacement value, as discussed above (e.g., the value of the previous pixel of the same color component). If the pixel was identified as either a dynamic defect or as speckle, then pixel correction may be performed as follows. First, gradients are computed as the sum of the absolute difference between the center pixel and a first and second neighbor pixels (e.g., computation of $G_k$ of Equation 17) for four directions, a horizontal (h) direction, a vertical (v) direction, a diagonal-positive direction (dp), and a diagonal-negative direction (dn), as shown below:

$$G_h = G_3 + G_4 \qquad (26)$$

$$G_v = G_1 + G_6 \qquad (27)$$

$$G_{dp} = G_2 + G_5 \qquad (28)$$

$$G_{dn} = G_2 + G_7 \qquad (29)$$

Next, the corrective pixel value $P_c$ may be determined via linear interpolation of the two neighboring pixels associated with the directional gradient $G_h$, $G_v$, $G_{dp}$, and $G_{dn}$ that has the smallest value. For instance, in one embodiment, the logic statement below may express the calculation of $P_C$:

if (min == $G_h$) (30)

$$P_C = \frac{P_3 + P_4}{2};$$

else if (min == $G_v$)

-continued $$P_C = \frac{P_1 + P_6}{2};$$

else if (min == $G_{dp}$)

$$P_C = \frac{P_2 + P_5}{2};$$

else if (min == $G_{dn}$)

$$P_C = \frac{P_0 + P_7}{2};$$

The pixel correction techniques implemented by the DPDC logic 396 may also provide for exceptions at boundary conditions. For instance, if one of the two neighboring pixels associated with the selected interpolation direction is outside of the raw frame, then the value of the neighbor pixel that is within the raw frame is substituted instead. Thus, using this technique, the corrective pixel value will be equivalent to the value of the neighbor pixel within the raw frame.

It should be noted that the defective pixel detection/correction techniques applied by the DPDC logic 396 during the ISP pipe processing is more robust compared to the DPDC logic 230 in the ISP front-end logic 80. As discussed in the embodiment above, the DPDC logic 230 performs only dynamic defect detection and correction using neighboring pixels in only the horizontal direction, whereas the DPDC logic 396 provides for the detection and correction of static defects, dynamic defects, as well as speckle, using neighboring pixels in both horizontal and vertical directions.

As will be appreciated, the storage of the location of the defective pixels using a static defect table may provide for temporal filtering of defective pixels with lower memory requirements. For instance, compared to many conventional techniques which store entire images and apply temporal filtering to identify static defects over time, embodiments of the present technique only store the locations of defective pixels, which may typically be done using only a fraction of the memory required to store an entire image frame. Further, as discussed above, the storing of a minimum gradient value (min($G_k$)), allows for an efficient use of the static defect table prioritizing the order of the locations at which defective pixels are corrected (e.g., beginning with those that will be most visible).

Additionally, the use of thresholds that include a dynamic component (e.g., $dynTh_2$ and $spkTh_2$) may help to reduce false defect detections, a problem often encountered in conventional image processing systems when processing high texture areas of an image (e.g., text, foliage, certain fabric patterns, etc.). Further, the use of directional gradients (e.g., h, v, dp, dn) for pixel correction may reduce the appearance of visual artifacts if a false defect detection occurs. For instance, filtering in the minimum gradient direction may result in a correction that still yields acceptable results under most cases, even in cases of false detection. Additionally, the inclusion of the current pixel P in the gradient calculation may improve the accuracy of the gradient detection, particularly in the case of hot pixels.

Figure 30:
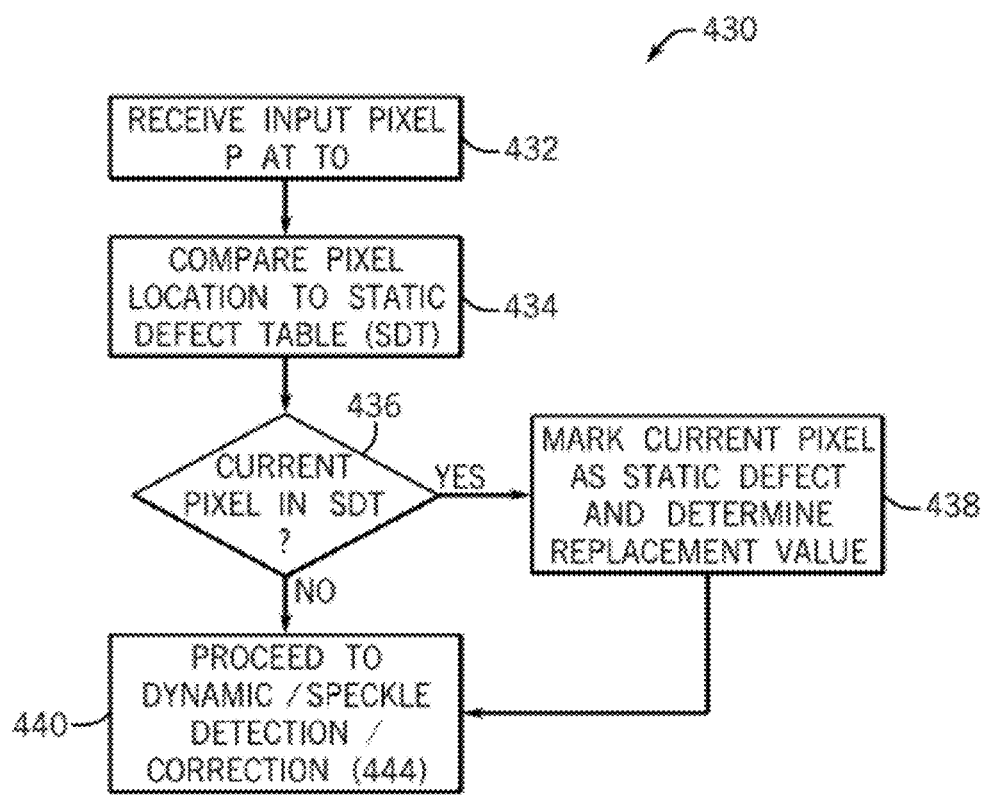
FIGS. 30-32 are flowcharts that depict various processes for detecting and correcting defective pixels that may be performed in the raw pixel processing block of FIG. 28, in accordance with one embodiment.
Figure 31:
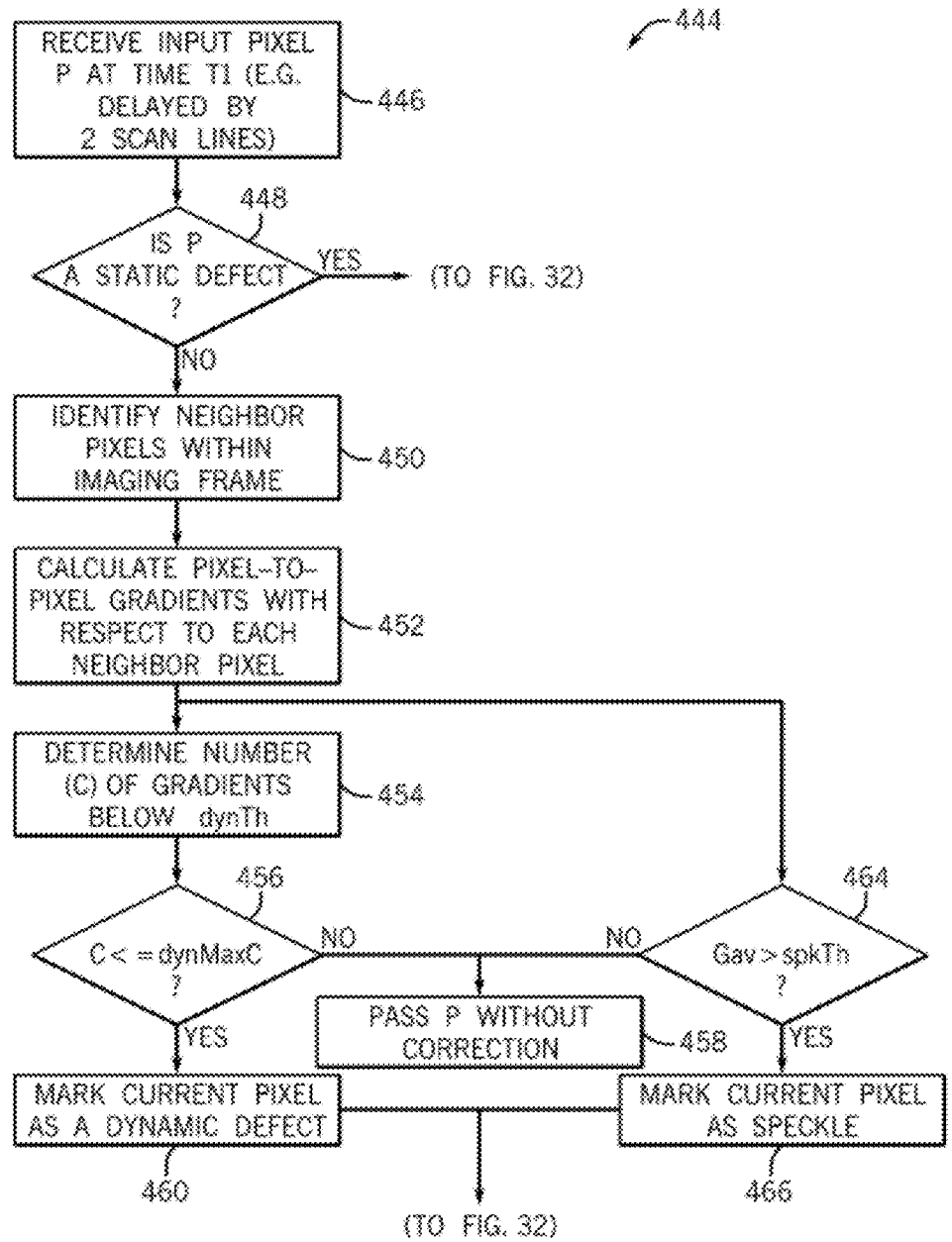
Figure 32:
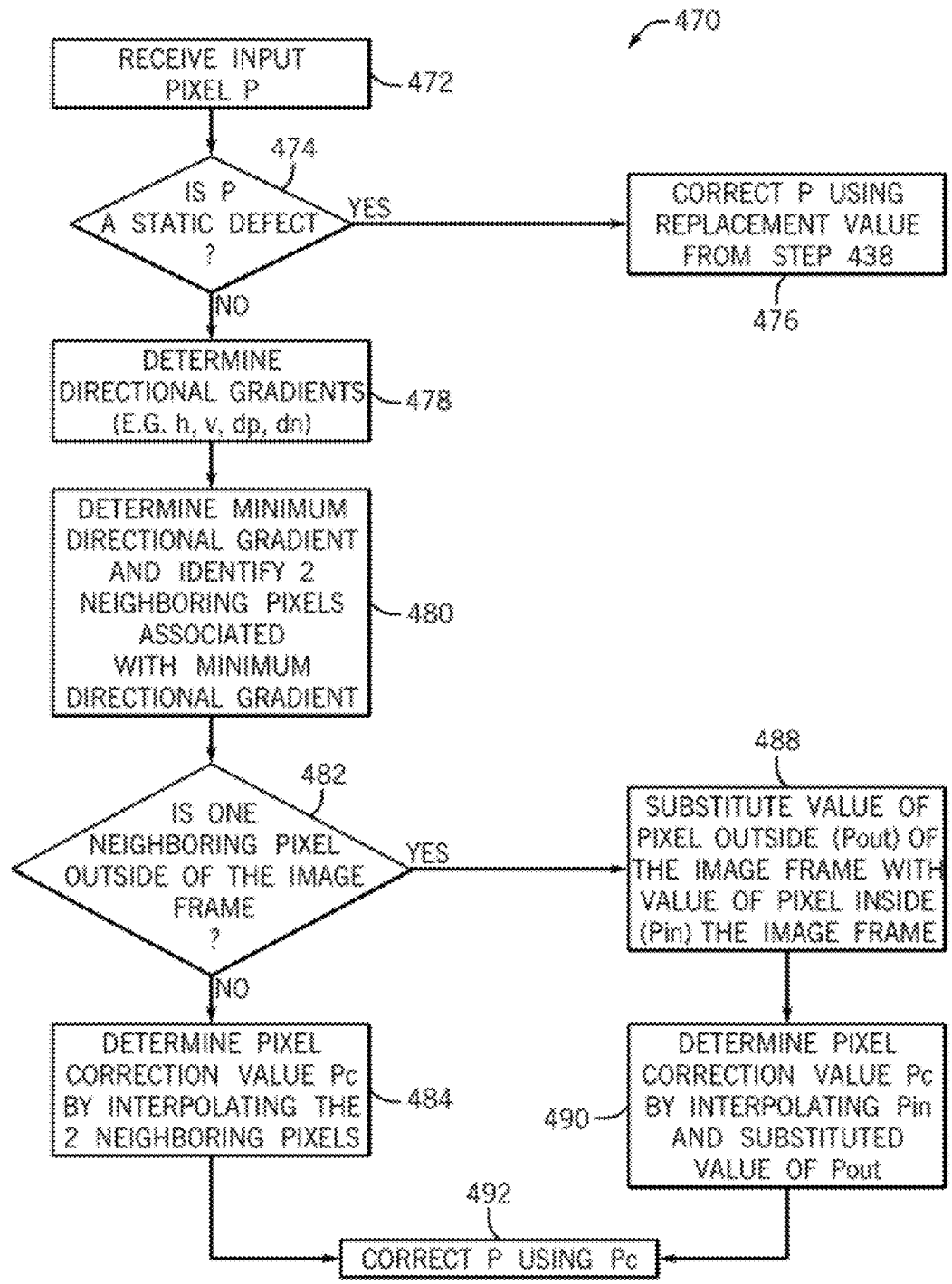

The above-discussed defective pixel detection and correction techniques implemented by the DPDC logic 396 may be summarized by a series of flow charts provided in FIGS. 30-32. For instance, referring first to FIG. 30, a process 430 for detecting static defects is illustrated. Beginning initially at step 432, an input pixel P is received at a first time, $T_0$. Next, at step 434, the location of the pixel P is compared to the values stored in a static defect table. Decision logic 436 determines whether the location of the pixel P is found in the static defect table. If the location of P is in the static defect table, then the process 430 continues to step 438, wherein the pixel P is marked as a static defect and a replacement value is determined. As discussed above, the replacement value may be determined based upon the value of the previous pixel (in scan order) of the same color component. The process 430 then continues to step 440, at which the process 430 proceeds to the dynamic and speckle detection process 444, illustrated in FIG. 31. Additionally, if at decision logic 436, the location of the pixel P is determined not to be in the static defect table, then the process 430 proceeds to step 440 without performing step 438.

Continuing to FIG. 31, the input pixel P is received at time T1, as shown by step 446, for processing to determine whether a dynamic defect or speckle is present. Time T1 may represent a time-shift with respect to the static defect detection process 430 of FIG. 30. As discussed above, the dynamic defect and speckle detection process may begin after the static defect detection process has analyzed two scan lines (e.g., rows) of pixels, thus allowing time for the identification of static defects and their respective replacement values to be determined before dynamic/speckle detection occurs.

The decision logic 448 determines if the input pixel P was previously marked as a static defect (e.g., by step 438 of process 430). If P is marked as a static defect, then the process 444 may continue to the pixel correction process shown in FIG. 32 and may bypass the rest of the steps shown in FIG. 31. If the decision logic 448 determines that the input pixel P is not a static defect, then the process continues to step 450, and neighboring pixels are identified that may be used in the dynamic defect and speckle process. For instance, in accordance with the embodiment discussed above and illustrated in FIG. 29, the neighboring pixels may include the immediate 8 neighbors of the pixel P (e.g., P0-P7), thus forming a 3×3 pixel area. Next, at step 452, pixel-to-pixel gradients are calculated with respect to each neighboring pixel within the raw frame 154, as described in Equation 17 above. Additionally, an average gradient ($G_{av}$) may be calculated as the difference between the current pixel and the average of its surrounding pixels, as shown in Equations 18 and 19.

The process 444 then branches to step 454 for dynamic defect detection and to decision logic 464 for speckle detection. As noted above, dynamic defect detection and speckle detection may, in some embodiments, occur in parallel. At step 454, a count C of the number of gradients that are less than or equal to the threshold dynTh is determined. As described above, the threshold dynTh may include fixed and dynamic components and, in one embodiment, may be determined in accordance with Equation 21 above. If C is less than or equal to a maximum count, dynMaxC, then the process 444 continues to step 460, and the current pixel is marked as being a dynamic defect. Thereafter, the process 444 may continue to the pixel correction process shown in FIG. 32, which will be discussed below.

Returning back the branch after step 452, for speckle detection, the decision logic 464 determines whether the average gradient $G_{av}$ is greater than a speckle detection threshold spkTh, which may also include a fixed and dynamic component. If $G_{av}$ is greater than the threshold spkTh, then the pixel P is marked as containing speckle at step 466 and, thereafter, the process 444 continues to FIG. 32 for the correction of the speckled pixel. Further, if the output of both of the decision logic blocks 456 and 464 are "NO," then this indicates that the pixel P does not contain dynamic defects, speckle, or even static defects (decision logic 448). Thus, when the outputs of decision logic 456 and 464 are both "NO," the process 444 may conclude at step 458, whereby the pixel P is passed unchanged, as no defects (e.g., static, dynamic, or speckle) were detected.

Continuing to FIG. 32, a pixel correction process 470 in accordance with the techniques described above is provided. At step 472, the input pixel P is received from process 444 of FIG. 31. It should be noted that the pixel P may be received by process 470 from step 448 (static defect) or from steps 460 (dynamic defect) and 466 (speckle defect). The decision logic 474 then determines whether the pixel P is marked as a static defect. If the pixel P is a static defect, then the process 470 continues and ends at step 476, whereby the static defect is corrected using the replacement value determined at step 438 (FIG. 30).

If the pixel P is not identified as a static defect, then the process 470 continues from decision logic 474 to step 478, and directional gradients are calculated. For instance, as discussed above with reference to Equations 26-29, the gradients may be computed as the sum of the absolute difference between the center pixel and first and second neighboring pixels for four directions (h, v, dp, and dn). Next, at step 480, the directional gradient having the smallest value is identified and, thereafter, decision logic 482 assesses whether one of the two neighboring pixels associated with the minimum gradient is located outside of the image frame (e.g., raw frame 154). If both neighboring pixels are within the image frame, then the process 470 continues to step 484, and a pixel correction value ($P_C$) is determined by applying linear interpolation to the values of the two neighboring pixels, as illustrated by Equation 30. Thereafter, the input pixel P may be corrected using the interpolated pixel correction value $P_C$, as shown at step 492.

Returning to the decision logic 482, if it is determined that one of the two neighboring pixels are located outside of the image frame (e.g., raw frame 165), then instead of using the value of the outside pixel (Pout), the DPDC logic 396 may substitute the value of Pout with the value of the other neighboring pixel that is inside the image frame (Pin), as shown at step 488. Thereafter, at step 490, the pixel correction value $P_c$ is determined by interpolating the values of Pin and the substituted value of Pout. In other words, in this case, $P_C$ may be equivalent to the value of Pin. Concluding at step 492, the pixel P is corrected using the value $P_C$. Before continuing, it should be understood that the particular defective pixel detection and correction processes discussed herein with reference to the DPDC logic 396 are intended to reflect only one possible embodiment of the present technique. Indeed, depending on design and/or cost constraints, a number of variations are possible, and features may be added or removed such that the overall complexity and robustness of the defect detection/correction logic is between the simpler detection/correction logic 230 implemented in the ISP front-end block 80 and the defect detection/correction logic discussed here with reference to the DPDC logic 396.

Referring back to FIG. 28, the corrected pixel data is output from the DPDC logic 396 and then received by the noise reduction logic 398 for further processing. In one embodiment, the noise reduction logic 398 may be configured to implements two-dimensional edge-adaptive low pass filtering to reduce noise in the image data while maintaining details and textures. The edge-adaptive thresholds may be set (e.g., by the control logic 84) based upon the present lighting levels, such that filtering may be strengthened under low light conditions. Further, as briefly mentioned above with regard to the determination of the dynTh and spkTh values, noise variance may be determined ahead of time for a given sensor so that the noise reduction thresholds can be set just above noise variance, such that during the noise reduction processing, noise is reduced without significantly affecting textures and details of the scene (e.g., avoid/reduce false detections). Assuming a Bayer color filter implementation, the noise reduction logic 398 may process each color component Gr, R, B, and Gb independently using a separable 7-tap horizontal filter and a 5-tap vertical filter. In one embodiment, the noise reduction process may be carried out by correcting for non-uniformity on the green color components (Gb and Gr), and then performing horizontal filtering and vertical filtering.

Figure 33:
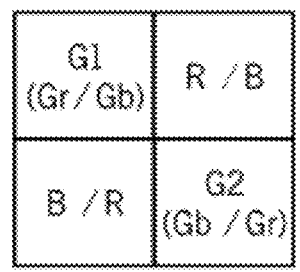
FIG. 33 shows the location of two green pixels in a 2×2 pixel block of a Bayer image sensor that may be interpolated when applying green non-uniformity correction techniques during processing by the raw pixel processing logic of FIG. 28, in accordance with aspects of the present disclosure.

Green non-uniformity (GNU) is generally characterized by a slight brightness difference between the Gr and Gb pixels given a uniformly illuminated flat surface. Without correcting or compensating for this non-uniformity, certain artifacts, such as a "maze" artifact, may appear in the full color image after demosaicing. During the green non-uniformity process may include determining, for each green pixel in the raw Bayer image data, if the absolute difference between a current green pixel (G1) and the green pixel to the right and below (G2) the current pixel is less than a GNU correction threshold (gnuTh). FIG. 33 illustrates the location of the G1 and G2 pixels in a 2×2 area of the Bayer pattern. As shown, the color of the pixels bordering G1 may be depending upon whether the current green pixel is a Gb or Gr pixel. For instance, if G1 is Gr, then G2 is Gb, the pixel to the right of G1 is R (red), and the pixel below G1 is B (blue). Alternatively, if G1 is Gb, then G2 is Gr, and the pixel to the right of G1 is B, whereas the pixel below G1 is R. If the absolute difference between G1 and G2 is less than the GNU correction threshold value, then current green pixel G1 is replaced by the average of G1 and G2, as shown by the logic below:

$$\text{if } (\text{abs}(G1 - G2) \leq gnuTh); \quad G1 = \frac{G1 + G2}{2} \quad (31)$$

As can be appreciated, the application of green non-uniformity correction in this manner may help to prevent the G1 and G2 pixels from being averaged across edges, thus improving and/or preserving sharpness.

Horizontal filtering is applied subsequent to green non-uniformity correction and may, in one embodiment, provide a 7-tap horizontal filter. Gradients across the edge of each filter tap are computed, and if it is above a horizontal edge threshold (horzTh), the filter tap is folded to the center pixel, as will be illustrated below. The horizontal filter may process the image data independently for each color component (R, B, Gr, Gb) and may use unfiltered values as inputs values.

Figure 34:
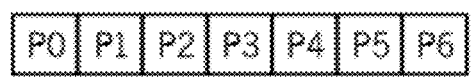
FIG. 34 illustrates a set of pixels that includes a center pixel and associated horizontal neighboring pixels that may be used as part of a horizontal filtering process for noise reduction, in accordance with aspects of the present disclosure.

By way of example, FIG. 34 shows a graphical depiction of a set of horizontal pixels P0 to P6, with a center tap positioned at P3. Based upon the pixels shown in FIG. 34, edge gradients for each filter tap may be calculated as follows:

$$Eh0 = abs(P0 - P1) \quad (32)$$

$$Eh1 = abs(P1 - P2) \quad (33)$$

$$Eh2 = abs(P2 - P3) \quad (34)$$

$$Eh3 = abs(P3 - P4) \quad (35)$$

$$Eh4 = abs(P4 - P5) \quad (36)$$

$$Eh5 = abs(P5 - P6) \quad (37)$$

The edge gradients Eh0-Eh5 may then be utilized by the horizontal filter component to determine a horizontal filtering output, $P_{horz}$, using the formula shown in Equation 38 below:

$$P_{horz}=C0\times[(Eh2>horzTh[c])?P3:(Eh1>horzTh[c])\\?P2:(Eh0>horzTh[c])?P1:P0]+C1\times\\ [(Eh2>horzTh[c])?P3:(Eh1>horzTh[c])?P2:P1]+\\C2\times[(Eh2>horzTh[c])?P3:P2]+C3\times P3+C4\times\\ [(Eh3>horzTh[c])?P3:P4]+C5\times[(Eh3>horzTh\\ [c])?P3:(Eh4>horzTh[c])?P4:P5]+C6\times\\ [(Eh3>horzTh[c])?P3:(Eh4>horzTh[c])?P4:\\ (Eh5>horzTh[c])?P5:P6], \quad (38)$$

wherein horzTh[c] is the horizontal edge threshold for each color component c (e.g., R, B, Gr, and Gb), and wherein C0-C6 are the filter tap coefficients corresponding to pixels P0-P6, respectively. The horizontal filter output $P_{horz}$ may be applied at the center pixel P3 location. In one embodiment, the filter tap coefficients C0-C6 may be 16-bit two's complement values with 3 integer bits and 13 fractional bits (3.13 in floating point). Further, it should be noted that the filter tap coefficients C0-C6 need not necessarily be symmetrical with respect to the center pixel P3.

Figure 35:
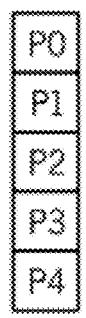
FIG. 35 illustrates a set of pixels that includes a center pixel and associated vertical neighboring pixels that may be used as part of a vertical filtering process for noise reduction, in accordance with aspects of the present disclosure.

Vertical filtering is also applied by the noise reduction logic 398 subsequent to green non-uniformity correction and horizontal filtering processes. In one embodiment, the vertical filter operation may provide a 5-tap filter, as shown in FIG. 35, with the center tap of the vertical filter located at P2. The vertical filtering process may occur in a similar manner as the horizontal filtering process described above. For instance, gradients across the edge of each filter tap are computed, and if it is above a vertical edge threshold (vertTh), the filter tap is folded to the center pixel P2. The vertical filter may process the image data independently for each color component (R, B, Gr, Gb) and may use unfiltered values as inputs values.

Based upon the pixels shown in FIG. 35, vertical edge gradients for each filter tap may be calculated as follows:

$$Ev0=abs(P0-P1) \quad (39)$$

$$Ev1=abs(P1-P2) \quad (40)$$

$$Ev2=abs(P2-P3) \quad (41)$$

$$Ev3=abs(P3-P4) \quad (42)$$

The edge gradients Ev0-Ev5 may then be utilized by the vertical filter to determine a vertical filtering output, $P_{vert}$, using the formula shown in Equation 43 below:

$$P_{vert}=C0\times[(Ev1>vertTh[c])?P2:(Ev0>vertTh[c])?P1:\\P0]+C1\times[(Ev1>vertTh[c])?P2:P1]+C2\times P2+C3\times\\ [(Ev2>vertTh[c])?P2:P3]+C4\times[(Ev2>vertTh[c])\\ ?P2:(Eh3>vertTh[c])?P3:P4], \quad (43)$$

wherein vertTh[c] is the vertical edge threshold for each color component c (e.g., R, B, Gr, and Gb), and wherein C0-C4 are the filter tap coefficients corresponding to the pixels P0-P4 of FIG. 35, respectively. The vertical filter output $P_{vert}$ may be applied at the center pixel P2 location. In one embodiment, the filter tap coefficients C0-C4 may be 16-bit two's complement values with 3 integer bits and 13 fractional bits (3.13 in floating point). Further, it should be noted that the filter tap coefficients C0-C4 need not necessarily be symmetrical with respect to the center pixel P2.

Additionally, with regard to boundary conditions, when neighboring pixels are outside of the raw frame 154 (FIG. 9), the values of the out-of-bound pixels are replicated with the value of same color pixel at the edge of the raw frame. This convention may be implemented for both horizontal and vertical filtering operations. By way of example, referring again to FIG. 34, in the case of horizontal filtering, if the pixel P2 is an edge pixel at the left-most edge of the raw frame, and the pixels P0 and P1 are outside of the raw frame, then the values of the pixels P0 and P1 are substituted with the value of the pixel P2 for horizontal filtering.

Referring again back to the block diagram of the raw processing logic 360 shown in FIG. 28, the output of the noise reduction logic 398 is subsequently sent to the lens shading correction (LSC) logic 400 for processing. As discussed above, lens shading correction techniques may include applying an appropriate gain on a per-pixel basis to compensate for drop-offs in light intensity, which may be the result of the geometric optics of the lens, imperfections in manufacturing, misalignment of the microlens array and the color array filter, and so forth. Further, the infrared (IR) filter in some lenses may cause the drop-off to be illuminant-dependent and, thus, lens shading gains may be adapted depending upon the light source detected.

In the depicted embodiment, the LSC logic 400 of the ISP pipe 82 may be implemented in a similar manner, and thus provide generally the same functions, as the LSC logic 234 of the ISP front-end block 80, as discussed above with reference to FIGS. 18-26. Accordingly, in order to avoid redundancy, it should be understood that the LSC logic 400 of the presently illustrated embodiment is configured to operate in generally the same manner as the LSC logic 230 and, as such, the description of the lens shading correction techniques provided above will not be repeated here. However, to generally summarize, it should be understood that the LSC logic 400 may process each color component of the raw pixel data stream independently to determine a gain to apply to the current pixel. In accordance with the above-discussed embodiments, the lens shading correction gain may be determined based upon a defined set of gain grid points distributed across the imaging frame, wherein the interval between each grid point is defined by a number of pixels (e.g., 8 pixels, 16 pixels etc.). If the location of the current pixel corresponds to a grid point, then the gain value associated with that grid point is applied to the current pixel. However, if the location of the current pixel is between grid points (e.g., G0, G1, G2, and G3 of FIG. 21), then the LSC gain value may be calculated by interpolation of the grid points between which the current pixel is located (Equations 11a and 11b). This process is depicted by the process 310 of FIG. 22. Further, as mentioned above with respect to FIG. 20, in some embodiments, the grid points may be distributed unevenly (e.g., logarithmically), such that the grid points are less concentrated in the center of the LSC region 280, but more concentrated towards the corners of the LSC region 280, typically where lens shading distortion is more noticeable.

Additionally, as discussed above with reference to FIGS. 25 and 26, the LSC logic 400 may also apply a radial gain component with the grid gain values. The radial gain component may be determined based upon distance of the current pixel from the center of the image (Equations 12-14). As mentioned, using a radial gain allows for the use of single common gain grid for all color components, which may greatly reduce the total storage space required for storing separate gain grids for each color component. This reduction in grid gain data may decrease implementation costs, as grid gain data tables may account for a significant portion of memory or chip area in image processing hardware.

Figure 28:
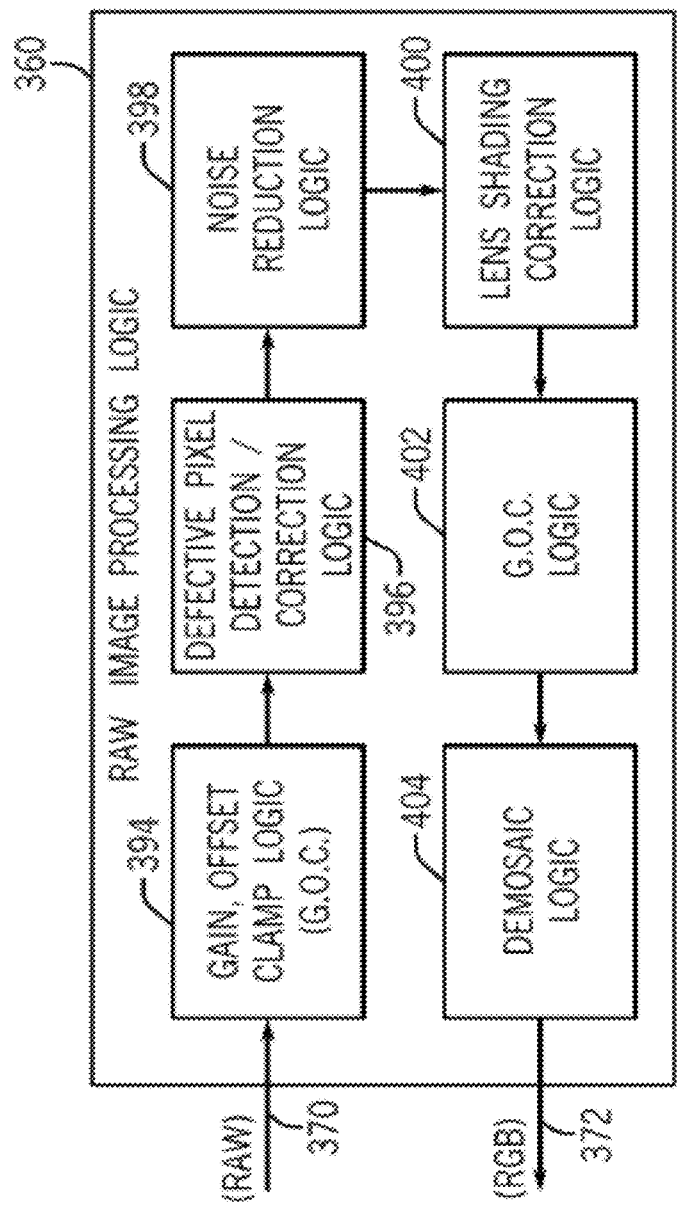
FIG. 28 is a more detailed view showing an embodiment of a raw pixel processing block that may be implemented in the ISP pipe processing logic of FIG. 27, in accordance with aspects of the present disclosure.
Figure 29:
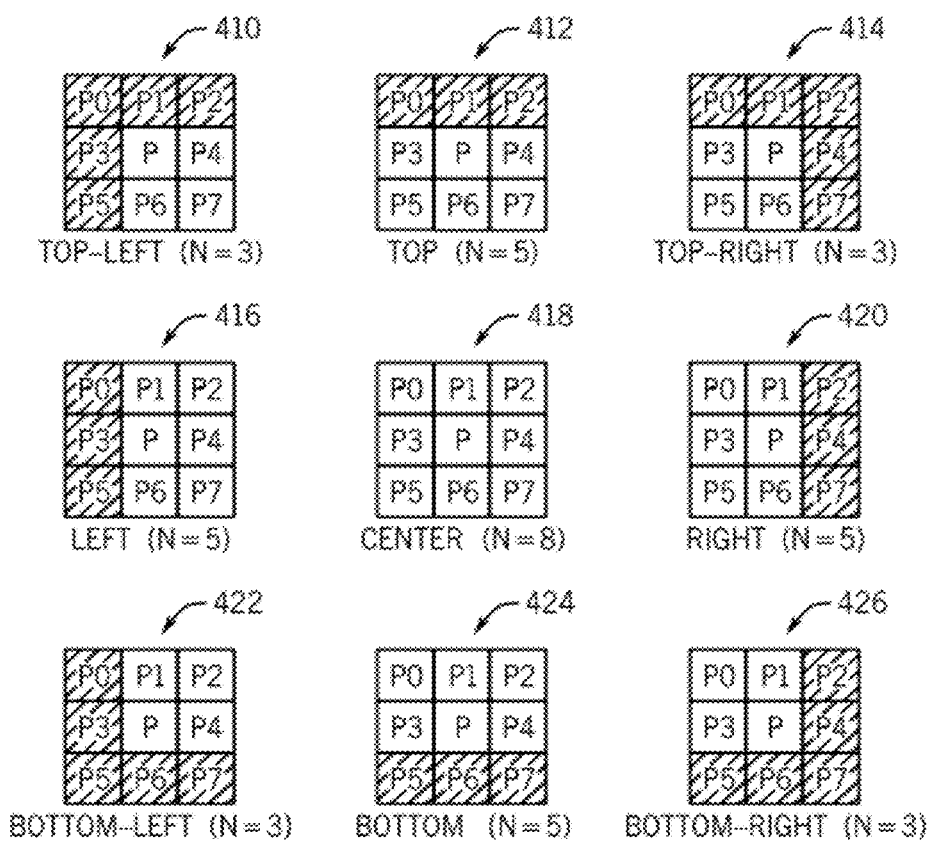
FIG. 29 shows various image frame boundary cases that may be considered when applying techniques for detecting and correcting defective pixels during processing by the raw pixel processing block shown in FIG. 28, in accordance with aspects of the present disclosure.

Next, referring again to the raw processing logic block diagram 360 of FIG. 28, the output of the LSC logic 400 is then passed to a second gain, offset, and clamping (GOC) block 402. The GOC logic 402 may be applied prior to demosaicing (by logic block 404) and may be used to perform auto-white balance on the output of the LSC logic 400. In the depicted embodiment, the GOC logic 402 may be implemented in the same manner as the GOC logic 394 (and the BLC logic 232). Thus, in accordance with the Equation 9 above, the input received by the GOC logic 402 is first offset by a signed value and then multiplied by a gain. The resulting value is then clipped to a minimum and a maximum range in accordance with Equation 10.

Thereafter, the output of the GOC logic 402 is forwarded to the demosaicing logic 404 for processing to produce a full color (RGB) image based upon the raw Bayer input data. As will be appreciated, the raw output of an image sensor using a color filter array, such as a Bayer filter is "incomplete" in the sense that each pixel is filtered to acquire only a single color component. Thus, the data collected for an individual pixel alone is insufficient to determine color. Accordingly, demosaicing techniques may be used to generate a full color image from the raw Bayer data by interpolating the missing color data for each pixel.

Figure 36:
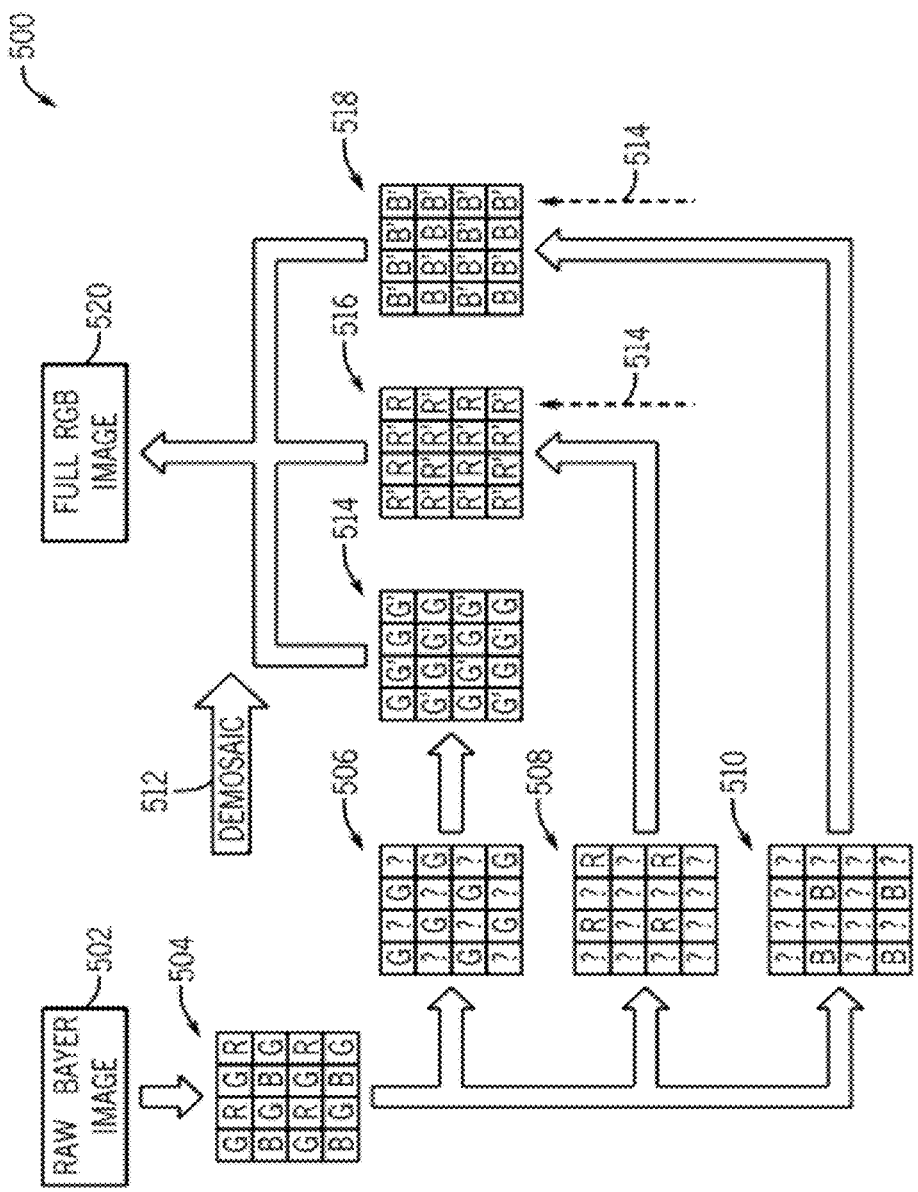
FIG. 36 is a simplified flow diagram that depicts how demosaicing may be applied to a raw Bayer image pattern to produce a full color RGB image.

Referring now to FIG. 36, a graphical process flow 500 that provides a general overview as to how demosaicing may be applied to a raw Bayer image pattern 502 to produce a full color RGB is illustrated. As shown, a 4×4 portion 504 of the raw Bayer image 502 may include separate channels for each color component, including a green channel 506, a red channel 508, and a blue channel 510. Because each imaging pixel in a Bayer sensor only acquires data for one color, the color data for each color channel 506, 508, and 510 may be incomplete, as indicated by the "?" symbols. By applying a demosaicing technique 512, the missing color samples from each channel may be interpolated. For instance, as shown by reference number 514, interpolated data G' may be used to fill the missing samples on the green color channel Similarly, interpolated data R' may (in combination with the interpolated data G' 514) be used to fill the missing samples on the red color channel 516, and interpolated data B' may (in combination with the interpolated data G' 514) be used to fill the missing samples on the blue color channel 518. Thus, as a result of the demosaicing process, each color channel (R, G, B) will have a full set of color data, which may then be used to reconstruct a full color RGB image 520.

A demosaicing technique that may be implemented by the demosaicing logic 404 will now be described in accordance with one embodiment. On the green color channel, missing color samples may be interpolated using a low pass directional filter on known green samples and a high pass (or gradient) filter on the adjacent color channels (e.g., red and blue). For the red and blue color channels, the missing color samples may be interpolated in a similar manner, but by using low pass filtering on known red or blue values and high pass filtering on co-located interpolated green values. Further, in one embodiment, demosaicing on the green color channel may utilize a 5×5 pixel block edge-adaptive filter based on the original Bayer color data. As will be discussed further below, the use of an edge-adaptive filter may provide for the continuous weighting based on gradients of horizontal and vertical filtered values, which reduce the appearance of certain artifacts, such as aliasing, "checkerboard," or "rainbow" artifacts, commonly seen in conventional demosaicing techniques.

During demosaicing on the green channel, the original values for the green pixels (Gr and Gb pixels) of the Bayer image pattern are used. However, in order to obtain a full set of data for the green channel, green pixel values may be interpolated at the red and blue pixels of the Bayer image pattern. In accordance with the present technique, horizontal and vertical energy components, respectively referred to as Eh and Ev, are first calculated at red and blue pixels based on the above-mentioned 5×5 pixel block. The values of Eh and Ev may be used to obtain an edge-weighted filtered value from the horizontal and vertical filtering steps, as discussed further below.

Figure 37:
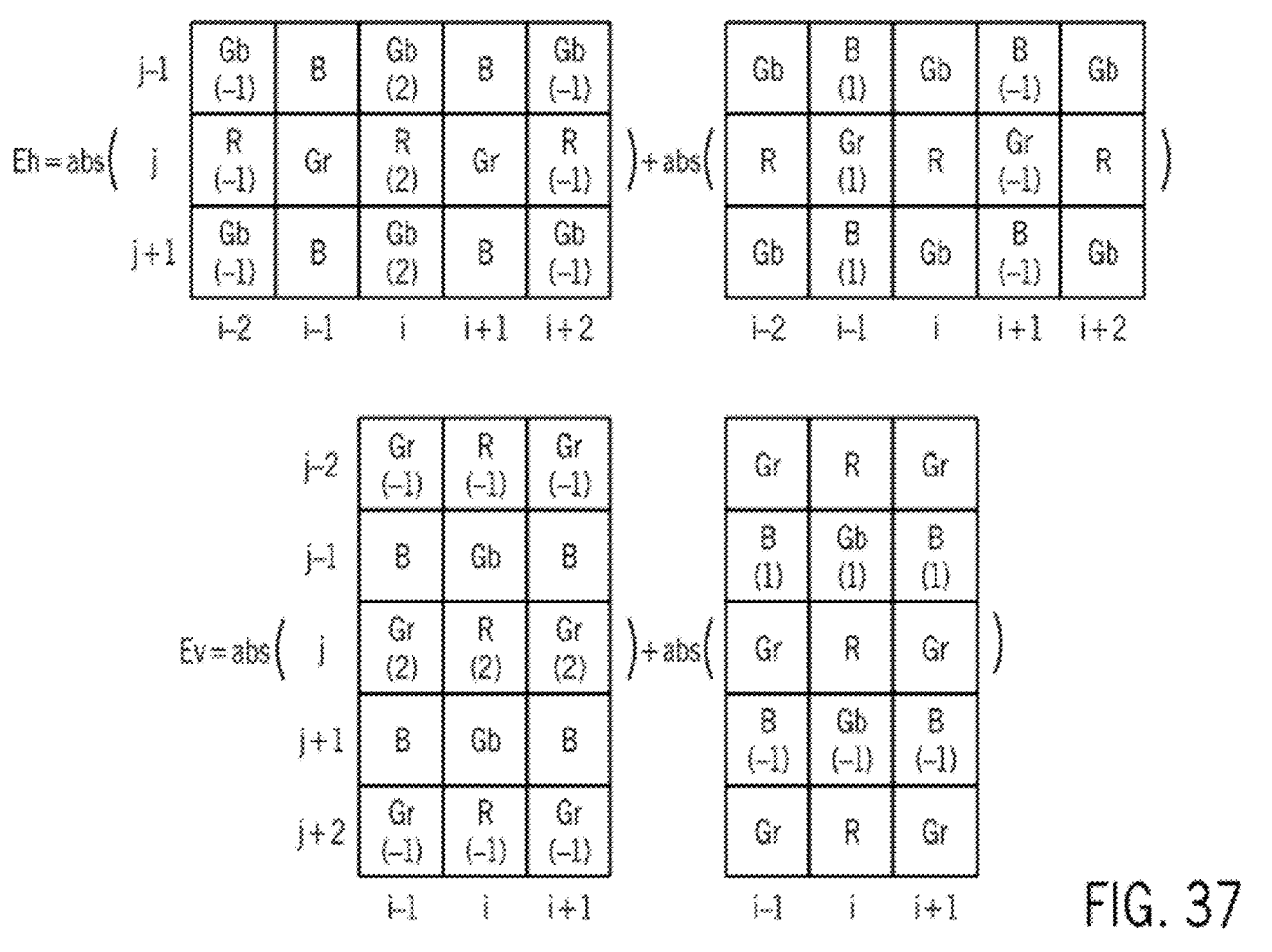

By way of example, FIG. 37 illustrates the computation of the Eh and Ev values for a red pixel centered in the 5×5 pixel block at location (j, i), wherein j corresponds to a row and i corresponds to a column. As shown, the calculation of Eh considers the middle three rows (j−1, j, j+1) of the 5×5 pixel block, and the calculation of Ev considers the middle three columns (i−1, i, i+1) of the 5×5 pixel block. To compute Eh, the absolute value of the sum of each of the pixels in the red columns (i−2, i, i+2) multiplied by a corresponding coefficient (e.g., −1 for columns i−2 and i+2; 2 for column i) is summed with the absolute value of the sum of each of the pixels in the blue columns (i−1, i+1) multiplied by a corresponding coefficient (e.g., 1 for column i−1; −1 for column i+1). To compute Ev, the absolute value of the sum of each of the pixels in the red rows (j−2, j, j+2) multiplied by a corresponding coefficient (e.g., −1 for rows j−2 and j+2; 2 for row j) is summed with the absolute value of the sum of each of the pixels in the blue rows (j−1, j+1) multiplied by a corresponding coefficient (e.g., 1 for row j−1; −1 for row j+1). These computations are illustrated by Equations 44 and 45 below:

$$Eh=abs[2((P(j-1,i)+P(j,i)+P(j+1,i))(P(j-1,i-2)+P(j,i-2)+P(j+1,i-2))-(P(j-1,i+2)+P(j,i+2)+P(j+1,i+2))]+abs[(P(j-1,i-1)+P(j,i-1)+P(j+1,i-1))-(P(j-1,i+1)+P(j,i+1)+P(j+1,i+1)] \quad (44)$$

$$Ev=abs[2(P(j,i-1)+P(j,i)+P(j,i+1))-(P(j-2,i-1)+P(j-2,i)+P(j-2,i+1))-(P(j+2,i-1)+P(j+2,i)+P(j+2,i+1)]+abs[(P(j-1,i-1)+P(j-1,i)+P(j-1,i+1))-(P(j+1,i-1)+P(j+1,i)+P(j+1,i+1)] \quad (45)$$

Thus, the total energy sum may be expressed as: Eh+Ev. Further, while the example shown in FIG. 37 illustrates the computation of Eh and Ev for a red center pixel at (j, i), it should be understood that the Eh and Ev values may be determined in a similar manner for blue center pixels.

Next, horizontal and vertical filtering may be applied to the Bayer pattern to obtain the vertical and horizontal filtered values Gh and Gv, which may represent interpolated green values in the horizontal and vertical directions, respectively. The filtered values Gh and Gv may be determined using a low pass filter on known neighboring green samples in addition to using directional gradients of the adjacent color (R or B) to obtain a high frequency signal at the locations of the missing green samples. For instance, with reference to FIG. 38, an example of horizontal interpolation for determining Gh will now be illustrated.

Figure 38:
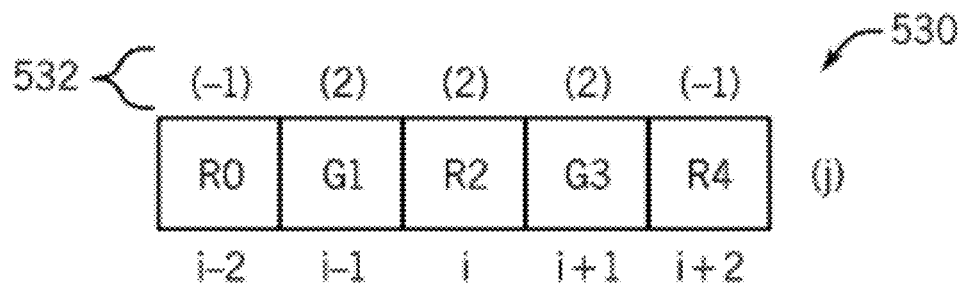
FIG. 38 shows a set of horizontal pixels to which filtering may be applied to determine a horizontal component of an interpolated green color value during demosaicing of a Bayer image pattern, in accordance with aspects of the present technique.
Figure 39:
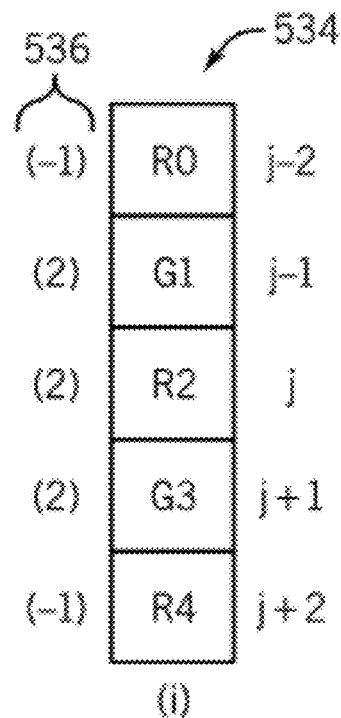
FIG. 39 shows a set of vertical pixels to which filtering may be applied to determine a vertical component of an interpolated green color value during demosaicing of a Bayer image pattern, in accordance with aspects of the present technique.

As shown in FIG. 38, five horizontal pixels (R0, G1, R2, G3, and R4) of a red line 530 of the Bayer image, wherein R2 is assumed to be the center pixel at (j, i), may be considered in determining Gh. Filtering coefficients associated with each of these five pixels are indicated by reference numeral 532. Accordingly, the interpolation of a green value, referred to as G2', for the center pixel R2, may be determined as follows:

$$G2' = \frac{G1+G3}{2} + \frac{2R2-\left(\frac{R0+R2}{2}\right)-\left(\frac{R2+R4}{2}\right)}{2} \quad (46)$$

Various mathematical operations may then be utilized to produce the expression for G2' shown in Equations 47 and 48 below:

$$G2' = \frac{2G1 + 2G3}{4} + \frac{2R2 - R0 - R2 - R2 - R4}{4} \quad (47)$$

$$G2' = \frac{2G1 + 2G3 + 2R2 - R0 - R4}{4} \quad (48)$$

Thus, with reference to FIG. 38 and the Equations 46-48 above, the general expression for the horizontal interpolation for the green value at (j, i) may be derived as:

$$Gh = \frac{\begin{pmatrix} 2P(j, i-1) + 2P(j, i+1) + 2P(j, i) - \\ P(j, i-2) - P(j, i+2) \end{pmatrix}}{4} \quad (49)$$

The vertical filtering component Gv may be determined in a similar manner as Gh. For example, referring to FIG. 39, five vertical pixels (R0, G1, R2, G3, and R4) of a red column 534 of the Bayer image and their respective filtering coefficients 536, wherein R2 is assumed to be the center pixel at (j, i), may be considered in determining Gv. Using low pass filtering on the known green samples and high pass filtering on the red channel in the vertical direction, the following expression may be derived for Gv:

$$Gv = \frac{\begin{pmatrix} 2P(j-1, i) + 2P(j+1, i) + 2P(j, i) - \\ P(j-2, i) - P(j+2, i) \end{pmatrix}}{4} \quad (50)$$

While the examples discussed herein have shown the interpolation of green values on a red pixel, it should be understood that the expressions set forth in Equations 49 and 50 may also be used in the horizontal and vertical interpolation of green values for blue pixels.

The final interpolated green value G' for the center pixel (j, i) may be determined by weighting the horizontal and vertical filter outputs (Gh and Gv) by the energy components (Eh and Ev) discussed above to yield the following equation:

$$G'(j, i) = \left(\frac{Ev}{Eh + Ev}\right)Gh + \left(\frac{Eh}{Eh + Ev}\right)Gv \quad (51)$$

As discussed above, the energy components Eh and Ev may provide for edge-adaptive weighting of the horizontal and vertical filter outputs Gh and Gv, which may help to reduce image artifacts, such as rainbow, aliasing, or checkerboard artifacts, in the reconstructed RGB image. Additionally, the demosaicing logic 404 may provide an option to bypass the edge-adaptive weighting feature by setting the Eh and Ev values each to 1, such that Gh and Gv are equally weighted.

In one embodiment, the horizontal and vertical weighting coefficients, shown in Equation 51 above, may be quantized to reduce the precision of the weighting coefficients to a set of "coarse" values. For instance, in one embodiment, the weighting coefficients may be quantized to eight possible weight ratios: 1/8, 2/8, 3/8, 4/8, 5/8, 6/8, 7/8, and 8/8. Other embodiments may quantize the weighting coefficients into 16 values (e.g., 1/16 to 16/16), 32 values (1/32 to 32/32), and so forth. As can be appreciated, when compared to using full precision values (e.g., 32-bit floating point values), the quantization of the weight coefficients may reduce the implementation complexity when determining and applying the weighting coefficients to horizontal and vertical filter outputs.

In further embodiments, the presently disclosed techniques, in addition to determining and using horizontal and vertical energy components to apply weighting coefficients to the horizontal (Gh) and vertical (Gv) filtered values, may also determine and utilize energy components in the diagonal-positive and diagonal-negative directions. For instance, in such embodiments, filtering may also be applied in the diagonal-positive and diagonal-negative directions. Weighting of the filter outputs may include selecting the two highest energy components, and using the selected energy components to weight their respective filter outputs. For example, assuming that the two highest energy components correspond to the vertical and diagonal-positive directions, the vertical and diagonal-positive energy components are used to weight the vertical and diagonal-positive filter outputs to determine the interpolated green value (e.g., at a red or blue pixel location in the Bayer pattern).

Next, demosaicing on the red and blue color channels may be performed by interpolating red and blue values at the green pixels of the Bayer image pattern, interpolating red values at the blue pixels of the Bayer image pattern, and interpolating blue values at the red pixels of the Bayer image pattern. In accordance with the present discussed techniques, missing red and blue pixel values may be interpolated using low pass filtering based upon known neighboring red and blue pixels and high pass filtering based upon co-located green pixel values, which may be original or interpolated values (from the green channel demosaicing process discussed above) depending on the location of the current pixel. Thus, with regard to such embodiments, it should be understood that interpolation of missing green values may be performed first, such that a complete set of green values (both original and interpolated values) is available when interpolating the missing red and blue samples.

Figure 40:
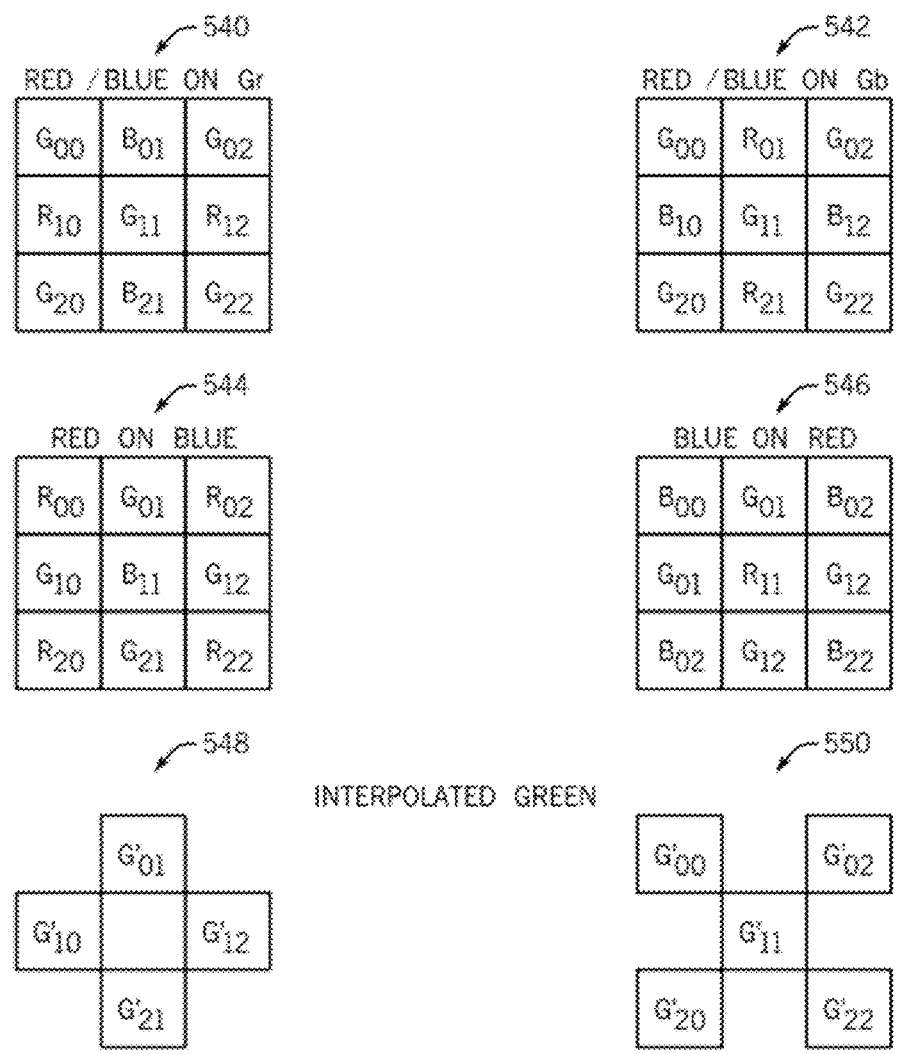
FIG. 40 shows various 3×3 pixel blocks to which filtering may be applied to determine interpolated red and blue values during demosaicing of a Bayer image pattern, in accordance with aspects of the present technique.

The interpolation of red and blue pixel values may be described with reference to FIG. 40, which illustrates various 3×3 blocks of the Bayer image pattern to which red and blue demosaicing may be applied, as well as interpolated green values (designated by G') that may have been obtained during demosaicing on the green channel. Referring first to block 540, the interpolated red value, $R'_{11}$, for the Gr pixel ($G_{11}$) may be determined as follows:

$$R'_{11} = \frac{(R_{10} + R_{12})}{2} + \frac{(2G_{11} - G'_{10} - G'_{12})}{2}, \quad (52)$$

where $G'_{10}$ and $G'_{12}$ represent interpolated green values, as shown by reference number 548. Similarly, the interpolated blue value, $B'_{11}$, for the Gr pixel ($G_{11}$) may be determined as follows:

$$B'_{11} = \frac{(B_{01} + B_{21})}{2} + \frac{(2G_{11} - G'_{01} - G'_{21})}{2}, \quad (53)$$

wherein $G'_{01}$ and $G'_{21}$ represent interpolated green values (548).

Next, referring to the pixel block 542, in which the center pixel is a Gb pixel ($G_{11}$), the interpolated red value, $R'_{11}$, and blue value $B'_{11}$, may be determined as shown in Equations 54 and 55 below:

$$R'_{11} = \frac{(R_{01} + R_{21})}{2} + \frac{(2G_{11} - G'_{01} - G'_{21})}{2} \quad (54)$$

$$B'_{11} = \frac{(B_{10} + B_{12})}{2} + \frac{(2G_{11} - G'_{10} - G'_{12})}{2} \quad (55)$$

Further, referring to pixel block 544, the interpolation of a red value on a blue pixel, $B_{11}$, may be determined as follows:

$$R'_{11} = \frac{(R_{00} + R_{02} + R_{20} + R_{22})}{4} + \frac{(4G'_{11} - G'_{00} - G'_{02} - G'_{20} - G'_{22})}{4}, \quad (56)$$

wherein $G'_{00}$, $G'_{02}$, $G'_{11}$, $G'_{20}$, and $G'_{22}$ represent interpolated green values, as shown by reference number 550. Finally, the interpolation of a blue value on a red pixel, as shown by pixel block 546, may be calculated as follows:

$$B'_{11} = \frac{(B_{00} + B_{02} + B_{20} + B_{22})}{4} + \frac{(4G'_{11} - G'_{00} - G'_{02} - G'_{20} - G'_{22})}{4} \quad (57)$$

While the embodiment discussed above relied on color differences (e.g., gradients) for determining red and blue interpolated values, another embodiment may provide for interpolated red and blue values using color ratios. For instance, interpolated green values (blocks 548 and 550) may be used to obtain a color ratio at red and blue pixel locations of the Bayer image pattern, and linear interpolation of the ratios may be used to determine an interpolated color ratio for the missing color sample. The green value, which may be an interpolated or an original value, may be multiplied by the interpolated color ratio to obtain a final interpolated color value. For instance, interpolation of red and blue pixel values using color ratios may be performed in accordance with the formulas below, wherein Equations 58 and 59 show the interpolation of red and blue values for a Gr pixel, Equations 60 and 61 show the interpolation of red and blue values for a Gb pixel, Equation 62 shows the interpolation of a red value on a blue pixel, and Equation 63 shows the interpolation of a blue value on a red pixel:

$$R'_{11} = G_{11} \frac{\left(\frac{R_{10}}{G'_{10}}\right) + \left(\frac{R_{12}}{G'_{12}}\right)}{2} \quad (58)$$

($R'_{11}$ interpolated when $G_{11}$ is a Gr pixel)

$$B'_{11} = G_{11} \frac{\left(\frac{B_{01}}{G'_{01}}\right) + \left(\frac{B_{21}}{G'_{21}}\right)}{2} \quad (59)$$

($B'_{11}$ interpolated when $G_{11}$ is a Gr pixel)

$$R'_{11} = G_{11} \frac{\left(\frac{R_{01}}{G'_{01}}\right) + \left(\frac{R_{21}}{G'_{21}}\right)}{2} \quad (60)$$

($R'_{11}$ interpolated when $G_{11}$ is a Gb pixel)

$$B'_{11} = G_{11} \frac{\left(\frac{B_{10}}{G'_{10}}\right) + \left(\frac{B_{12}}{G'_{12}}\right)}{2} \quad (61)$$

($B'_{11}$ interpolated when $G_{11}$ is a Gb pixel)

$$R'_{11} = G'_{11} \frac{\left(\frac{R_{00}}{G'_{00}}\right) + \left(\frac{R_{02}}{G'_{02}}\right) + \left(\frac{R_{20}}{G'_{20}}\right) + \left(\frac{R_{22}}{G'_{22}}\right)}{4} \quad (62)$$

($R'_{11}$ interpolated on a blue pixel $B_{11}$)

$$B'_{11} = G'_{11} \frac{\left(\frac{B_{00}}{G'_{00}}\right) + \left(\frac{B_{02}}{G'_{02}}\right) + \left(\frac{B_{20}}{G'_{20}}\right) + \left(\frac{B_{22}}{G'_{22}}\right)}{4} \quad (63)$$

($B'_{11}$ interpolated on a red pixel $R_{11}$)

Once the missing color samples have been interpolated for each image pixel from the Bayer image pattern, a complete sample of color values for each of the red, blue, and green color channels (e.g., 514, 516, and 518 of FIG. 36) may be combined to produce a full color RGB image. For instance, referring back FIGS. 27 and 28, the output 372 of the raw pixel processing logic 360 may be an RGB image signal in 8, 10, 12 or 14-bit formats.

Figure 41:
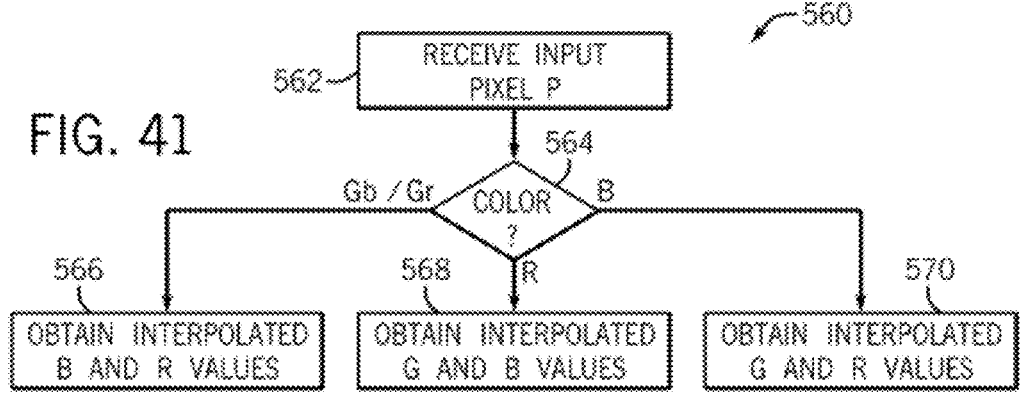
FIGS. 41-44 provide flowcharts that depict various processes for interpolating green, red, and blue color values during demosaicing of a Bayer image pattern, in accordance with one embodiment.

Referring now to FIGS. 41-44, various flow charts illustrating processes for demosaicing a raw Bayer image pattern in accordance with disclosed embodiments are illustrated. Specifically, the process 560 of FIG. 41 depicts the determination of which color components are to be interpolated for a given input pixel P. Based on the determination by process 560, one or more of the process 572 (FIG. 42) for interpolating a green value, the process 584 (FIG. 43) for interpolating a red value, or the process 598 (FIG. 44) for interpolating a blue value may be performed (e.g., by the demosaicing logic 404).

Beginning with FIG. 41, the process 560 begins at step 562 when an input pixel P is received. Decision logic 564 determines the color of the input pixel. For instance, this may depend on the location of the pixel within the Bayer image pattern. Accordingly, if P is identified as being a green pixel (e.g., Gr or Gb), the process 560 proceeds to step 566 to obtain interpolated red and blue values for P. This may include, for example, continuing to the processes 584 and 598 of FIGS. 43 and 44, respectively. If P is identified as being a red pixel, then the process 560 proceeds to step 568 to obtain interpolated green and blue values for P. This may include further performing the processes 572 and 598 of FIGS. 42 and 44, respectively. Additionally, if P is identified as being a blue pixel, then the process 560 proceeds to step 570 to obtain interpolated green and red values for P. This may include further performing the processes 572 and 584 of FIGS. 42 and 43, respectively. Each of the processes 572, 584, and 598 are described further below.

Figure 42:
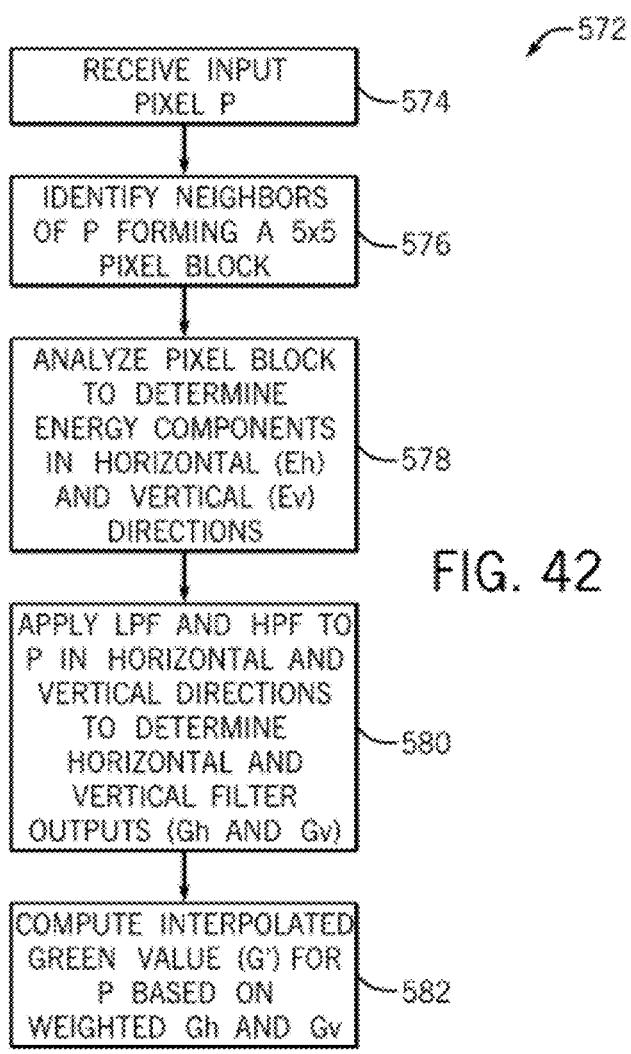

The process 572 for determining an interpolated green value for the input pixel P is illustrated in FIG. 42 and includes steps 574-582. At step 574, the input pixel P is received (e.g., from process 560). Next, at step 576, a set of neighboring pixels forming a 5×5 pixel block is identified, with P being the center of the 5×5 block. Thereafter, the pixel block is analyzed to determine horizontal and vertical energy components at step 578. For instance, the horizontal and vertical energy components may be determined in accordance with Equations 44 and 45 for calculating Eh and Ev, respectively. As discussed, the energy components Eh and Ev may be used as weighting coefficients to provide edge-adaptive filtering and, therefore, reduce the appearance of certain demosaicing artifacts in the final image. At step 580, low pass filtering and high pass filtering as applied in horizontal and vertical directions to determine horizontal and vertical filtering outputs. For example, the horizontal and vertical filtering outputs, Gh and Gv, may be calculated in accordance with Equations 49 and 50. Next the process 560 continues to step 582, at which the interpolated green value G' is interpolated based on the values of Gh and Gv weighted with the energy components Eh and Ev, as shown in Equation 51.

Figure 43:
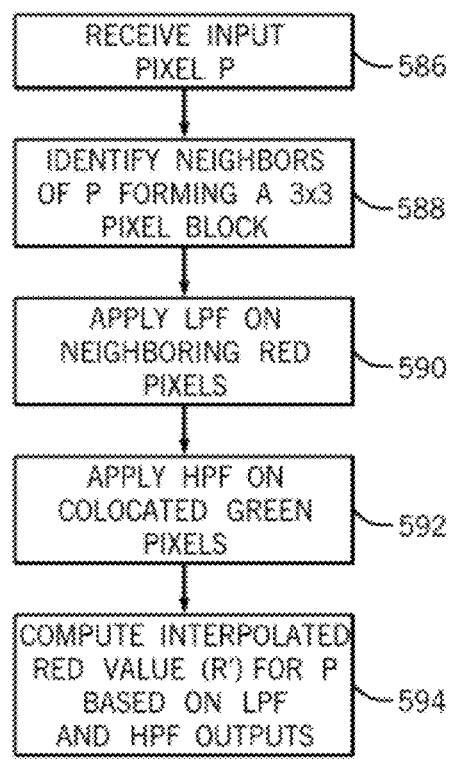

Next, with regard to the process 584 of FIG. 43, the interpolation of red values may begin at step 586, at which the input pixel P is received (e.g., from process 560). At step 588, a set of neighboring pixels forming a 3×3 pixel block is identified, with P being the center of the 3×3 block. Thereafter, low pass filtering is applied on neighboring red pixels within the 3×3 block at step 590, and high pass filtering is applied on co-located green neighboring values, which may be original green values captured by the Bayer image sensor, or interpolated values (e.g., determined via process 572 of FIG. 42). The interpolated red value R' for P may be determined based on the low pass and high pass filtering outputs, as shown at step 594. Depending on the color of P, R' may be determined in accordance with one of the Equations 52, 54, or 56.

Figure 44:
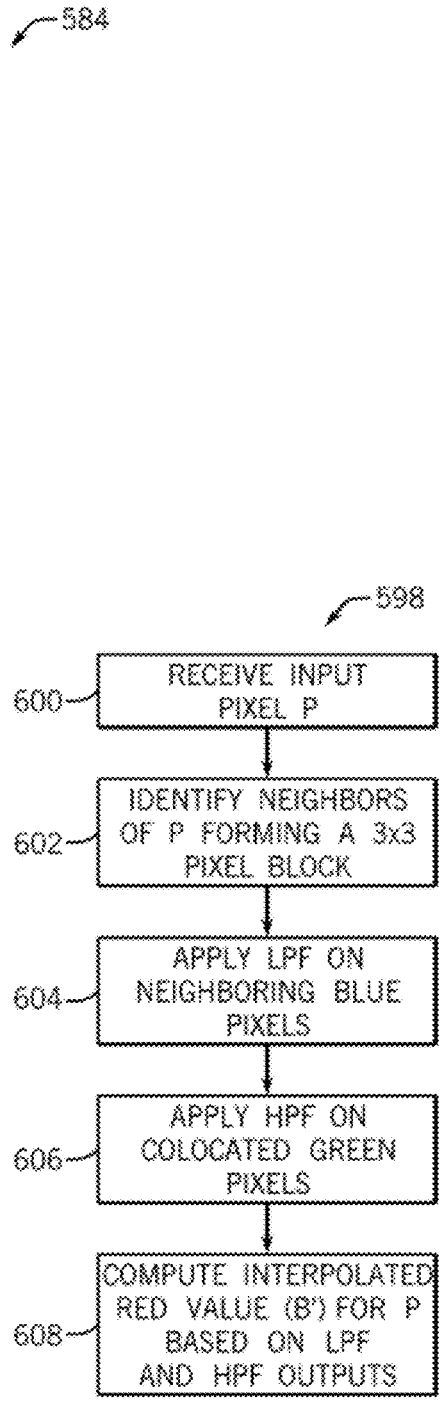

With regard to the interpolation of blue values, the process 598 of FIG. 44 may be applied. The steps 600 and 602 are generally identical to the steps 586 and 588 of the process 584 (FIG. 43). At step 604, low pass filtering is applied on neighboring blue pixels within the 3×3, and, at step 606, high pass filtering is applied on co-located green neighboring values, which may be original green values captured by the Bayer image sensor, or interpolated values (e.g., determined via process 572 of FIG. 42). The interpolated blue value B' for P may be determined based on the low pass and high pass filtering outputs, as shown at step 608. Depending on the color of P, B' may be determined in accordance with one of the Equations 53, 55, or 57. Further, as mentioned above, the interpolation of red and blue values may be determined using color differences (Equations 52-27) or color ratios (Equations 58-63). Again, it should be understood that interpolation of missing green values may be performed first, such that a complete set of green values (both original and interpolated values) is available when interpolating the missing red and blue samples. For example, the process 572 of FIG. 42 may be applied to interpolate all missing green color samples before performing the processes 584 and 598 of FIGS. 43 and 44, respectively.

Figure 45:
FIG. 45 shows a colored drawing of an original image scene that may be captured by an image sensor and processed in accordance with aspects of the demosaicing techniques disclosed herein.
Figure 46:
FIG. 46 shows a colored drawing of a Bayer image pattern of the image scene shown in FIG. 45.
Figure 47:
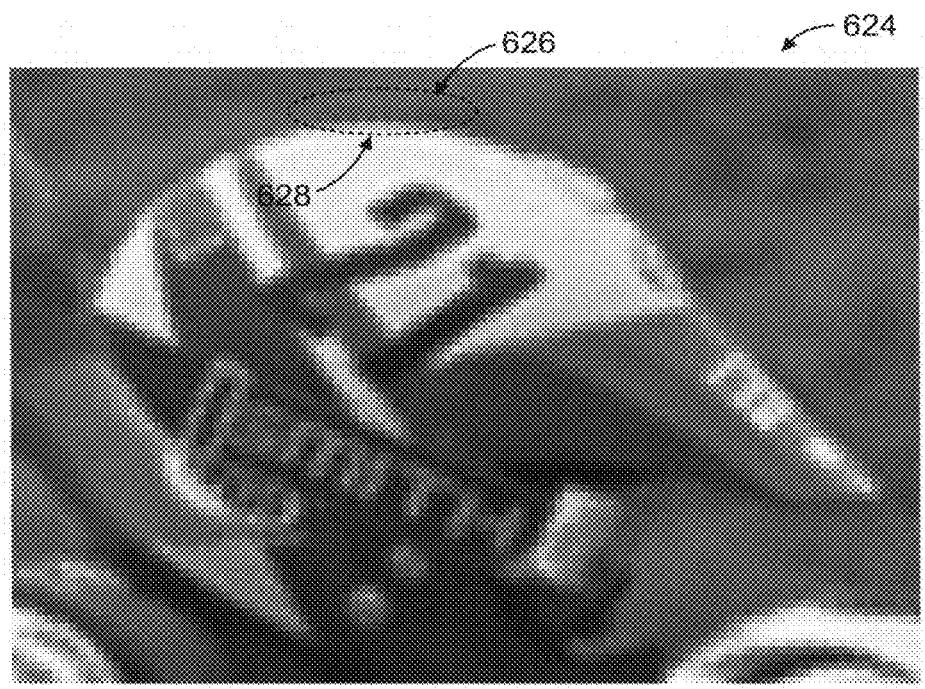
FIG. 47 shows a colored drawing of an RGB image reconstructed using a conventional demosaicing technique based upon the Bayer image pattern of FIG. 46.
Figure 48:
FIG. 48 shows a colored drawing of an RGB image reconstructed from the Bayer image pattern of FIG. 46 in accordance with aspects of the demosaicing techniques disclosed herein.

Referring to FIGS. 45-48, examples of colored drawings of images processed by the raw pixel processing logic 360 in the ISP pipe 82 are provided. FIG. 45 depicts an original image scene 620, which may be captured by the image sensor 90 of the imaging device 30. FIG. 46 shows a raw Bayer image 622 which may represent the raw pixel data captured by the image sensor 90. As mentioned above, conventional demosaicing techniques may not provide for adaptive filtering based on the detection of edges (e.g., borders between areas of two or more colors) in the image data, which may, undesirably, produce artifacts in the resulting reconstructed full color RGB image. For instance, FIG. 47 shows an RGB image 624 reconstructed using conventional demosaicing techniques, and may include artifacts, such as "checkerboard" artifacts 626 at the edge 628. However, comparing the image 624 to the RGB image 630 of FIG. 48, which may be an example of an image reconstructed using the demosaicing techniques described above, it can be seen that the checkerboard artifacts 626 present in FIG. 47 are not present, or at least their appearance is substantially reduced at the edge 628. Thus, the images shown in FIGS. 45-48 are intended to illustrate at least one advantage that the demosaicing techniques disclosed herein have over conventional methods.

Referring back to FIG. 27, having now thoroughly described the operation of the raw pixel processing logic 360, which may output an RGB image signal 372, the present discussion will now focus on describing the processing of the RGB image signal 372 by the RGB processing logic 362. As shown the RGB image signal 372 may be sent to the selection logic 376 and/or to the memory 108. The RGB processing logic 362 may receive the input signal 378, which may be RGB image data from the signal 372 or from the memory 108, as shown by signal 374, depending on the configuration of the selection logic 376. The RGB image data 378 may be processed by the RGB processing logic 362 to perform color adjustments operations, including color correction (e.g., using a color correction matrix), the application of color gains for auto-white balancing, as well as global tone mapping, and so forth.

Figure 49:
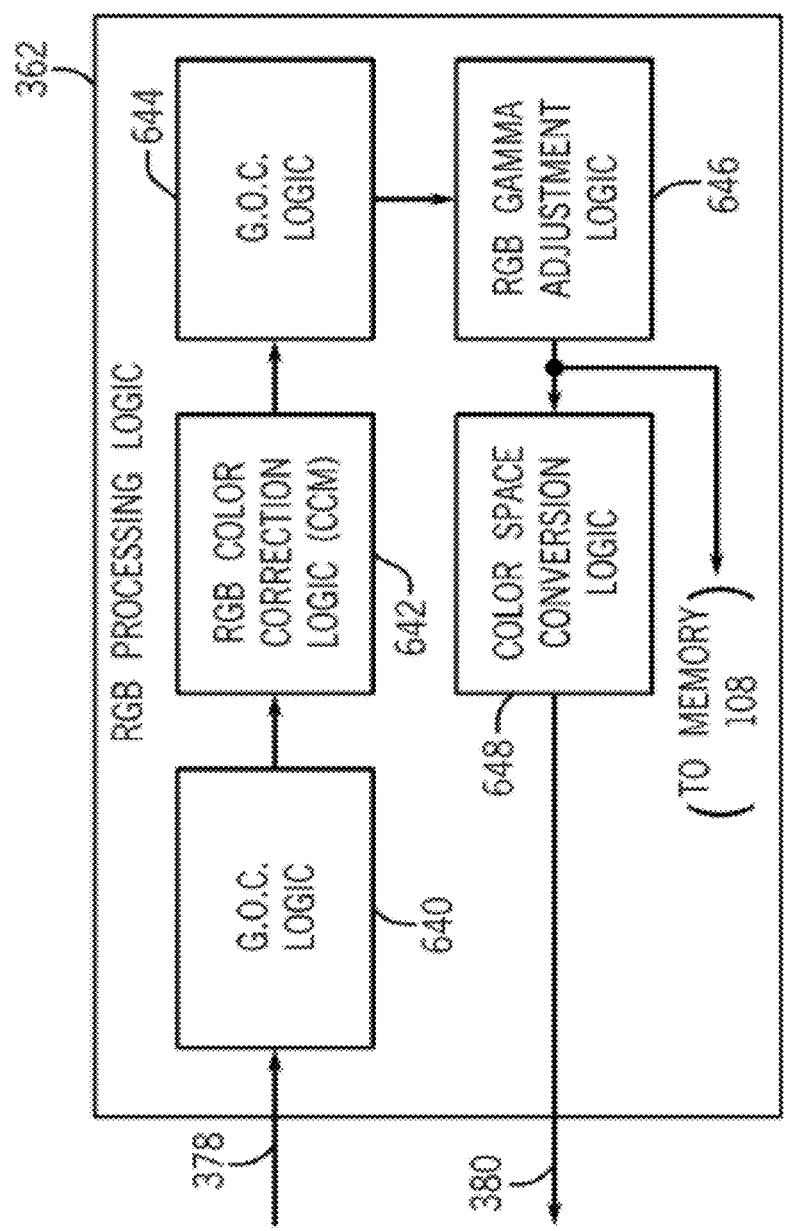
FIG. 49 is a more detailed view showing one embodiment of an RGB processing block that may be implemented in the ISP pipe processing logic of FIG. 27, in accordance with aspects of the present disclosure.

A block diagram depicting a more detailed view of an embodiment of the RGB processing logic 362 is illustrated in FIG. 49. As shown, the RGB processing logic 362 includes the gain, offset, and clamping (GOC) logic 640, the RGB color correction logic 642, the GOC logic 644, the RGB gamma adjustment logic, and the color space conversion logic 648. The input signal 378 is first received by the gain, offset, and clamping (GOC) logic 640. In the illustrated embodiment, the GOC logic 640 may apply gains to perform auto-white balancing on one or more of the R, G, or B color channels before processing by the color correction logic 642.

The GOC logic 640 may be similar to the GOC logic 394 of the raw pixel processing logic 360, except that the color components of the RGB domain are processed, rather the R, B, Gr, and Gb components of the Bayer image data. In operation, the input value for the current pixel is first offset by a signed value O[c] and multiplied by a gain G[c], as shown in Equation 9 above, wherein c represents the R, G, and B. As discussed above, the gain G[c] may be a 16-bit unsigned number with 2 integer bits and 14 fraction bits (e.g., 2.14 floating point representation), and the values for the gain G[c] may be previously determined during statistics processing (e.g., in the ISP front-end block 80). The computed pixel value Y (based on Equation 9) is then be clipped to a minimum and a maximum range in accordance with Equation 10. As discussed above, the variables min[c] and max[c] may represent signed 16-bit "clipping values" for the minimum and maximum output values, respectively. In one embodiment, the GOC logic 640 may also be configured to maintain a count of the number of pixels that were clipped above and below maximum and minimum, respectively, for each color component R, G, and B.

The output of the GOC logic 640 is then forwarded to the color correction logic 642. In accordance with the presently disclosed techniques, the color correction logic 642 may be configured to apply color correction to the RGB image data using a color correction matrix (CCM). In one embodiment, the CCM may be a 3×3 RGB transform matrix, although matrices of other dimensions may also be utilized in other embodiments (e.g., 4×3, etc.). Accordingly, the process of performing color correction on an input pixel having R, G, and B components may be expressed as follows:

$$[R'\ G'\ B'] = \begin{bmatrix} CCM00 & CCM01 & CCM02 \\ CCM10 & CCM11 & CCM12 \\ CCM20 & CCM21 & CCM22 \end{bmatrix} \times [R\ G\ B], \quad (64)$$

wherein R, G, and B represent the current red, green, and blue values for the input pixel, CCM00-CCM22 represent the coefficients of the color correction matrix, and R', G', and B' represent the corrected red, green, and blue values for the input pixel. Accordingly, the correct color values may be computed in accordance with Equations 65-67 below:

$$R'=(CCM00 \times R)+(CCM01 \times G)+(CCM02 \times B) \qquad (65)$$

$$G'=(CCM10 \times R)+(CCM11 \times G)+(CCM12 \times B) \qquad (66)$$

$$B'=(CCM20 \times R)+(CCM21 \times G)+(CCM22 \times B) \qquad (67)$$

The coefficients (CCM00-CCM22) of the CCM may be determined during statistics processing in the ISP front-end block 80, as discussed above. In one embodiment, the coefficients for a given color channel may be selected such that the sum of those coefficients (e.g., CCM00, CCM01, and CCM02 for red color correction) is equal to 1, which may help to maintain the brightness and color balance. Further, the coefficients are typically selected such that a positive gain is applied to the color being corrected. For instance, with red color correction, the coefficient CCM00 may be greater than 1, while one or both of the coefficients CCM01 and CCM02 may be less than 1. Setting the coefficients in this manner may enhance the red (R) component in the resulting corrected R' value while subtracting some of the blue (B) and green (G) component. As will be appreciated, this may address issues with color overlap that may occur during acquisition of the original Bayer image, as a portion of filtered light for a particular colored pixel may "bleed" into a neighboring pixel of a different color. In one embodiment, the coefficients of the CCM may be provided as 16-bit two's-complement numbers with 4 integer bits and 12 fraction bits (expressed in floating point as 4.12). Additionally, the color correction logic 642 may provide for clipping of the computed corrected color values if the values exceed a maximum value or are below a minimum value.

The output of the RGB color correction logic 642 is then passed to another GOC logic block 644. The GOC logic 644 may be implemented in an identical manner as the GOC logic 640 and, thus, a detailed description of the gain, offset, and clamping functions provided will not be repeated here. In one embodiment, the application of the GOC logic 644 subsequent to color correction may provide for auto-white balance of the image data based on the corrected color values, and may also adjust sensor variations of the red-to-green and blue-to-green ratios.

Next, the output of the GOC logic 644 is sent to the RGB gamma adjustment logic 646 for further processing. For instance, the RGB gamma adjustment logic 646 may provide for gamma correction, tone mapping, histogram matching, and so forth. In accordance with disclosed embodiments, the gamma adjustment logic 646 may provide for a mapping of the input RGB values to corresponding output RGB values. For instance, the gamma adjustment logic may provide for a set of three lookup tables, one table for each of the R, G, and B components. By way of example, each lookup table may be configured to store 256 entries of 10-bit values, each value representing an output level. The table entries may be evenly distributed in the range of the input pixel values, such that when the input value falls between two entries, the output value may be linearly interpolated. In one embodiment, each of the three lookup tables for R, G, and B may be duplicated, such that the lookup tables are "double buffered" in memory, thus allowing for one table to be used during processing, while its duplicate is being updated. Based on the 10-bit output values discussed above, it should be noted that the 14-bit RGB image signal is effectively down-sampled to 10 bits as a result of the gamma correction process in the present embodiment.

The output of the gamma adjustment logic 646 may be sent to the memory 108 and/or to the color space conversion logic 648. The color space conversion (CSC) logic 648 may be configured to convert the RGB output from the gamma adjustment logic 646 to the YCbCr format, in which Y represents a luma component, Cb represents a blue-difference chroma component, and Cr represents a red-difference chroma component, each of which may be in a 10-bit format as a result of bit-depth conversion of the RGB data from 14-bits to 10-bits during the gamma adjustment operation. As discussed above, in one embodiment, the RGB output of the gamma adjustment logic 646 may be down-sampled to 10-bits and thus converted to 10-bit YCbCr values by the CSC logic 648, which may then be forwarded to the YCbCr processing logic 364, which will be discussed further below.

The conversion from the RGB domain to the YCbCr color space may be performed using a color space conversion matrix (CSCM). For instance, in one embodiment, the CSCM may be a 3×3 transform matrix. The coefficients of the CSCM may be set in accordance with a known conversion equation, such as the BT.601 and BT.709 standards. Additionally, the CSCM coefficients may be flexible based on the desired range of input and outputs. Thus, in some embodiments, the CSCM coefficients may be determined and programmed based on data collected during statistics processing in the ISP front-end block 80.

The process of performing YCbCr color space conversion on an RGB input pixel may be expressed as follows:

$$[Y \ Cb \ Cr] = \begin{bmatrix} CSCM00 & CSCM01 & CSCM02 \\ CSCM10 & CSCM11 & CSCM12 \\ CSCM20 & CSCM21 & CSCM22 \end{bmatrix} \times [R \ G \ B], \qquad (68)$$

wherein R, G, and B represent the current red, green, and blue values for the input pixel in 10-bit form (e.g., as processed by the gamma adjustment logic 646), CSCM00-CSCM22 represent the coefficients of the color space conversion matrix, and Y, Cb, and Cr represent the resulting luma, and chroma components for the input pixel. Accordingly, the values for Y, Cb, and Cr may be computed in accordance with Equations 69-71 below:

$$Y=(CSCM00 \times R)+(CSCM01 \times G)+(CSCM02 \times B) \qquad (69)$$

$$Cb=(CSCM10 \times R)+(CSCM11 \times G)+(CSCM12 \times B) \qquad (70)$$

$$Cr=(CSCM20 \times R)+(CSCM21 \times G)+(CSCM22 \times B) \qquad (71)$$

Following the color space conversion operation, the resulting YCbCr values may be output from the CSC logic 648 as the signal 380, which may be processed by the YCbCr processing logic 364, as will be discussed below.

In one embodiment, the coefficients of the CSCM may be 16-bit two's-complement numbers with 4 integer bits and 12 fraction bits (4.12). In another embodiment, the CSC logic 648 may further be configured to apply an offset to each of the Y, Cb, and Cr values, and to clip the resulting values to a minimum and maximum value. By way of example only, assuming that the YCbCr values are in 10-bit form, the offset may be in a range of −512 to 512, and the minimum and maximum values may be 0 and 1023, respectively.

Referring again back to the block diagram of the ISP pipe logic 82 in FIG. 27, the YCbCr signal 380 may be sent to the selection logic 384 and/or to the memory 108. The YCbCr processing logic 364 may receive the input signal 386, which may be YCbCr image data from the signal 380 or from the memory 108, as shown by signal 382, depending on the configuration of the selection logic 384. The YCbCr image data 386 may then be processed by the YCbCr processing logic 364 for luma sharpening, chroma suppression, chroma noise reduction, chroma noise reduction, as well as brightness, contrast, and color adjustments, and so forth. Further, the YCbCr processing logic 364 may provide for gamma mapping and scaling of the processed image data in both horizontal and vertical directions.

Figure 50:
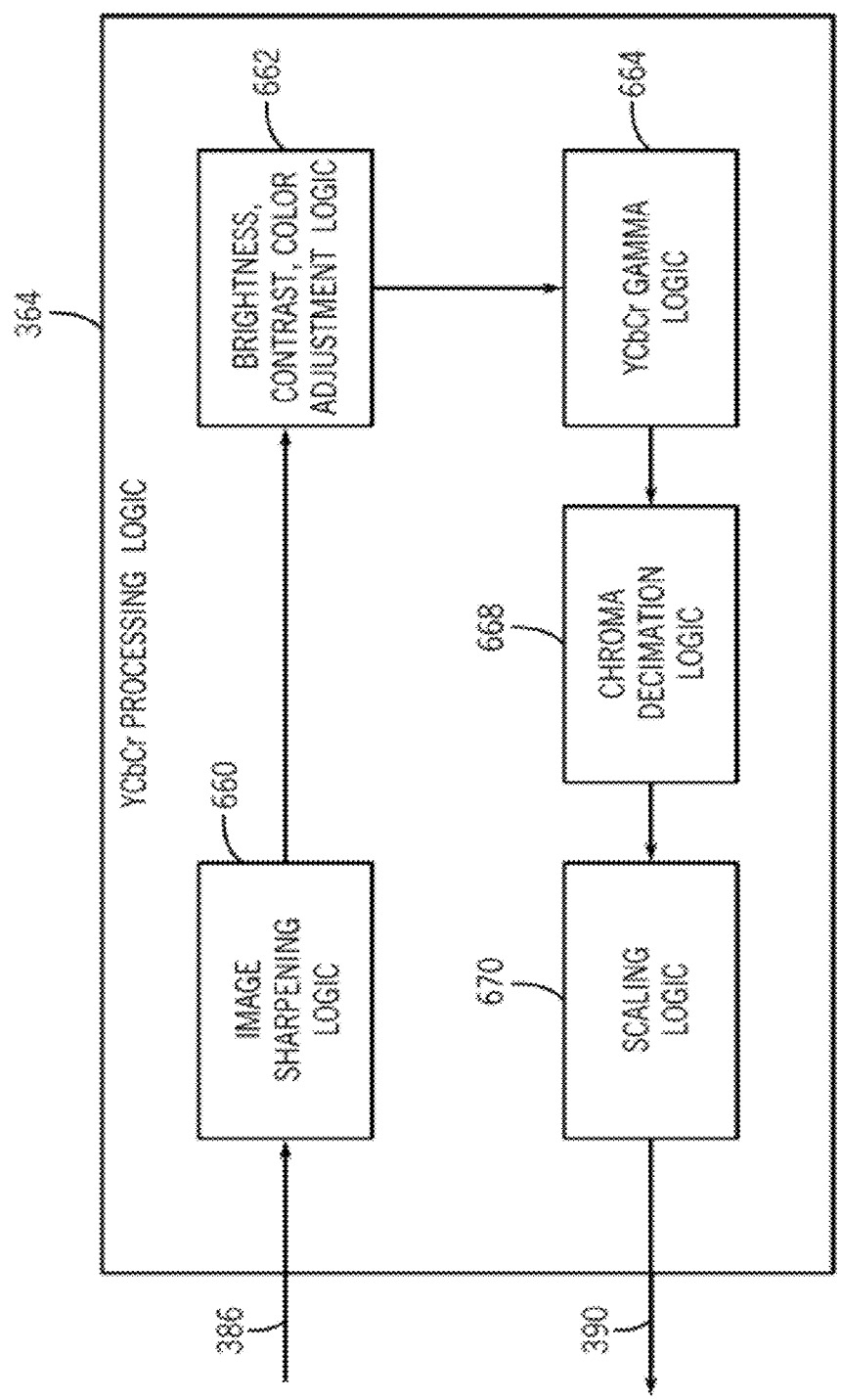
FIG. 50 is a more detailed view showing one embodiment of a YCbCr processing block that may be implemented in the ISP pipe processing logic of FIG. 27, in accordance with aspects of the present disclosure.
Figure 51:
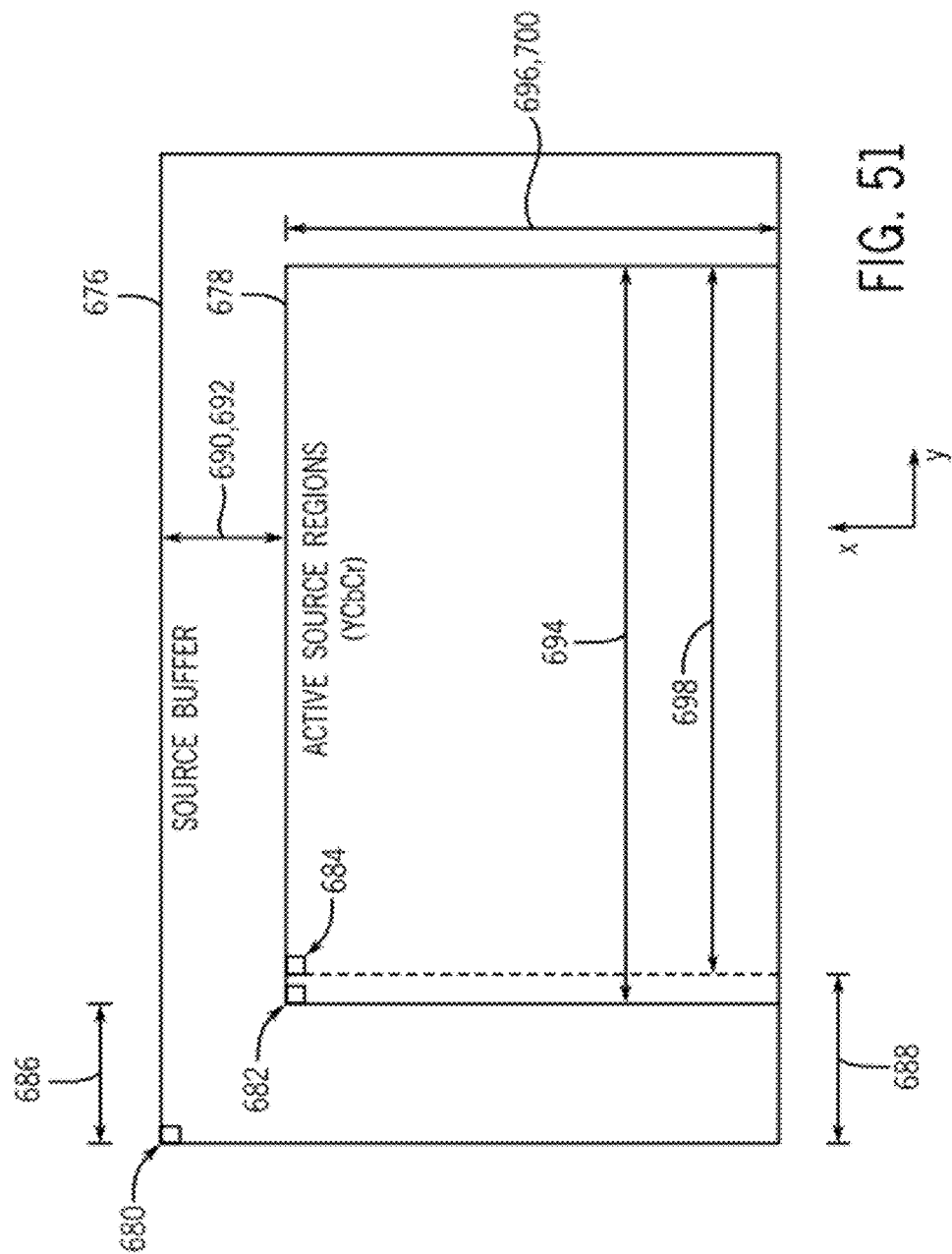
FIG. 51 is a graphical depiction of active source regions for luma and chroma, as defined within a source buffer using a 1-plane format, in accordance with aspects of the present disclosure.

A block diagram depicting a more detailed view of an embodiment of the YCbCr processing logic 364 is illustrated in FIG. 50. As shown, the YCbCr processing logic 364 includes the image sharpening logic 660, the logic 662 for adjusting brightness, contrast, and/or color, the YCbCr gamma adjustment logic 664, the chroma decimation logic 668, and the scaling logic 670. The YCbCr processing logic 364 may be configured to process pixel data in 4:4:4, 4:2:2, or 4:2:0 formats using 1-plane, 2-plane, or 3-plane memory configurations. Further, in one embodiment, the YCbCr input signal 386 may provide luma and chroma information as 10-bit values.

As will be appreciated, the reference to 1-plane, 2-plane, or 3-plane refers to the number of imaging planes utilized in picture memory. For instance, in a 3-plane format, each of the Y, Cb, and Cr components may utilize separate respective memory planes. In a 2-plane format, a first plane may be provided for the luma component (Y), and a second plane that interleaves the Cb and Cr samples may be provided for the chroma components (Cb and Cr). In a 1-plane format, a single plane in memory is interleaved with the luma and chroma samples. Further, with regard to the 4:4:4, 4:2:2, and 4:2:0 formats, it may be appreciated that the 4:4:4 format refers to a sampling format in which each of the three YCbCr components are sampled at the same rate. In a 4:2:2 format, the chroma components Cb and Cr are sub-sampled at half the sampling rate of the luma component Y, thus reducing the resolution of chroma components Cb and Cr by half in the horizontal direction. Similarly the 4:2:0 format subs-samples the chroma components Cb and Cr in both the vertical and horizontal directions.

The processing of the YCbCr information may occur within an active source region defined within a source buffer, wherein the active source region contains "valid" pixel data. For example, referring to FIG. 51, a source buffer 676 having defined therein an active source region 678 is illustrated. In the illustrated example, the source buffer may represent a 4:4:4 1-plane format providing source pixels of 10-bit values. The active source region 678 may be specified individually for luma (Y) samples and chroma samples (Cb and Cr). Thus, it should be understood that the active source region 678 may actually include multiple active source regions for the luma and chroma samples. The start of the active source regions 678 for luma and chroma may be determined based on an offset from a base address (0,0) 680 of the source buffer. For instance, a starting position (Lm_X, Lm_Y) 682 for the luma active source region may be defined by an x-offset 686 and a y-offset 690 with respect to the base address 680. Similarly, a starting position (Ch_X, Ch_Y) 684 for the chroma active source region may be defined by an x-offset 688 and a y-offset 692 with respect to the base address 680. It should be noted that in the present example, the y-offsets 688 and 692 for luma and chroma, respectively, may be equal. Based on the starting position 682, the luma active source region may be defined by a width 694 and a height 696, each of which may represent the number of luma samples in the x and y directions, respectively. Additionally, based on the starting position 684, the chroma active source region may be defined by a width 698 and a height 700, each of which may represent the number of chroma samples in the x and y directions, respectively.

Figure 52:
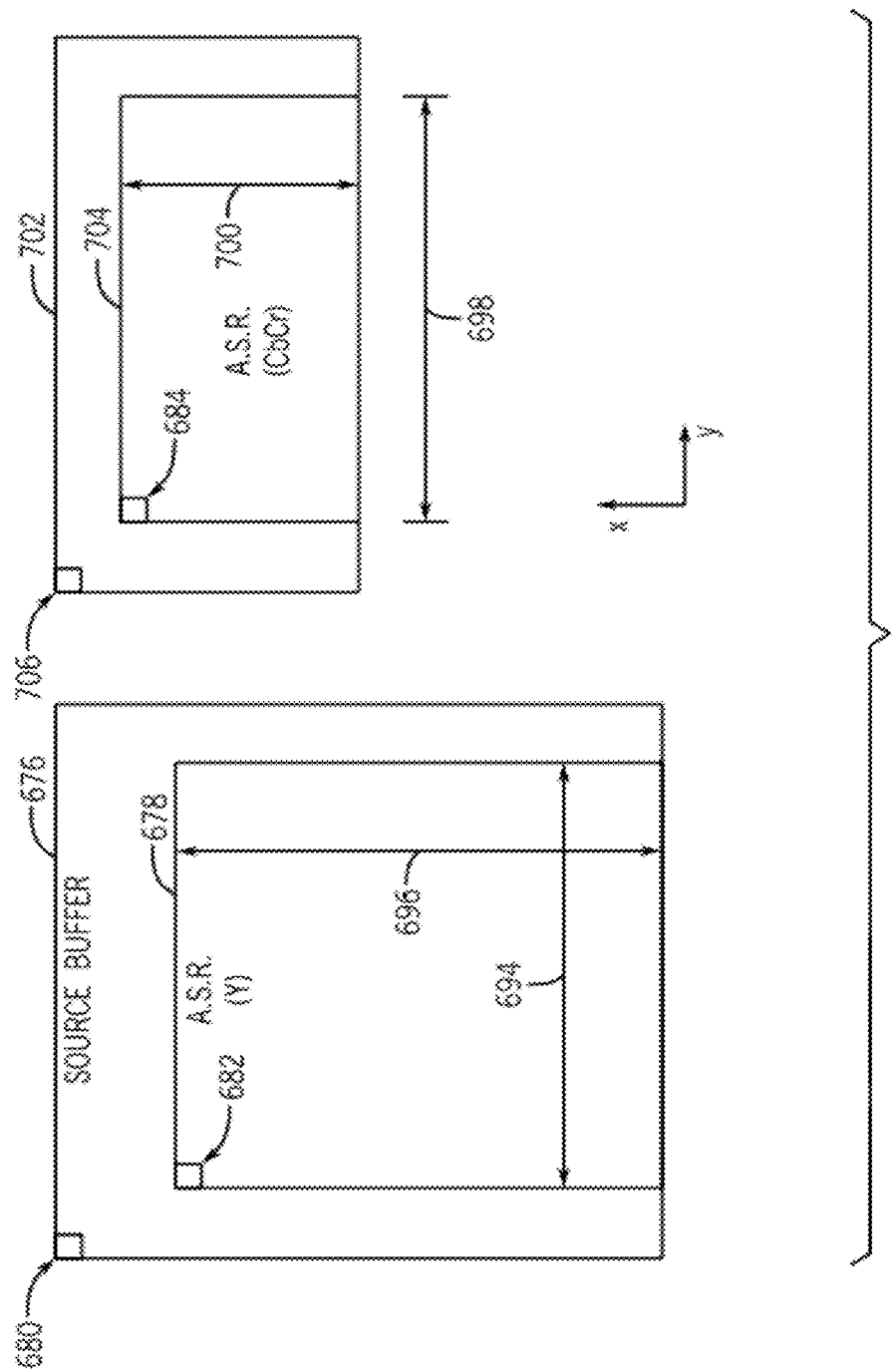
FIG. 52 is a graphical depiction of active source regions for luma and chroma, as defined within a source buffer using a 2-plane format, in accordance with aspects of the present disclosure.

FIG. 52 further provides an example showing how active source regions for luma and chroma samples may be determined in a two-plane format. For instance, as shown, the luma active source region 678 may be defined in a first source buffer 676 (having the base address 680) by the area specified by the width 694 and height 696 with respect to the starting position 682. A chroma active source region 704 may be defined in a second source buffer 702 (having the base address 706) as the area specified by the width 698 and height 700 relative to the starting position 684.

With the above points in mind and referring back to FIG. 50, the YCbCr signal 386 is first received by the image sharpening logic 660. The image sharpening logic 660 may be configured to perform picture sharpening and edge enhancement processing to increase texture and edge details in the image. As will be appreciated, image sharpening may improve the perceived image resolution. However, it is generally desirable that existing noise in the image is not detected as texture and/or edges, and thus not amplified during the sharpening process.

In accordance with the present technique, the image sharpening logic 660 may perform picture sharpening using a multi-scale unsharp mask filter on the luma (Y) component of the YCbCr signal. In one embodiment, two or more low pass Gaussian filters of difference scale sizes may be provided. For example, in an embodiment that provides two Gaussian filters, the output (e.g., Gaussian blurring) of a first Gaussian filter having a first radius (x) is subtracted from the output of a second Gaussian filter having a second radius (y), wherein x is greater than y, to generate an unsharp mask. Additional unsharp masks may also be obtained by subtracting the outputs of the Gaussian filters from the Y input. In certain embodiments, the technique may also provide adaptive coring threshold comparison operations that may be performed using the unsharp masks such that, based upon the results of the comparison(s), gain amounts may be added to a base image, which may be selected as the original Y input image or the output of one of the Gaussian filters, to generate a final output.

Figure 53:
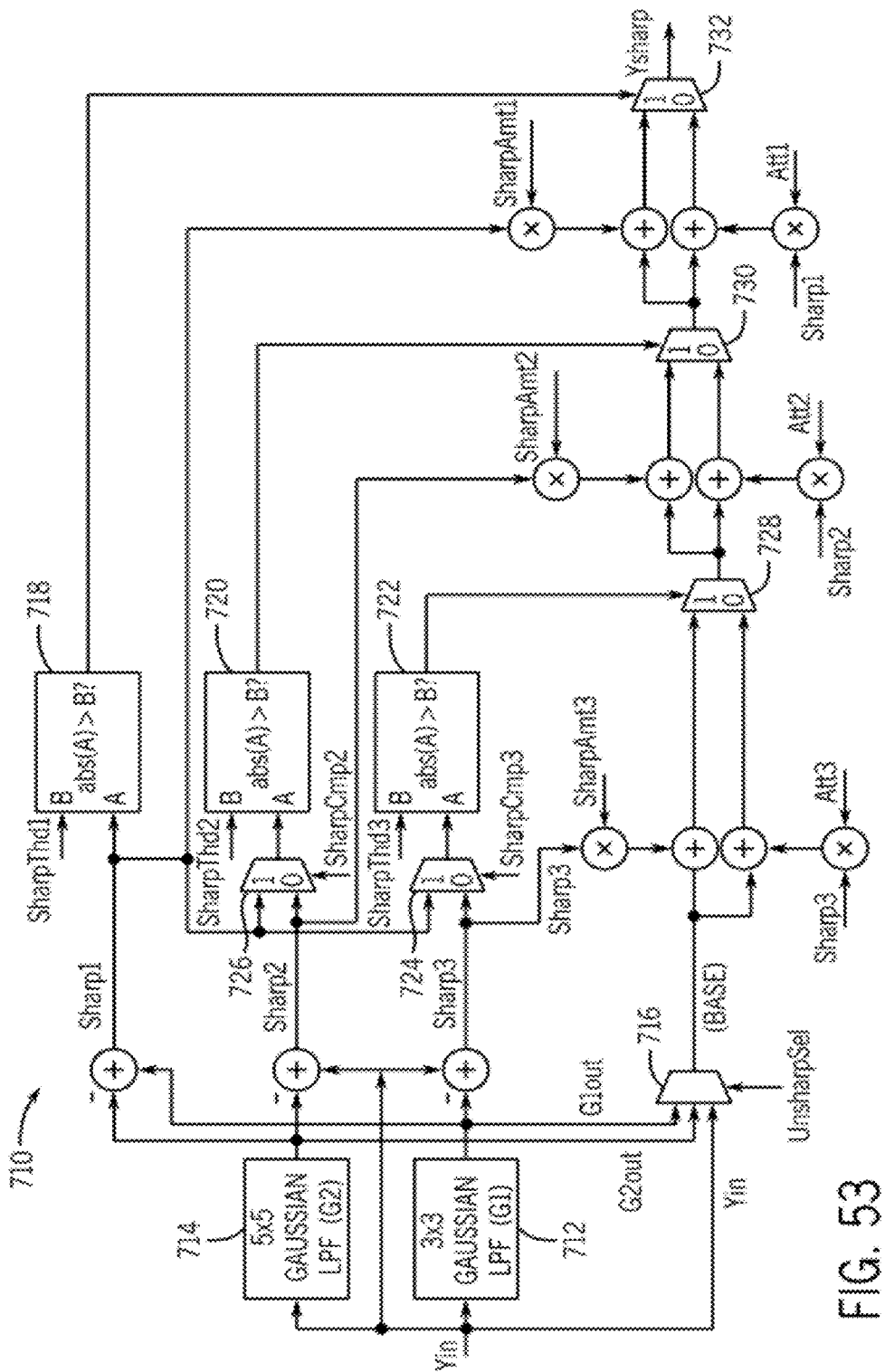
FIG. 53 is a block diagram illustrating image sharpening logic that may be implemented in the YCbCr processing block, as shown in FIG. 50, in accordance with one embodiment.

Referring to FIG. 53, block diagram depicting exemplary logic 710 for performing image sharpening in accordance with embodiments of the presently disclosed techniques is illustrated. The logic 710 represents a multi-scale unsharp filtering mask that may be applied to an input luma image Yin. For instance, as shown, Yin is received and processed by two low pass Gaussian filters 712 (G1) and 714 (G2). In the present example, the filter 712 may be a 3×3 filter and the filter 714 may be a 5×5 filter. It should be appreciated, however, that in additional embodiments, more than two Gaussian filters, including filters of different scales may also be used (e.g., 7×7, 9×9, etc.). As will be appreciated, due to the low pass filtering process, the high frequency components, which generally correspond to noise, may be removed from the outputs of the G1 and G2 to produce "unsharp" images (G1out and G2out). As will be discussed below, using an unsharp input image as a base image allows for noise reduction as part of the sharpening filter.

The 3×3 Gaussian filter 712 and the 5×5 Gaussian filter 714 may be defined as shown below:

$$G1 = \frac{\begin{bmatrix} G1_1 & G1_1 & G1_1 \\ G1_1 & G1_0 & G1_1 \\ G1_1 & G1_1 & G1_1 \end{bmatrix}}{256}$$

-continued $$G2 = \frac{\begin{bmatrix} G2_2 & G2_2 & G2_2 & G2_2 & G2_2 \\ G2_2 & G2_1 & G2_1 & G2_1 & G2_2 \\ G2_2 & G2_1 & G2_0 & G2_1 & G2_2 \\ G2_2 & G2_1 & G2_1 & G2_1 & G2_2 \\ G2_2 & G2_2 & G2_2 & G2_2 & G2_2 \end{bmatrix}}{256}$$

By way of example only, the values of the Gaussian filters G1 and G2 may be selected in one embodiment as follows:

$$G1 = \frac{\begin{bmatrix} 28 & 28 & 28 \\ 28 & 32 & 28 \\ 28 & 28 & 28 \end{bmatrix}}{256}$$

$$G2 = \frac{\begin{bmatrix} 9 & 9 & 9 & 9 & 9 \\ 9 & 12 & 12 & 12 & 9 \\ 9 & 12 & 16 & 12 & 9 \\ 9 & 12 & 12 & 12 & 9 \\ 9 & 9 & 9 & 9 & 9 \end{bmatrix}}{256}$$

Based on Yin, G1out, and G2out, three unsharp masks, Sharp1, Sharp2, and Sharp3, may be generated. Sharp1 may be determined as the unsharp image G2out of the Gaussian filter 714 subtracted from the unsharp image G1out of the Gaussian filter 712. Because Sharp1 is essentially the difference between two low pass filters, it may be referred to as a "mid band" mask, since the higher frequency noise components are already filtered out in the G1out and G2out unsharp images. Additionally, Sharp2 may be calculated by subtracting G2out from the input luma image Yin, and Sharp3 may be calculated by subtracting G1out from the input luma image Yin. As will be discussed below, an adaptive threshold coring scheme may be applied using the unsharp masks Sharp1, Sharp2, and Sharp3.

Referring to the selection logic 716, a base image may be selected based upon a control signal UnsharpSel. In the illustrated embodiment, the base image may be either the input image Yin, or the filtered outputs G1out or G2out. As will be appreciated, when an original images has a high noise variance (e.g., almost as high as the signal variance), using the original image Yin as the base image in sharpening may not sufficiently provide for reduction of the noise components during sharpening. Accordingly, when a particular threshold of noise content is detected in the input image, the selection logic 716 may be adapted to select one of the low pass filtered outputs G1out or G2out from which high frequency content, which may include noise, has been reduced. In one embodiment, the value of the control signal UnsharpSel may be determined by analyzing statistical data acquired during statistics processing in the ISP front-end block 80 to determine the noise content of the image. By way of example, if the input image Yin has a low noise content, such that the appearance noise will likely not increase as a result of the sharpening process, the input image Yin may be selected as the base image (e.g., UnsharpSel=j). If the input image Yin is determined to contain a noticeable level of noise, such that the sharpening process may amplify the noise, one of the filtered images G1out or G2out may be selected (e.g., UnsharpSel=1 or 2, respectively). Thus, by applying an adaptive technique for selecting a base image, the logic 710 essentially provides a noise reduction function.

Next, gains may be applied to one or more of the Sharp 1, Sharp2, and Sharp3 masks in accordance with an adaptive coring threshold scheme, as described below. Next, the unsharp values Sharp1, Sharp2, and Sharp3 may be compared to various thresholds SharpThd1, SharpThd2, and SharpThd3 (not necessarily respectively) by way of the comparator blocks 718, 720, and 722. For instance, Sharp1 value is always compared to SharpThd1 at the comparator block 718. With respective to the comparator block 720, the threshold SharpThd2 may be compared against either Sharp1 or Sharp2, depending upon the selection logic 726. For instance, the selection logic 726 may select Sharp1 or Sharp2 depending on the state of a control signal SharpCmp2 (e.g., Sharp-Cmp2=1 selects Sharp1; SharpCmp2=0 selects Sharp2). For example, in one embodiment, the state of SharpCmp2 may be determined depending on the noise variance/content of the input image (Yin).

In the illustrated embodiment, it is generally preferable to set the SharpCmp2 and SharpCmp3 values to select Sharp1, unless it is detected that the image data has relatively low amounts of noise. This is because Sharp1, being the difference between the outputs of the Gaussian low pass filters G1 and G2, is generally less sensitive to noise, and thus may help reduce the amount to which SharpAmt1, SharpAmt2, and SharpAmt3 values vary due to noise level fluctuations in "noisy" image data. For instance, if the original image has a high noise variance, some of the high frequency components may not be caught when using fixed thresholds and, thus, may be amplified during the sharpening process. Accordingly, if the noise content of the input image is high, then some of the noise content may be present in Sharp2. In such instances, SharpCmp2 may be set to 1 to select the mid-band mask Sharp1 which, as discussed above, has reduced high frequency content due to being the difference of two low pass filter outputs and is thus less sensitive to noise.

As will be appreciated, a similar process may be applied to the selection of either Sharp1 or Sharp3 by the selection logic 724 under the control of SharpCmp3. In one embodiment, SharpCmp2 and SharpCmp3 may be set to 1 by default (e.g., use Sharp1), and set to 0 only for those input images that are identified as having generally low noise variances. This essentially provides an adaptive coring threshold scheme in which the selection of the comparison value (Sharp1, Sharp2, or Sharp3) is adaptive based upon the noise variance of an input image.

Based on the outputs of the comparator blocks 718, 720, and 722, the sharpened output image Ysharp may be determined by applying gained unsharp masks to the base image (e.g., selected via logic 716). For instance, referring first to the comparator block 722, SharpThd3 is compared to the B-input provided by selection logic 724, which shall be referred to herein as "SharpAbs," and may be equal to either Sharp1 or Sharp3 depending on the state of SharpCmp3. If SharpAbs is greater than the threshold SharpThd3, then a gain SharpAmt3 is applied to Sharp3, and the resulting value is added to the base image. If SharpAbs is less than the threshold SharpThd3, then an attenuated gain Att3 may be applied. In one embodiment, the attenuated gain Att3 may be determined as follows:

$$Att3 = \frac{SharpAmt3 \times SharpAbs}{SharpThd3} \tag{72}$$

wherein, SharpAbs is either Sharp1 or Sharp3, as determined by the selection logic 724. The selection of the based image summed with either the full gain (SharpAmt3) or the attenuated gain (Att3) is performed by the selection logic 728 based upon the output of the comparator block 722. As will be appreciated, the use of an attenuated gain may address situations in which SharpAbs is not greater than the threshold (e.g., SharpThd3), but the noise variance of the image is nonetheless close to the given threshold. This may help to reduce noticeable transitions between a sharp and an unsharp pixel. For instance, if the image data is passed without the attenuated gain in such circumstance, the resulting pixel may appear as a defective pixel (e.g., a stuck pixel).

Next, a similar process may be applied with respect to the comparator block 720. For instance, depending on the state of SharpCmp2, the selection logic 726 may provide either Sharp1 or Sharp2 as the input to the comparator block 720 that is compared against the threshold SharpThd2. Depending on the output of the comparator block 720, either the gain SharpAmt2 or an attenuated gain based upon SharpAmt2, Att2, is applied to Sharp2 and added to the output of the selection logic 728 discussed above. As will be appreciated, the attenuated gain Att2 may be computed in a manner similar to Equation 72 above, except that the gain SharpAmt2 and the threshold SharpThd2 are applied with respect to SharpAbs, which may be selected as Sharp1 or Sharp2.

Thereafter, a gain SharpAmt1 or an attenuated gain Att1 is applied to Sharp1, and the resulting value is summed with output of the selection logic 730 to produce the sharpened pixel output Ysharp. The selection of applying either the gain SharpAmt1 or attenuated gain Att1 may be determined based upon the output of the comparator block 718, which compares Sharp1 against the threshold SharpThd1. Again, the attenuated gain Att1 may be determined in a manner similar to equation 72 above, except that the gain SharpAmt1 and threshold SharpThd1 are applied with respect to Sharp1. The resulting sharpened pixel values scaled using each of the three masks is added to the input pixel Yin to generate the sharpened output Ysharp which, in one embodiment, may be clipped to 10 bits (assuming YCbCr processing occurs at 10-bit precision).

As will be appreciated, when compared to conventional unsharp masking techniques, the image sharpening techniques set forth in this disclosure may provide for improving the enhancement of textures and edges while also reducing noise in the output image. In particular, the present techniques may be well-suited in applications in which images captured using, for example, CMOS image sensors, exhibit poor signal-to-noise ratio, such as images acquired under low lighting conditions using lower resolution cameras integrated into portable devices (e.g., mobile phones). For instance, when the noise variance and signal variance are comparable, it is difficult to use a fixed threshold for sharpening, as some of the noise components would be sharpened along with texture and edges. Accordingly, the techniques provided herein, as discussed above, may filter the noise from the input image using multi-scale Gaussian filters to extract features from the unsharp images (e.g., G1out and G2out) in order to provide a sharpened image that also exhibits reduced noise content.

Before continuing, it should be understood that the illustrated logic 710 is intended to provide only one exemplary embodiment of the present technique. In other embodiments, additional or fewer features may be provided by the image sharpening logic 660. For instance, in some embodiments, rather than applying an attenuated gain, the logic 710 may simply pass the base value. Additionally, some embodiments may not include the selection logic blocks 724, 726, or 716. For instance, the comparator blocks 720 and 722 may simply receive the Sharp2 and Sharp3 values, respectively, rather than a selection output from the selection logic blocks 724 and 726, respectively. While such embodiments may not provide for sharpening and/or noise reduction features that are as robust as the implementation shown in FIG. 53, it should be appreciated that such design choices may be the result of cost and/or business related constraints.

Figure 54:
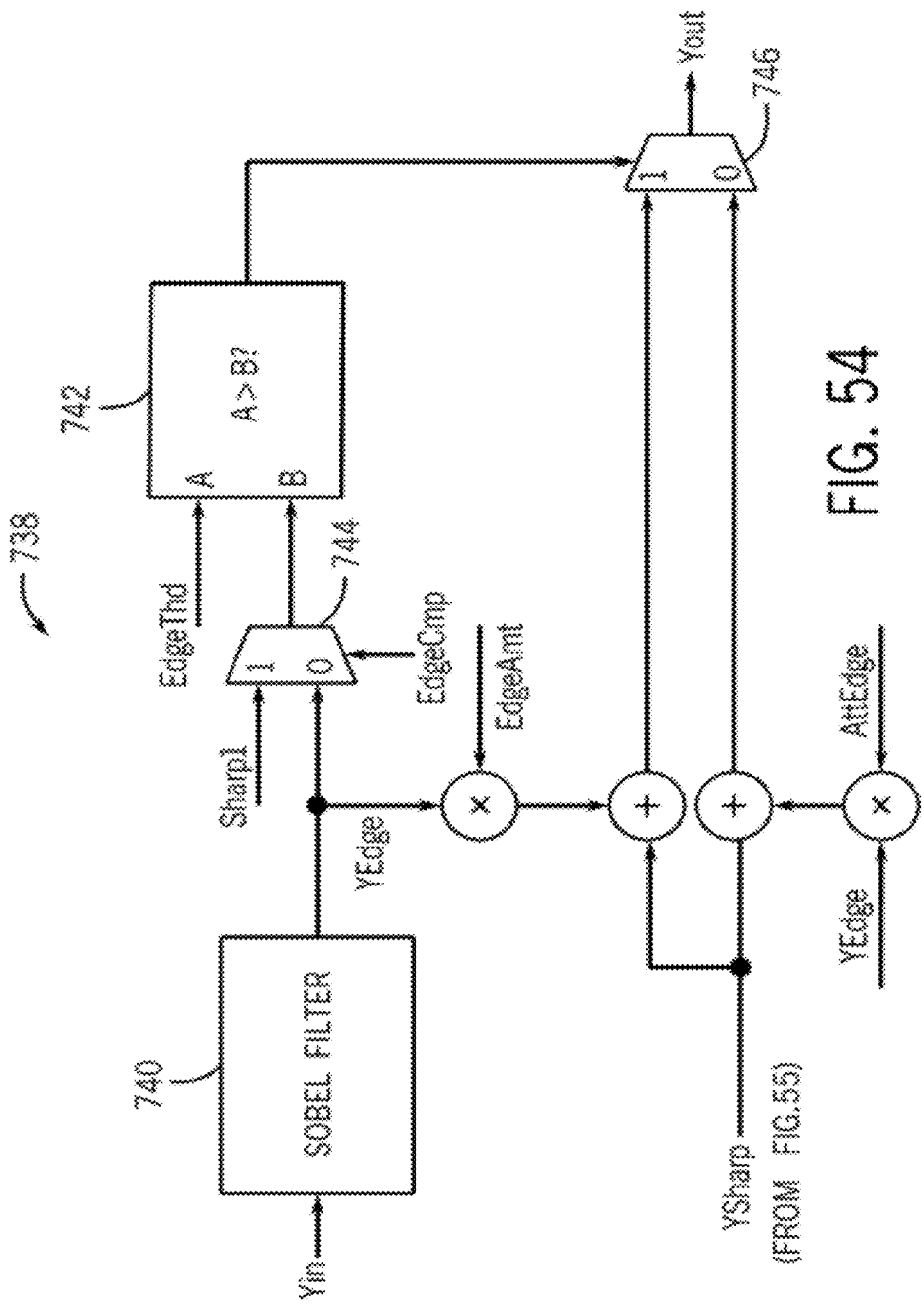
FIG. 54 is a block diagram illustrating edge enhancement logic that may be implemented in the YCbCr processing block, as shown in FIG. 50, in accordance with one embodiment.

In the present embodiment, the image sharpening logic 660 may also provide for edge enhancement and chroma suppression features once the sharpened image output YSharp is obtained. Each of these additional features will now be discussed below. Referring first to FIG. 54, exemplary logic 738 for performing edge enhancement that may be implemented downstream from the sharpening logic 710 of FIG. 53 is illustrated in accordance with one embodiment. As shown, the original input value Yin is processed by a Sobel filter 740 for edge detection. The Sobel filter 740 may determine a gradient value YEdge based upon a 3×3 pixel block (referred to as "A" below) of the original image, with Yin being the center pixel of the 3×3 block. In one embodiment, the Sobel filter 740 may calculate YEdge by convolving the original image data to detect changes in horizontal and vertical directions. This process is shown below in Equations 73-75.

$$S_x = \begin{bmatrix} 1 & 0 & -1 \\ 2 & 0 & -2 \\ 1 & 0 & -1 \end{bmatrix} \tag{73}$$

$$S_y = \begin{bmatrix} 1 & 2 & 1 \\ 0 & 0 & 0 \\ -1 & -2 & -1 \end{bmatrix}$$

$$G_x = S_x \times A, \tag{74}$$
$$G_y = S_y \times A,$$

$$YEdge = G_x \times G_y, \tag{75}$$

wherein $S_x$ and $S_y$ are represent matrix operators for gradient edge-strength detection in the horizontal and vertical directions, respectively, and wherein $G_x$ and $G_y$ represent gradient images that contain horizontal and vertical change derivatives, respectively. Accordingly, the output YEdge is determined as the product of $G_x$ and $G_y$.

YEdge is then received by selection logic 744 along with the mid-band Sharp1 mask, as discussed above in FIG. 53. Based on the control signal EdgeCmp, either Sharp1 or YEdge is compared to a threshold, EdgeThd, at the comparator block 742. The state of EdgeCmp may be determined, for example, based upon the noise content of an image, thus providing an adaptive coring threshold scheme for edge detection and enhancement. Next, the output of the comparator block 742 may be provided to the selection logic 746 and either a full gain or an attenuated gain may be applied. For instance, when the selected B-input to the comparator block 742 (Sharp1 or YEdge) is above EdgeThd, YEdge is multiplied by an edge gain, EdgeAmt, to determine the amount of edge enhancement that is to be applied. If the B-input at the comparator block 742 is less than EdgeThd, then an attenuated edge gain, AttEdge, may be applied to avoid noticeable transitions between the edge enhanced and original pixel. As will be appreciated, AttEdge may be calculated in a similar manner as shown in Equation 72 above, but wherein EdgeAmt and EdgeThd are applied to "SharpAbs," which may be Sharp1 or YEdge, depending on the output of the selection logic 744. Thus, the edge pixel, enhanced using either the gain (EdgeAmt) or the attenuated gain (AttEdge) may be added to YSharp (output of logic 710 of FIG. 53) to obtain the edge-enhanced output pixel Yout which, in one embodiment, may be clipped to 10 bits (assuming YCbCr processing occurs at 10-bit precision).

Figure 55:
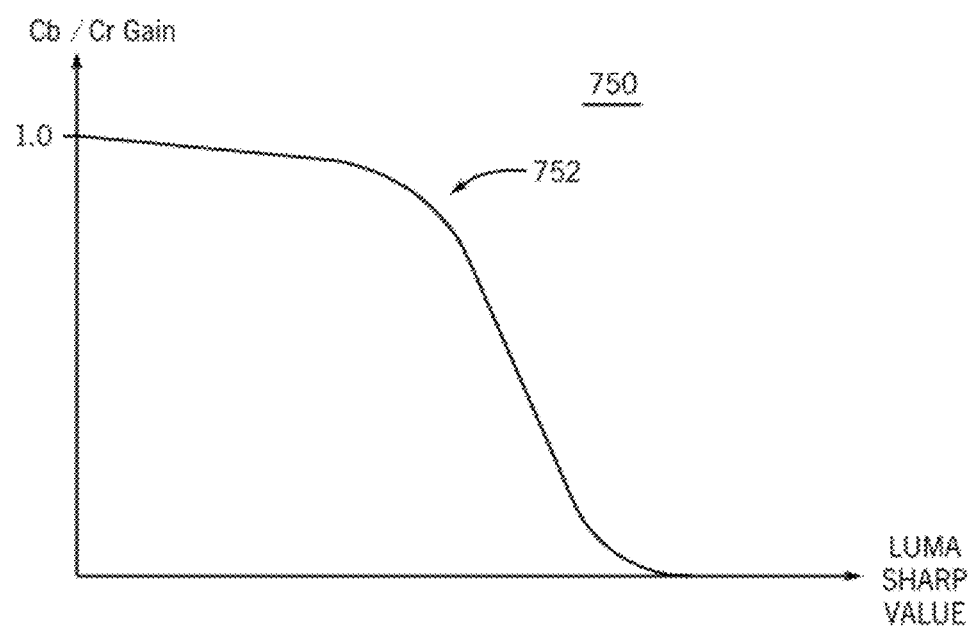
FIG. 55 is a graph showing the relationship of chroma attenuation factors to sharpened luma values, in accordance with aspects of the present disclosure.

With regard to chroma suppression features provided by the image sharpening logic 660, such features may attenuate chroma at luma edges. Generally, chroma suppression may be performed by applying a chroma gain (attenuation factor) of less than 1 depending on the value (YSharp, Yout) obtained from the luma sharpening and/or edge enhancement steps discussed above. By way of example, FIG. 55 shows a graph 750 that includes a curve 752 representing chroma gains that may be selected for corresponding sharpened luma values (YSharp). The data represented by the graph 750 may be implemented as a lookup table of YSharp values and corresponding chroma gains between 0 and 1 (an attenuation factor). The lookup tables are used to approximate the curve 752. For YSharp values that are co-located between two attenuation factors in the lookup table, linear interpolation may be applied to the two attenuation factors corresponding to YSharp values above and below the current YSharp value. Further, in other embodiments, the input luma value may also be selected as one of the Sharp1, Sharp2, or Sharp3 values determined by the logic 710, as discussed above in FIG. 53, or the YEdge value determined by the logic 738, as discussed in FIG. 54.

Figure 56:
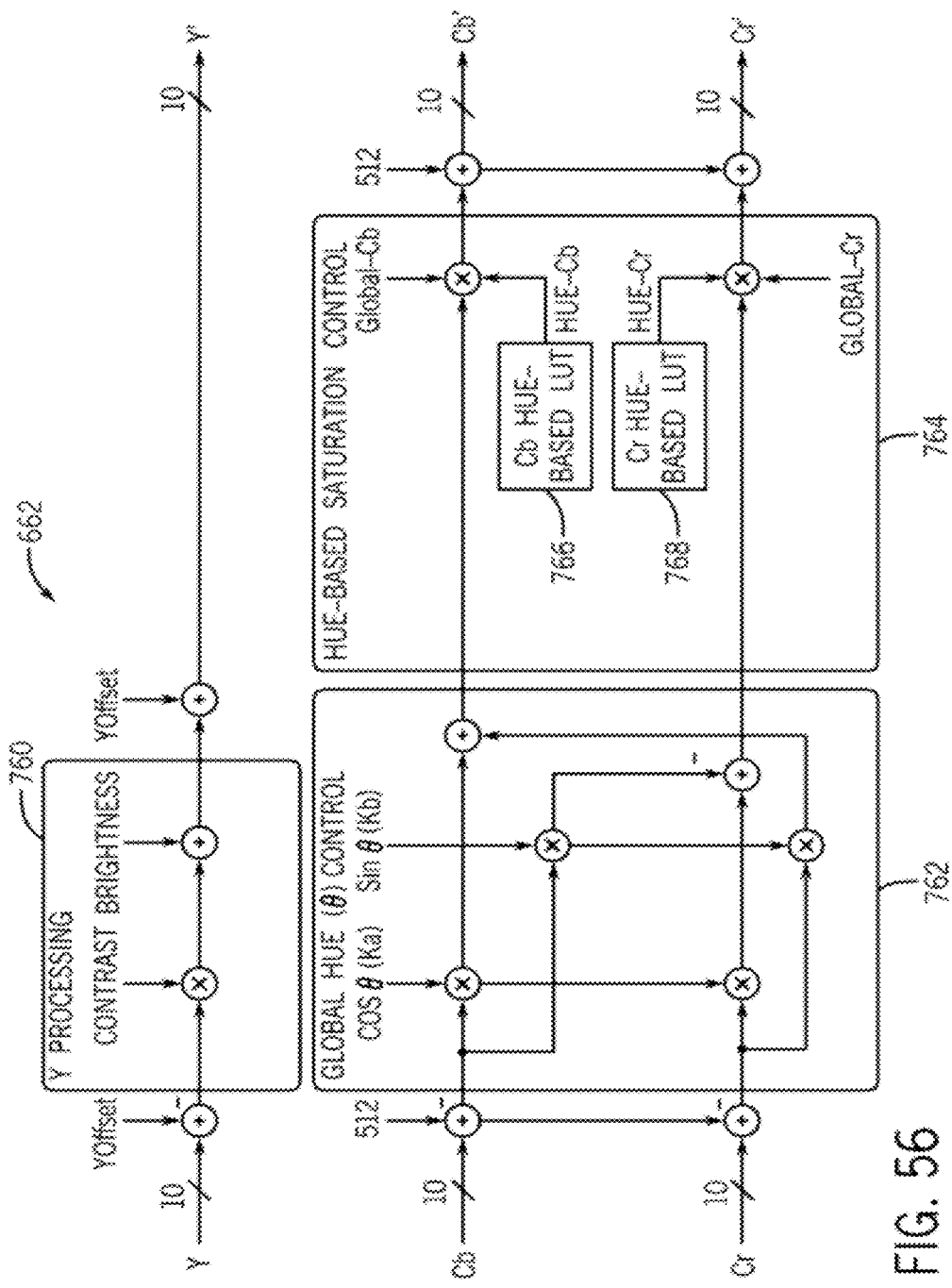
FIG. 56 is a block diagram illustrating image brightness, contrast, and color (BCC) adjustment logic that may be implemented in the YCbCr processing block, as shown in FIG. 50, in accordance with one embodiment.
Figure 57:
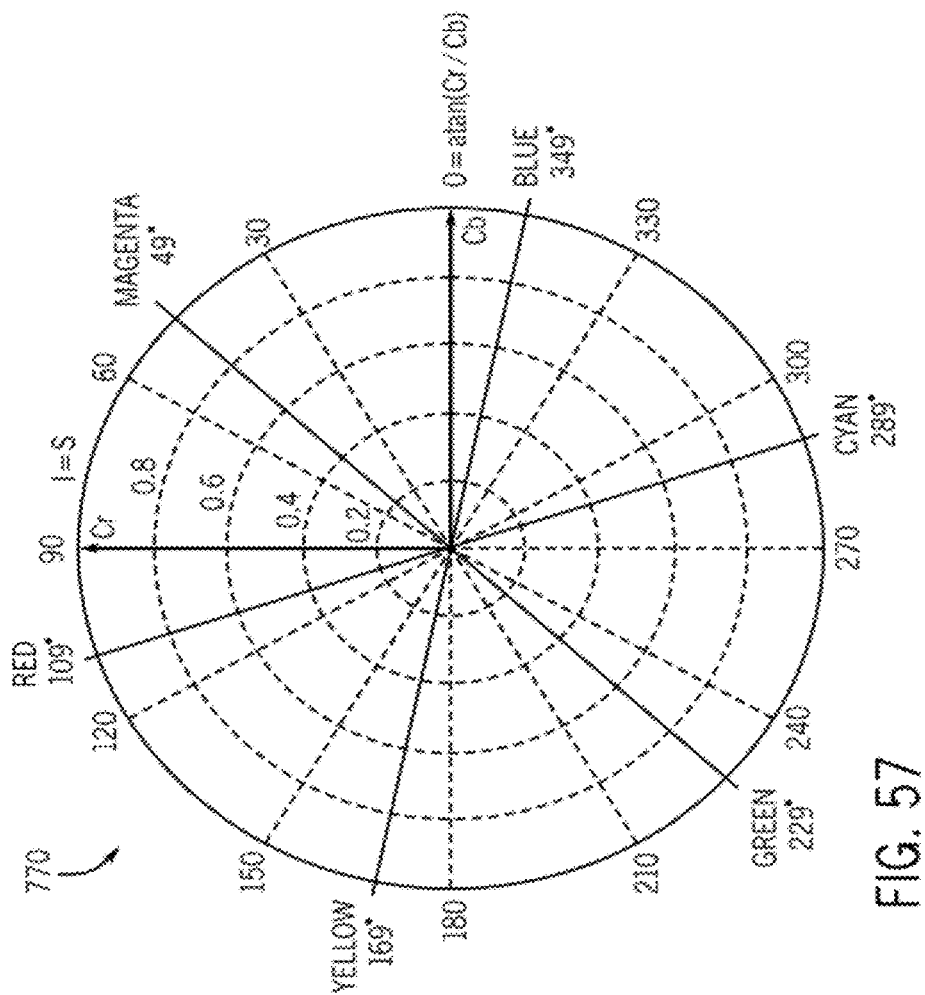
FIG. 57 shows a hue and saturation color wheel in the YCbCr color space defining various hue angles and saturation values that may be applied during color adjustment in the BCC adjustment logic shown in FIG. 56.

Next, the output of the image sharpening logic 660 (FIG. 50) is processed by the brightness, contrast, and color (BCC) adjustment logic 662. A functional block diagram depicting an embodiment of the BCC adjustment logic 662 is illustrated in FIG. 56. As shown the logic 662 includes a brightness and contrast processing block 760, global hue control block 762, and a saturation control block 764. The presently illustrated embodiment provides for processing of the YCbCr data in 10-bit precision, although other embodiments may utilize different bit-depths. The functions of each of blocks 760, 762, and 764 are discussed below.

Referring first to the brightness and contrast processing block 760, an offset, YOffset, is first subtracted from the luma (Y) data to set the black level to zero. This is done to ensure that the contrast adjustment does not alter the black levels. Next, the luma value is multiplied by a contrast gain value to apply contrast control. By way of example, the contrast gain value may be a 12-bit unsigned with 2 integer bits and 10 fractional bits, thus providing for a contrast gain range of up to 4 times the pixel value. Thereafter, brightness adjustment may be implemented by adding (or subtracting) a brightness offset value from the luma data. By way of example, the brightness offset in the present embodiment may be a 10-bit two's complement value having a range of between −512 to +512. Further, it should be noted that brightness adjustment is performed subsequent to contrast adjustment in order to avoid varying the DC offset when changing contrast. Thereafter, the initial YOffset is added back to the adjusted luma data to re-position the black level.

Blocks 762 and 764 provide for color adjustment based upon hue characteristics of the Cb and Cr data. As shown, an offset of 512 (assuming 10-bit processing) is first subtracted from the Cb and Cr data to position the range to approximately zero. The hue is then adjusted in accordance with the following equations:

$$Cb_{adj} = Cb\cos(\theta) + Cr\sin(\theta), \qquad (76)$$

$$Cr_{adj} = Cr\cos(\theta) - Cb\sin(\theta), \qquad (77)$$

wherein $Cb_{adj}$ and $Cr_{adj}$ represent adjusted Cb and Cr values, and wherein $\theta$ represents a hue angle, which may be calculated as follows:

$$\theta = \arctan\left(\frac{Cr}{Cb}\right) \qquad (78)$$

The above operations are depicted by the logic within the global hue control block 762, and may be represented by the following matrix operation:

$$\begin{bmatrix} Cb_{adj} \\ Cr_{adj} \end{bmatrix} = \begin{bmatrix} Ka & Kb \\ -Kb & Ka \end{bmatrix} \begin{bmatrix} Cb \\ Cr \end{bmatrix}, \qquad (79)$$

wherein, Ka=cos(θ), Kb=sin(θ), and θ is defined above in Equation 78.

Next, saturation control may be applied to the $Cb_{adj}$ and $Cr_{adj}$ values, as shown by the saturation control block 764. In the illustrated embodiment, saturation control is performed by applying a global saturation multiplier and a hue-based saturation multiplier for each of the Cb and Cr values. Hue-based saturation control may improve the reproduction of colors. The hue of the color may be represented in the YCbCr color space, as shown by the color wheel graph 770 in FIG. 57. As will be appreciated, the YCbCr hue and saturation color wheel 770 may be derived by shifting the identical color wheel in the HSV color space (hue, saturation, and intensity) by approximately 109 degrees. As shown, the graph 770 includes circumferential values representing the saturation multiplier (S) within a range of 0 to 1, as well as angular values representing θ, as defined above, within a range of between 0 to 360°. Each θ may represent a different color (e.g., 49°=magenta, 109°=red, 229°=green, etc.). The hue of the color at a particular hue angle θ may be adjusted by selecting an appropriate saturation multiplier S.

Referring back to FIG. 56, the hue angle θ (calculated in the global hue control block 762) may be used as an index for a Cb saturation lookup table 766 and a Cr saturation lookup table 768. In one embodiment, the saturation lookup tables 766 and 768 may contain 256 saturation values distributed evenly in the hue range from 0-360° (e.g., the first lookup table entry is at 0° and the last entry is at 360°) and the saturation value S at a given pixel may be determined via linear interpolation of saturation values in the lookup table just below and above the current hue angle θ. A final saturation value for each of the Cb and Cr components is obtained by multiplying a global saturation value (which may be a global constant for each of Cb and Cr) with the determined hue-based saturation value. Thus, the final corrected Cb' and Cr' values may be determined by multiplying $Cb_{adj}$ and $Cr_{adj}$ with their respective final saturation values, as shown in the hue-based saturation control block 764.

Thereafter, the output of the BCC logic 662 is passed to the YCbCr gamma adjustment logic 664, as shown in FIG. 50. In one embodiment, the gamma adjustment logic 664 may provide non-linear mapping functions for the Y, Cb and Cr channels. For instance, the input Y, Cb, and Cr values are mapped to corresponding output values. Again, assuming that the YCbCr data is processed in 10-bits, an interpolated 10-bit 256 entry lookup table may be utilized. Three such lookup tables may be provided with one for each of the Y, Cb, and Cr channels. Each of the 256 input entries may be evenly distributed and, an output may be determined by linear interpolation of the output values mapped to the indices just above and below the current input index. In some embodiments, a non-interpolated lookup table having 1024 entries (for 10-bit data) may also be used, but may have significantly greater memory requirements. As will be appreciated, by adjusting the output values of the lookup tables, the YCbCr gamma adjustment function may be also be used to perform certain image filter effects, such as black and white, sepia tone, negative images, solarization, and so forth.

Next, chroma decimation may be applied by the chroma decimation logic 668 to the output of the gamma adjustment logic 664. In one embodiment, the chroma decimation logic 668 may be configured to perform horizontal decimation to convert the YCbCr data from a 4:4:4 format to a 4:2:2 format, in which the chroma (Cr and Cr) information is sub-sampled at half rate of the luma data. By way of example only, decimation may be performed by applying a 7-tap low pass filter, such as a half-band lanczos filter, to a set of 7 horizontal pixels, as shown below:

$$\text{Out} = \frac{C0 \times in(i-3) + C1 \times in(i-2) + C2 \times in(i-1) + C3 \times in(i) + C4 \times in(i+1) + C5 \times in(i+2) + C6 \times in(i+3)}{512}, \quad (80)$$

wherein in(i) represents the input pixel (Cb or Cr), and C0-C6 represent the filtering coefficients of the 7-tap filter. Each input pixel has an independent filter coefficient (C0-C6) to allow flexible phase offset for the chroma filtered samples.

Further, chroma decimation may, in some instances, also be performed without filtering. This may be useful when the source image was originally received in 4:2:2 format, but was up-sampled to 4:4:4 format for YCbCr processing. In this case, the resulting decimated 4:2:2 image is identical to the original image.

Subsequently, the YCbCr data output from the chroma decimation logic 668 may be scaled using the scaling logic 670 prior to being output from the YCbCr processing block 364. The function of the scaling logic 670 may be similar to the functionality of the scaling logic 214 in the binning compensation filter 182 of the front-end pixel processing unit 130, as discussed above with reference to FIG. 13. For instance, the scaling logic 670 may perform horizontal and vertical scaling as two steps. In one embodiment, a 5-tap polyphase filter may be used for vertical scaling, and a 9-tap polyphase filter may be used for horizontal scaling. The multi-tap polyphase filters may multiply pixels selected from the source image by a weighting factor (e.g., filter coefficient), and then sum the outputs to form the destination pixel. The selected pixels may be chosen depending on the current pixel position and the number of filters taps. For instance, with a vertical 5-tap filter, two neighboring pixels on each vertical side of a current pixel may be selected and, with a horizontal 9-tap filter, four neighboring pixels on each horizontal side of the current pixel may be selected. The filtering coefficients may be provided from a lookup table, and may be determined by the current between-pixel fractional position. The output 390 of the scaling logic 670 is then output from the YCbCr processing block 364.

Returning back to FIG. 27, the processed output signal 390 may be sent to the memory 108, or may be output from the ISP pipe processing logic 82 as the image signal 114 to display hardware (e.g., display 28) for viewing by a user, or to a compression engine (e.g., encoder 118). In some embodiments, the image signal 114 may be further processed by a graphics processing unit and/or a compression engine before being routed to a display. Additionally, one or more frame buffers may be also be provided to control the buffering of the image data being output to a display, particularly with respect to video image data.

As will be understood, the various image processing techniques described above and relating to defective pixel detection and correction, lens shading correction, demosaicing, and image sharpening, among others, are provided herein by way of example only. Accordingly, it should be understood that the present disclosure should not be construed as being limited to only the examples provided above. Indeed, the exemplary logic depicted herein be subject to a number of variations and/or additional features in other embodiments. Further, it should be appreciated that the above-discussed techniques may be implemented in any suitable manner. For instance, the components of the image processing circuitry 32, and particularly the ISP front-end block 80 and the ISP pipe block 82 may be implemented using hardware (e.g., suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for detecting and correcting defective image pixels during image processing, comprising:
   using an image processor;
   receiving an input pixel of image data acquired using an image sensor;
   comparing the location of the input pixel within a processing region of an imaging frame of the image sensor to a set of location entries stored in a static defect table;
   if the location of the input pixel corresponds to one of the set of location entries, marking the input pixel as a static defect and determining a first replacement value for the input pixel;
   if the location of the input pixel does not correspond to one of the set of location entries, identifying a set of neighboring pixels having the same color component as the input pixel, determining whether the input pixel is either a dynamic defect or speckled with respect to the set of neighboring pixels, and determining a second replacement value for the input pixel if the input pixel is determined to be either a dynamic defect or speckled; and
   correcting the input pixel, wherein correcting the input pixel comprises:
   replacing a current value of the input pixel with the first replacement value if the input pixel is marked as a static defect;
   replacing the current value of the input pixel with the second replacement value if the input pixel is determined to be either a dynamic defect or speckled; and
   storing the static defect table and the first replacement value in a memory, wherein the static defect table is configured to be updated intermittently to store locations corresponding to newly-detected static defects.

2. The method of claim 1, comprising not correcting the input pixel if the input pixel is not marked as a static defect and is not determined as being a dynamic defect or speckled.

3. The method of claim 1, wherein the first replacement value is determined as the value of a previous pixel of the same color in scan order.

4. The method of claim 1, wherein identifying a set of neighboring pixels comprises determining the color of the input pixel and identifying eight closest neighboring pixels of the same color in the imaging frame, wherein the eight closest neighboring pixels form a three-by-three pixel block; and wherein the determining of whether the input pixel is either the dynamic defect or speckled with respect to the set of neighboring pixels is based upon a set of directional pixel-to-pixel gradients calculated with respect to the input pixel for each of the eight closest neighboring pixels that are located within the processing region.

5. The method of claim 4, wherein determining if the input pixel is the dynamic defect comprises:
comparing each of the set of directional pixel-to-pixel gradients to an adaptive dynamic defect threshold value;
based upon the comparison, counting the number of the set of directional pixel-to-pixel gradients that is less than or equal to the adaptive dynamic defect threshold value;
comparing the count to a maximum value, wherein the maximum value is selected based at least partially upon the number of neighboring pixels located within the processing region; and
identifying the input pixel as the dynamic defect if the count is less than or equal to the maximum value.

6. The method of claim 5 wherein the adaptive dynamic defect threshold value comprises:
a fixed component for each color component of the image sensor;
a dynamic component determined based at least partially upon one of an exposure setting or an integration time setting of the image sensor at the time the input pixel was captured; and
a high frequency component calculated based upon the sum of the absolute difference between an average of the values of the eight closest neighboring pixels within the processing region and the value of each neighboring pixel within the processing region;
wherein the adaptive dynamic threshold value is calculated by summing the fixed component corresponding to the color of the input pixel with the product of the dynamic component and the high frequency component.

7. The method of claim 4, wherein determining if the input pixel is speckled comprises:
determining an average gradient value by calculating the difference between the value of the input pixel and an average of the values of the eight closest neighboring pixels within the processing region;
comparing the average gradient value to an adaptive speckle threshold value; and
identifying the input pixel as being speckled if the average gradient value is greater than the adaptive speckle threshold value.

8. The method of claim 7, wherein the adaptive speckle threshold value comprises:
a fixed component for each color component of the image sensor;
a dynamic component determined based at least partially upon a degree of texture in the input pixel and the eight closest neighboring pixels; and
a high frequency component calculated based upon the sum of the absolute difference between an average of the values of the eight closest neighboring pixels within the processing region and the value of each neighboring pixel within the processing region;
wherein the adaptive speckle threshold value is calculated by summing the fixed component corresponding to the color of the input pixel with the product of the dynamic component and the high frequency component.

9. The method of claim 4, wherein determining the second replacement value for the input pixel comprises:
determining a first directional gradient in a horizontal direction as the sum of the absolute difference between the input pixel and each of first and second horizontal neighboring pixels from the set of neighboring pixels;
determining a second directional gradient in a vertical direction as the sum of the absolute difference between the input pixel and each of first and second vertical neighboring pixels from the set of neighboring pixels;
determining a third directional gradient in a diagonal-positive direction as the sum of the absolute difference between the input pixel and each of first and second neighboring pixels in the diagonal-positive direction from the set of neighboring pixels, wherein the diagonal-positive direction corresponds to an upper-right direction;
determining a fourth directional gradient in a diagonal-negative direction as the sum of the absolute difference between the input pixel and each of first and second neighboring pixels in the diagonal-negative direction from the set of neighboring pixels, wherein the diagonal-negative direction corresponds to an upper-left direction;
determining the minimum of the first, second, third, and fourth directional gradients; and
determining the second replacement value by linear interpolation of the values of the first and second neighboring pixels in the direction of the minimum gradient.

10. The method of claim 9, wherein if one of the first or the second neighboring pixel in the direction of the minimum gradient is located outside of a processing frame, the value of the pixel located outside of the processing frame is substituted with the value of the other pixel located within the processing frame during the linear interpolation.

11. An image signal processing circuit comprising:
an interface configured to receive image data acquired using an image sensor of an imaging device; and
an image processing pipeline configured to perform a set of processing operations on the image data, wherein one of the set of processing operations detects and corrects for defective pixels in the image data, and wherein the image processing pipeline comprises defective pixel detection and correction logic configured to:
receive an input pixel of the image data;
determine if the location of the input pixel corresponds to a location entry in a static defect table, identify the input pixel as being a static defect if the location of the input pixel is found in the static defect table, and determine a first replacement value for correcting the input pixel;
if the input pixel is not identified as a static defect, determine if the input pixel is a dynamic defect, and determine a second replacement value for the input pixel if the input pixel is determined to be a dynamic defect, wherein the input pixel is determined to be a dynamic defect by:
identifying eight neighboring pixels of the same color as the input pixel;
calculating pixel-to-pixel gradients with respect to the input pixel for each of the eight neighboring pixels located within a processing region defined within an imaging frame of the image sensor;
determining a count of the number of the pixel-to-pixel gradients which are less than a dynamic defect threshold value, wherein the dynamic defect threshold value is adjustable based upon a high frequency component of the eight neighboring pixels located within the processing region; and identifying the input pixel as a dynamic defect if the determined count is less than a maximum count value; and correct the input pixel using either the first or second replacement value based upon whether the input pixel is determined to be a static defect, or a dynamic defect.

12. The image signal processing circuit of claim 11, wherein the defective pixel detection and correction logic is configured to determine if the input pixel is speckled by calculating an average gradient value as the difference between the value of the input pixel and an average of the values of the eight neighboring pixels within the processing region, and identifying the input pixel as being speckled if the average gradient value is greater than a speckle threshold value.

13. The image signal processing circuit of claim 12, wherein the speckle threshold value is adjustable based upon a high frequency component of the eight neighboring pixels located within the processing region.

14. The image signal processing circuit of claim 13, wherein the speckle threshold value is set more aggressively relative to the dynamic defect threshold value in order to reduce false detection of speckling in areas of the image data having increased texture characteristics.

15. The image signal processing circuit of claim 12, wherein the second replacement value is determined by calculating directional gradients as the sum of the difference between the input pixel and two neighboring pixels of the eight neighboring pixels in each of a horizontal direction, a vertical direction, an upper-right direction, and an upper-left direction, determining the direction corresponding to the minimum gradient, and interpolating the values of the two neighboring pixels associated with the minimum gradient direction.

16. The image signal processing circuit of claim 11, wherein the first replacement value is determined based upon the value of a previous pixel of the same color that immediately precedes the input pixel in scanning order.

17. The image signal processing circuit of claim 11, comprising front-end processing logic configured to perform an initial set of operations on the image data, wherein the front-end processing logic is configured to receive the input pixel of the image data, identify four horizontal neighboring pixels of the same color as the input pixel including two horizontal neighboring pixels located on a first side of the input pixel and two horizontal neighboring pixels located on a second side of the input pixel, determine pixel-to-pixel gradient values with respect to the input pixel for each of the four horizontal neighboring pixels located within a processing region defined within an imaging frame of the image sensor, determine a count of the number of gradient values that is less than or equal to a front-end defective pixel threshold, identify the input pixel as a front-end defect, correct the front-end defect, and collect imaging statistics on the image data after the front-end defect is corrected;

wherein the initial set of operations is performed by the front-end processing logic before the set of operations performed by the image processing pipeline.

18. The image signal processing circuit of claim 17, wherein correcting the front-end defect comprises:

determining the value of a first neighboring pixel having the same color as the input pixel and located to the immediate right of the input pixel in the imaging frame;

determining whether the first neighboring pixel is within the processing region;

replacing the value of the input pixel with the value of the first neighboring pixel if the first neighboring pixel is within the processing region;

if the first neighboring pixel is not within the processing region, determining the value of a second neighboring pixel having the same color as the input pixel and located to the immediate left of the input pixel in the imaging frame; and replacing the value of the input pixel with the value of the second neighboring pixel.

19. A system, comprising:

an imaging device comprising an image sensor; and image processing circuitry configured to process image data acquired using the image sensor, wherein the image processing circuitry comprises:

defective pixel detection and correction logic configured to:

determine, for a current image frame of the image data, if the location of an input pixel corresponds to a location entry in a static defect table, identify the input pixel as being a static defect if the location of the input pixel is found in the static defect table, and correct the input pixel using a static defect replacement value; and if the input pixel is not identified as a static defect, determine if the input pixel is either a dynamic defect or speckled, and correct the input pixel using a non-static defect replacement value if the input pixel is determined to be a dynamic defect or speckled; and a memory device configured to store the static defect table and the static defect replacement value, wherein the static defect table is configured to be updated intermittently during image processing to store locations corresponding to newly-detected static defects.

20. The system of claim 19, wherein the location of the input pixel of the image data is stored into the static defect table as a newly-detected static defect if, over a particular number of consecutive image frames, the input pixel is repeatedly identified as a dynamic defect.

21. The system of claim 19, wherein the static defect table is implemented as one or more first-in-first-out (FIFO) queues.

22. The system of claim 19, wherein the static defect table is configured to store a plurality of static defect pixels, and wherein the static defect table is configured to be sorted based at least partially upon minimum gradient values associated with the stored plurality of static defect pixels.

23. The system of claim 19, comprising an electronic device, and wherein the imaging device comprises a camera integrated with the electronic device, an external camera configured to couple to an input/output port of the electronic device, or some combination thereof.

24. The system of claim 19, wherein the image sensor comprises a Bayer color filter array, a RGBW color filter array, or a CYGM color filter array.

25. The system of claim 19, wherein a static defect, a dynamic defect, or speckle is the result of the input pixel corresponding to a dead pixel, a stuck pixel, or a leaky pixel on the image sensor.

26. One or more non-transitory tangible computer-readable storage media having instructions encoded thereon for execution by a processor, the instructions comprising:

code to determine if an input pixel in a current frame of image data acquired by an image sensor corresponds to a location entry in a static defect table, and to identify the input pixel as a static defect if the location of the input pixel is found in the static defect table, wherein each location entry in the static defect table is associated with a minimum gradient value;

code to correct the input pixel using a static defect replacement value determined as the value of a previous pixel of the same color in scanning order;

code to, if the input pixel is not identified as a static defect, determine whether the input pixel is a dynamic defect by identifying eight neighboring pixels of the same color as the input pixel, calculating pixel-to-pixel gradients with respect to the input pixel for each of the eight neighboring pixels located within a processing region defined within an imaging frame of the image sensor, determining a count of the number of the gradients which are less than a dynamic defect threshold value, and identifying the input pixel as a dynamic defect if the determined count is less than a maximum count value;

code to calculate a dynamic defect replacement value by calculating directional gradients as the sum of the difference between the input pixel and two neighboring pixels of the eight neighboring pixels in each of a horizontal direction, a vertical direction, an upper-right direction, and an upper-left direction, determining the direction corresponding to the minimum gradient, and interpolating the values of the two neighboring pixels associated with the minimum gradient direction;

code to correct the input pixel using the dynamic defect replacement value;

code to determine if the input pixel was identified as a dynamic defect for a particular number of consecutive frames preceding the current frame and, if the input pixel was identified as a dynamic defect for the particular number of consecutive frames, determine a minimum value of the pixel-to-pixel gradients for each of the eight neighboring pixels located within the processing region, and store the location of the input pixel and the minimum gradient value into the static defect table.

27. The one or more non-transitory tangible computer-readable storage media of claim 26, comprising code to prioritize the order in which static defects are corrected based at least partially upon minimum gradient values associated with the static defects.

28. The one or more non-transitory tangible computer-readable storage media of claim 26, wherein a first time at which the code to determine if the input pixel corresponds to the location entry in the static defect table is executed and a second time at which the code to determine whether the input pixel is a dynamic defect is executed are time-shifted by an amount of time corresponding to the processing of at least one scan line of the image data for the current frame.

29. An image signal processing circuit comprising:

an interface configured to receive image data acquired using an image sensor of an imaging device; and an image processing pipeline configured to perform a set of processing operations on the image data, wherein one of the set of processing operations detects and corrects for defective pixels in the image data, and wherein the image processing pipeline comprises defective pixel detection and correction logic configured to:

receive an input pixel of the image data;

determine if the location of the input pixel corresponds to a location entry in a static defect table, identify the input pixel as being a static defect if the location of the input pixel is found in the static defect table, and determine a first replacement value for correcting the input pixel;

if the input pixel is not identified as a static defect, determine if the input pixel is a speckled and determine a second replacement value for the input pixel if the input pixel is determined to be speckled, wherein the input pixel is determined to be speckled by:

identifying eight neighboring pixels of the same color as the input pixel;

calculating pixel-to-pixel gradients with respect to the input pixel for each of the eight neighboring pixels located within a processing region defined within an imaging frame of the image sensor;

calculating an average gradient value as the difference between the value of the input pixel and an average of the values of the eight neighboring pixels within the processing region; and identifying the input pixel as being speckled if the average gradient value is greater than a speckle threshold value, wherein the speckle threshold value is adjustable based upon a high frequency component of the eight neighboring pixels located within the processing region; and correct the input pixel using either the first or second replacement value based upon whether the input pixel is determined to be a static defect or speckled.

* * * * *